United States Patent
Wetmore et al.

(10) Patent No.: US 12,465,718 B2
(45) Date of Patent: Nov. 11, 2025

(54) METHODS AND DEVICES FOR MODULATION OF INTEGRATED NEURAL NETWORKS TO INFLUENCE COMPOSITE SENSORY PROCESSES

(71) Applicant: IST, LLC, Dover, DE (US)

(72) Inventors: Daniel Z. Wetmore, Brooklyn, NY (US); William J. Tyler, Cave Creek, AZ (US)

(73) Assignee: IST, LLC, Dover, DE (US)

( * ) Notice: Subject to any disclaimer, the term of this patent is extended or adjusted under 35 U.S.C. 154(b) by 973 days.

(21) Appl. No.: 17/423,741

(22) PCT Filed: Jan. 21, 2020

(86) PCT No.: PCT/US2020/014442
§ 371 (c)(1),
(2) Date: Jul. 16, 2021

(87) PCT Pub. No.: WO2020/150737
PCT Pub. Date: Jul. 23, 2020

(65) Prior Publication Data
US 2022/0160995 A1    May 26, 2022

Related U.S. Application Data

(60) Provisional application No. 62/794,394, filed on Jan. 18, 2019.

(51) Int. Cl.
*A61M 21/02*      (2006.01)
*A61N 1/04*       (2006.01)
*A61N 1/36*       (2006.01)

(52) U.S. Cl.
CPC .......... *A61M 21/02* (2013.01); *A61N 1/0472* (2013.01); *A61N 1/36025* (2013.01); *A61N 1/36034* (2017.08); *A61N 1/36036* (2017.08)

(58) Field of Classification Search
CPC .......... A61M 21/02; A61M 2021/0027; A61M 2021/0066; A61M 2205/3306;
(Continued)

(56) References Cited

U.S. PATENT DOCUMENTS 3,255,753 A    6/1966  Wing
3,388,699 A    6/1968  Webb et al.
(Continued)

FOREIGN PATENT DOCUMENTS

CN    1204268 A    1/1999
CN    1607970 A    4/2005
(Continued)

OTHER PUBLICATIONS

Liu et al.; Recent developments in tough hydrogels for biomedical applications; Gels; 4(2):46; doi:10.3390/gels4020046; 30 pages; May 22, 2018.
(Continued)

*Primary Examiner* — Sunita Reddy
(74) *Attorney, Agent, or Firm* — Shay Glenn LLP

(57) ABSTRACT

Methods and apparatuses are described for modulating multiple integrated neural networks to alter composite sensory processes, such as audition or hearing. These methods and apparatuses may be used for therapeutic and non-therapeutic uses, including enhancing entertainment and communication, by providing a cranio-cervical tuning apparatus worn in or around the outer ear or auricle. These methods and apparatuses may include functional neurosensory bias for neurosensory scrambling neuromodulation to influence composite or multi-modal sensory processes.

19 Claims, 23 Drawing Sheets

(58) Field of Classification Search
CPC .... A61M 2205/332; A61M 2205/3368; A61M 2205/3375; A61M 2205/3561; A61M 2205/3592; A61M 2205/3653; A61M 2205/3673; A61M 2205/502; A61M 2205/8206; A61M 2209/088; A61M 21/00; A61M 2021/0055; A61M 2021/0072; A61M 2205/587; A61M 2210/0662; A61M 2230/06; A61M 2230/10; A61M 2230/30; A61M 2230/50; A61M 2230/60; A61N 1/0472; A61N 1/36025; A61N 1/36034; A61N 1/36036; A61N 1/0456; A61N 1/06; A61B 5/024; A61B 5/369; A61B 5/02055; A61B 5/4836; A61B 5/6803
USPC .......................................... 600/9–15, 26–28
See application file for complete search history.

(56) References Cited

U.S. PATENT DOCUMENTS

| | | |
|---|---|---|
| 3,620,219 A | 11/1971 | Barker |
| 3,648,708 A | 3/1972 | Haeri |
| 3,762,396 A | 10/1973 | Ballentine et al. |
| 4,418,687 A | 12/1983 | Matsumoto et al. |
| 4,431,000 A | 2/1984 | Butler et al. |
| 4,646,744 A | 3/1987 | Capel |
| 4,664,117 A | 5/1987 | Beck |
| 4,865,048 A | 9/1989 | Eckerson |
| 5,144,952 A | 9/1992 | Frachet et al. |
| 5,183,041 A | 2/1993 | Toriu et al. |
| 5,335,657 A | 8/1994 | Teny et al. |
| 5,342,410 A | 8/1994 | Braverman |
| 5,397,338 A | 3/1995 | Grey et al. |
| 5,476,481 A | 12/1995 | Schondorf |
| 5,487,759 A | 1/1996 | Bastyr et al. |
| 5,514,175 A | 5/1996 | Kim et al. |
| 5,540,736 A | 7/1996 | Haimovich et al. |
| 5,573,552 A | 11/1996 | Hansjurgens |
| 5,578,065 A | 11/1996 | Hattori et al. |
| 5,593,427 A | 1/1997 | Gliner et al. |
| 5,738,647 A | 4/1998 | Bernhard et al. |
| 5,792,067 A | 8/1998 | Karell |
| 6,066,163 A | 5/2000 | John |
| 6,280,454 B1 | 8/2001 | Wang |
| 6,324,432 B1 | 11/2001 | Rigaux et al. |
| 6,445,955 B1 | 9/2002 | Michelson et al. |
| 6,463,328 B1 | 10/2002 | John |
| 6,516,227 B1 | 2/2003 | Meadows et al. |
| 6,526,318 B1 | 2/2003 | Ansarinia |
| 6,567,702 B1 | 5/2003 | Nekhendzy et al. |
| 6,731,987 B1 | 5/2004 | McAdams et al. |
| 6,983,184 B2 | 1/2006 | Price |
| 7,120,499 B2 | 10/2006 | Thrope et al. |
| 7,146,217 B2 | 12/2006 | Firlik et al. |
| 7,263,501 B2 | 8/2007 | Tirinato et al. |
| 7,315,761 B2 | 1/2008 | De Ridder |
| 7,376,467 B2 | 5/2008 | Thrope et al. |
| 7,422,555 B2 | 9/2008 | Zabara |
| 7,577,481 B2 | 8/2009 | Firlik et al. |
| 7,613,519 B2 | 11/2009 | De Ridder |
| 7,660,636 B2 | 2/2010 | Castel et al. |
| 7,801,600 B1 | 9/2010 | Carbunaru et al. |
| 7,891,615 B2 | 2/2011 | Bevirt |
| 7,949,403 B2 | 5/2011 | Palermo et al. |
| 8,029,431 B2 | 10/2011 | Tononi |
| 8,034,294 B1 | 10/2011 | Goldberg |
| 8,086,318 B2 | 12/2011 | Strother et al. |
| 8,097,926 B2 | 1/2012 | De Graff et al. |
| 8,116,875 B2 | 2/2012 | Osypka et al. |
| 8,121,695 B2 | 2/2012 | Gliner et al. |
| 8,150,537 B2 | 4/2012 | Tanaka et al. |
| 8,190,248 B2 | 5/2012 | Besio et al. |
| 8,197,276 B2 | 6/2012 | Egloff et al. |
| 8,204,601 B2 | 6/2012 | Moyer et al. |
| 8,239,030 B1 | 8/2012 | Hagedorn et al. |
| 8,265,761 B2 | 9/2012 | Siever |
| 8,280,502 B2 | 10/2012 | Hargrove et al. |
| 8,346,337 B2 | 1/2013 | Heller et al. |
| 8,380,315 B2 | 2/2013 | DeGiorgio et al. |
| 8,428,738 B2 | 4/2013 | Valencia |
| 8,460,356 B2 | 6/2013 | Rogers et al. |
| 8,463,383 B2 | 6/2013 | Sakai et al. |
| 8,494,625 B2 | 7/2013 | Hargrove |
| 8,494,627 B2 | 7/2013 | Bikson et al. |
| 8,506,469 B2 | 8/2013 | Dietrich et al. |
| 8,532,758 B2 | 9/2013 | Silverstone |
| 8,560,075 B2 | 10/2013 | Covalin |
| 8,571,651 B2 | 10/2013 | Ben-Ezra et al. |
| 8,583,238 B1 | 11/2013 | Heldman et al. |
| 8,583,256 B2 | 11/2013 | Tracey et al. |
| 8,612,005 B2 | 12/2013 | Rezai et al. |
| 8,639,343 B2 | 1/2014 | De Vos |
| 8,660,644 B2 | 2/2014 | Jaax et al. |
| 8,688,239 B2 | 4/2014 | Hartlep et al. |
| 8,843,210 B2 | 9/2014 | Simon et al. |
| 8,874,219 B2 | 10/2014 | Trier et al. |
| 8,903,494 B2 | 12/2014 | Goldwasser et al. |
| 8,983,621 B2 | 3/2015 | Hou et al. |
| 9,002,458 B2 | 4/2015 | Pal et al. |
| 9,014,811 B2 | 4/2015 | Pal et al. |
| 9,067,054 B2 | 6/2015 | Simon et al. |
| 9,168,374 B2 | 10/2015 | Su |
| 9,205,258 B2 | 12/2015 | Simon et al. |
| 9,233,244 B2 | 1/2016 | Pal et al. |
| 9,248,292 B2 | 2/2016 | Trier et al. |
| 9,333,334 B2 | 5/2016 | Jeffery et al. |
| 9,364,674 B2 | 6/2016 | Cook et al. |
| 9,393,401 B2 | 7/2016 | Goldwasser et al. |
| 9,393,430 B2 | 7/2016 | Demers et al. |
| 9,399,126 B2 | 7/2016 | Pal et al. |
| 9,415,219 B2 | 8/2016 | Simon et al. |
| 9,440,070 B2 | 9/2016 | Goldwasser et al. |
| 9,446,242 B2 | 9/2016 | Griffith |
| 9,474,891 B2 | 10/2016 | Demers et al. |
| 9,474,905 B2 | 10/2016 | Doan et al. |
| 9,517,351 B2 | 12/2016 | Charlesworth et al. |
| 9,655,772 B2 | 5/2017 | Smith et al. |
| 9,656,076 B2 | 5/2017 | Trier et al. |
| 9,700,725 B2 | 7/2017 | Zhu |
| 9,731,116 B2 | 8/2017 | Chen |
| 9,744,347 B2 | 8/2017 | Chen et al. |
| 9,764,133 B2 | 9/2017 | Thomas et al. |
| 9,782,587 B2 | 10/2017 | Trier et al. |
| 9,956,405 B2 | 5/2018 | Goldwasser et al. |
| 9,968,780 B2 | 5/2018 | Pal et al. |
| 10,258,788 B2 | 4/2019 | Jeffery |
| 10,293,161 B2 | 5/2019 | Charlesworth et al. |
| 10,426,945 B2 | 10/2019 | Tyler et al. |
| 10,485,972 B2 | 11/2019 | Pal et al. |
| 10,537,703 B2 | 1/2020 | Tyler et al. |
| 10,556,108 B1 | 2/2020 | Katsnelson et al. |
| 2001/0000187 A1 | 4/2001 | Peckham et al. |
| 2002/0116036 A1 | 8/2002 | Daignault et al. |
| 2003/0088279 A1 | 5/2003 | Rissmann et al. |
| 2003/0134545 A1 | 7/2003 | McAdams et al. |
| 2003/0171685 A1 | 9/2003 | Lesser et al. |
| 2003/0225323 A1 | 12/2003 | Kiani et al. |
| 2004/0019370 A1 | 1/2004 | Gliner et al. |
| 2004/0098065 A1 | 5/2004 | Hagglof et al. |
| 2004/0158305 A1 | 8/2004 | Axelgaard |
| 2004/0267333 A1 | 12/2004 | Kronberg |
| 2005/0085751 A1 | 4/2005 | Daskal et al. |
| 2005/0165460 A1 | 7/2005 | Erfan |
| 2005/0267388 A1 | 12/2005 | Hanna |
| 2005/0283259 A1 | 12/2005 | Wolpow |
| 2006/0047215 A1 | 3/2006 | Newman et al. |
| 2006/0064139 A1 | 3/2006 | Chung et al. |
| 2006/0149119 A1 | 7/2006 | Wang |
| 2006/0190057 A1 | 8/2006 | Reese |
| 2006/0195159 A1 | 8/2006 | Bradley et al. |
| 2006/0206163 A1 | 9/2006 | Wahlstrand et al. |
| 2006/0247985 A1 | 11/2006 | Liamos et al. |

(56) References Cited

U.S. PATENT DOCUMENTS

| | | |
|---|---|---|
| 2007/0053466 A1 | 3/2007 | Klostermann |
| 2007/0088419 A1 | 4/2007 | Fiorina et al. |
| 2007/0097593 A1 | 5/2007 | Armstrong |
| 2007/0100275 A1 | 5/2007 | Fischer et al. |
| 2007/0173890 A1 | 7/2007 | Armstrong |
| 2007/0213790 A1 | 9/2007 | Nolan et al. |
| 2007/0276451 A1 | 11/2007 | Rigaux |
| 2008/0015641 A1 | 1/2008 | Armstrong et al. |
| 2008/0045882 A1 | 2/2008 | Finsterwald |
| 2008/0071626 A1 | 3/2008 | Hill |
| 2008/0097564 A1 | 4/2008 | Lathrop |
| 2008/0132974 A1 | 6/2008 | Strother et al. |
| 2008/0207985 A1 | 8/2008 | Farone |
| 2008/0208266 A1 | 8/2008 | Lesser et al. |
| 2008/0215113 A1 | 9/2008 | Pawlowicz |
| 2008/0275293 A1 | 11/2008 | Lattner et al. |
| 2008/0281368 A1 | 11/2008 | Bulkes et al. |
| 2008/0319505 A1 | 12/2008 | Boyden et al. |
| 2009/0048642 A1 | 2/2009 | Goroszeniuk |
| 2009/0054952 A1 | 2/2009 | Glukhovsky et al. |
| 2009/0076559 A1 | 3/2009 | Libbus et al. |
| 2009/0092271 A1* | 4/2009 | Fay .................. H04R 25/604 381/328 |
| 2009/0099623 A1 | 4/2009 | Bentwich |
| 2009/0112280 A1 | 4/2009 | Wingeier et al. |
| 2009/0177243 A1 | 7/2009 | Lebedev et al. |
| 2009/0200692 A1 | 8/2009 | Chang |
| 2009/0210028 A1 | 8/2009 | Rigaux et al. |
| 2009/0240303 A1 | 9/2009 | Wahlstrand et al. |
| 2009/0270947 A1 | 10/2009 | Stone et al. |
| 2009/0287108 A1 | 11/2009 | Levy |
| 2010/0057154 A1 | 3/2010 | Dietrich et al. |
| 2010/0076533 A1 | 3/2010 | Dar et al. |
| 2010/0094375 A1 | 4/2010 | Donders et al. |
| 2010/0145399 A1 | 6/2010 | Johari et al. |
| 2010/0145428 A1 | 6/2010 | Cameron et al. |
| 2010/0152817 A1 | 6/2010 | Gillbe |
| 2010/0222734 A1 | 9/2010 | Jayes et al. |
| 2010/0256436 A1 | 10/2010 | Partsch et al. |
| 2010/0318168 A1 | 12/2010 | Bignetti |
| 2011/0029045 A1 | 2/2011 | Cevette et al. |
| 2011/0034756 A1 | 2/2011 | Hacking et al. |
| 2011/0077660 A1 | 3/2011 | Janik et al. |
| 2011/0082326 A1 | 4/2011 | Mishelevich et al. |
| 2011/0082515 A1 | 4/2011 | Libbus et al. |
| 2011/0093033 A1 | 4/2011 | Nekhendzy |
| 2011/0106220 A1 | 5/2011 | DeGiorgio et al. |
| 2011/0112394 A1 | 5/2011 | Mishelevich |
| 2011/0112590 A1 | 5/2011 | Wu et al. |
| 2011/0114191 A1 | 5/2011 | Wheater et al. |
| 2011/0137381 A1 | 6/2011 | Lee et al. |
| 2011/0144716 A1 | 6/2011 | Bikson et al. |
| 2011/0160811 A1 | 6/2011 | Walker |
| 2011/0172752 A1 | 7/2011 | Bingham et al. |
| 2011/0190846 A1 | 8/2011 | Ruffini et al. |
| 2011/0230701 A1 | 9/2011 | Simon et al. |
| 2011/0230702 A1 | 9/2011 | Honour |
| 2011/0230938 A1 | 9/2011 | Simon et al. |
| 2011/0270345 A1 | 11/2011 | Johnston et al. |
| 2011/0276112 A1 | 11/2011 | Simon et al. |
| 2011/0288610 A1 | 11/2011 | Brocke |
| 2011/0301683 A1 | 12/2011 | Axelgaard |
| 2011/0307029 A1 | 12/2011 | Hargrove |
| 2011/0319950 A1 | 12/2011 | Sullivan |
| 2012/0016431 A1 | 1/2012 | Paul et al. |
| 2012/0029591 A1 | 2/2012 | Simon et al. |
| 2012/0029601 A1 | 2/2012 | Simon et al. |
| 2012/0109251 A1 | 5/2012 | Lebedev et al. |
| 2012/0149973 A1 | 6/2012 | Holloway |
| 2012/0165759 A1 | 6/2012 | Rogers et al. |
| 2012/0182924 A1 | 7/2012 | Gaines et al. |
| 2012/0184801 A1 | 7/2012 | Simon et al. |
| 2012/0185020 A1 | 7/2012 | Simon et al. |
| 2012/0209340 A1 | 8/2012 | Escribano |
| 2012/0209346 A1 | 8/2012 | Bikson et al. |
| 2012/0245409 A1 | 9/2012 | Liang |
| 2012/0245653 A1 | 9/2012 | Bikson et al. |
| 2012/0296390 A1 | 11/2012 | Nakashima et al. |
| 2012/0302912 A1 | 11/2012 | Moffitt et al. |
| 2012/0306628 A1 | 12/2012 | Singhal |
| 2013/0023951 A1* | 1/2013 | Greenspan ......... A61N 1/36071 607/116 |
| 2013/0035734 A1 | 2/2013 | Soler et al. |
| 2013/0041235 A1 | 2/2013 | Rogers et al. |
| 2013/0060304 A1 | 3/2013 | La Tendresse et al. |
| 2013/0066395 A1 | 3/2013 | Simon et al. |
| 2013/0079659 A1 | 3/2013 | Akhadov et al. |
| 2013/0096641 A1 | 4/2013 | Strother et al. |
| 2013/0131551 A1 | 5/2013 | Raghunathan et al. |
| 2013/0158627 A1 | 6/2013 | Gozani et al. |
| 2013/0184779 A1 | 7/2013 | Bikson et al. |
| 2013/0204315 A1 | 8/2013 | Wongsampigoon et al. |
| 2013/0226275 A1 | 8/2013 | Duncan |
| 2013/0253613 A1 | 9/2013 | Salahovic et al. |
| 2013/0267761 A1 | 10/2013 | Bentwich |
| 2013/0282095 A1 | 10/2013 | Mignolet et al. |
| 2013/0304175 A1 | 11/2013 | Voegele et al. |
| 2013/0318168 A1 | 11/2013 | Demain et al. |
| 2013/0325096 A1 | 12/2013 | Dupelle et al. |
| 2013/0333094 A1 | 12/2013 | Rogers et al. |
| 2014/0031895 A1 | 1/2014 | Rahimi et al. |
| 2014/0057232 A1 | 2/2014 | Wetmore et al. |
| 2014/0128939 A1 | 5/2014 | Embrey et al. |
| 2014/0128944 A1 | 5/2014 | Stern et al. |
| 2014/0163645 A1 | 6/2014 | Dinsmoor et al. |
| 2014/0182350 A1 | 7/2014 | Bhavaraju et al. |
| 2014/0186807 A1 | 7/2014 | Rastatter et al. |
| 2014/0222102 A1 | 8/2014 | Lemus et al. |
| 2014/0257449 A1 | 9/2014 | Helmer |
| 2014/0275933 A1 | 9/2014 | Meyer et al. |
| 2014/0277324 A1 | 9/2014 | DiUbaldi et al. |
| 2014/0309709 A1 | 10/2014 | Gozani et al. |
| 2014/0336728 A1 | 11/2014 | Franke et al. |
| 2014/0371814 A1 | 12/2014 | Spizzini et al. |
| 2015/0066104 A1 | 3/2015 | Wingeier et al. |
| 2015/0224310 A1 | 8/2015 | Sharma et al. |
| 2015/0230863 A1 | 8/2015 | Youngquist et al. |
| 2015/0257970 A1 | 9/2015 | Mucke et al. |
| 2015/0335877 A1 | 11/2015 | Jeffery et al. |
| 2015/0360030 A1 | 12/2015 | Cartlidge et al. |
| 2016/0008632 A1 | 1/2016 | Wetmore et al. |
| 2016/0074657 A1 | 3/2016 | Kwan et al. |
| 2016/0106975 A1 | 4/2016 | Shore et al. |
| 2016/0279022 A1 | 9/2016 | Hyde et al. |
| 2016/0279435 A1 | 9/2016 | Hyde et al. |
| 2016/0346530 A1 | 12/2016 | Jeffery et al. |
| 2017/0027812 A1* | 2/2017 | Hyde .................. G16H 10/20 |
| 2017/0076414 A1 | 3/2017 | Egnal et al. |
| 2017/0224990 A1 | 8/2017 | Goldwasser et al. |
| 2017/0368297 A1 | 12/2017 | Tyler et al. |
| 2017/0368329 A1* | 12/2017 | Tyler .................. G10L 15/02 |
| 2018/0001077 A1* | 1/2018 | Cook .................. A61N 1/0551 |
| 2018/0036533 A1 | 2/2018 | Yoo et al. |
| 2018/0050171 A1 | 2/2018 | Tabert et al. |
| 2018/0169411 A1 | 6/2018 | Goodall et al. |
| 2018/0272118 A1 | 9/2018 | Goldwasser et al. |
| 2019/0001117 A1 | 1/2019 | Ben-David et al. |
| 2019/0151646 A1 | 5/2019 | Cakmak |
| 2019/0321636 A1 | 10/2019 | Law et al. |
| 2019/0336765 A1 | 11/2019 | Charlesworth et al. |
| 2020/0038658 A1 | 2/2020 | Tyler et al. |
| 2020/0188660 A1* | 6/2020 | Franke ............... A61N 1/36071 |
| 2023/0125579 A1 | 4/2023 | Tyler et al. |
| 2025/0041597 A1 | 2/2025 | Tyler et al. |

FOREIGN PATENT DOCUMENTS

| | | |
|---|---|---|
| CN | 1704131 A | 12/2005 |
| CN | 1842356 A | 10/2006 |
| CN | 101234233 A | 8/2008 |
| CN | 101244314 A | 8/2008 |
| CN | 201353374 Y | 12/2009 |
| CN | 102245253 A | 11/2011 |
| CN | 102725021 A | 10/2012 |

(56) References Cited

FOREIGN PATENT DOCUMENTS

| | | |
|---|---|---|
| CN | 102906752 A | 1/2013 |
| CN | 103517732 A | 1/2014 |
| EP | 50291981 | 11/1993 |
| EP | 801957 A1 | 10/1997 |
| EP | 09965358 A2 | 12/1999 |
| EP | 1529550 A1 | 5/2005 |
| EP | 1502623 B1 | 11/2007 |
| EP | 1922989 A2 | 5/2008 |
| EP | 1551290 B1 | 8/2008 |
| EP | 2024018 A2 | 2/2009 |
| EP | 2314346 A1 | 4/2011 |
| EP | 1559369 B1 | 3/2012 |
| EP | 2069001 B1 | 2/2013 |
| EP | 1556135 B1 | 9/2017 |
| JP | 49061984 A | 6/1974 |
| JP | 05031197 A | 2/1993 |
| JP | 06339531 A | 12/1994 |
| JP | 10108913 A | 4/1998 |
| JP | 2001129100 A | 5/2001 |
| JP | 2001293097 A | 10/2001 |
| JP | 2002306604 A | 10/2002 |
| JP | 200310230 A | 1/2003 |
| JP | 2006192302 A | 7/2006 |
| JP | 3129187 U | 1/2007 |
| JP | 2007535372 A | 12/2007 |
| JP | 200985901 A | 4/2009 |
| JP | 2009513248 A | 4/2009 |
| JP | 2011118293 A | 6/2011 |
| JP | 2011519654 A | 7/2011 |
| JP | 2013512076 A | 4/2013 |
| WO | WO92/06737 A1 | 4/1992 |
| WO | WO93/17628 A1 | 9/1993 |
| WO | WO94/00188 A1 | 1/1994 |
| WO | WO94/00189 A1 | 1/1994 |
| WO | WO01/08071 A1 | 2/2001 |
| WO | WO01/78834 A1 | 10/2001 |
| WO | WO03/018120 A1 | 3/2003 |
| WO | WO03/105945 A2 | 12/2003 |
| WO | WO2004/017675 A1 | 2/2004 |
| WO | WO2005/110531 A1 | 11/2005 |
| WO | WO2006/113801 A2 | 10/2006 |
| WO | WO2006/138702 A2 | 12/2006 |
| WO | WO2008/155114 A1 | 12/2008 |
| WO | WO2009/089014 A1 | 7/2009 |
| WO | WO2009/137683 A2 | 11/2009 |
| WO | WO2009/147599 A1 | 12/2009 |
| WO | WO2010/047834 A1 | 4/2010 |
| WO | WO2010/067145 A1 | 6/2010 |
| WO | WO2010/120823 A2 | 10/2010 |
| WO | WO2011/044176 A1 | 4/2011 |
| WO | WO2011/147546 A1 | 12/2011 |
| WO | WO2012/082960 A2 | 6/2012 |
| WO | WO2012/089588 A1 | 7/2012 |
| WO | WO2012/116407 A1 | 9/2012 |
| WO | WO2012/129574 A2 | 9/2012 |
| WO | WO2012/150600 A2 | 11/2012 |
| WO | WO2012/156051 A1 | 11/2012 |
| WO | WO2012/156052 A2 | 11/2012 |
| WO | WO2013/071307 A1 | 5/2013 |
| WO | WO2013/192582 A1 | 12/2013 |
| WO | WO2014/107624 A1 | 7/2014 |
| WO | WO2014/195516 A1 | 12/2014 |
| WO | WO2015/036420 A1 | 3/2015 |
| WO | WO2015/061663 A1 | 4/2015 |
| WO | WO2015/143053 A1 | 9/2015 |
| WO | WO2017/098300 A1 | 6/2017 |
| WO | WO2017/132573 A1 | 8/2017 |
| WO | WO2017/201525 A1 | 11/2017 |
| WO | WO2018/227165 A1 | 12/2018 |
| WO | WO2020/150733 A1 | 7/2020 |
| WO | WO2020/150737 A1 | 7/2020 |

OTHER PUBLICATIONS

Adelman et al.; Air conduction, bone conduction, and soft tissue conduction audiograms in normal hearing and stimulated hearing losses; American Academy of Audiology; 26(1); pp. 101-108; Jan. 2015.

Adelman et al.; Investigation of the mechanism of soft tissue conduction explains several perplexing auditory phenomena; Journal of Basic and Clinical Physiology and Pharmacology; 25(3); pp. 269-272; Sep. 2014.

Artusi et al.; Buccal delivery of thiocolchicoside: in vitro and in vivo permeation studies; International Journal of Pharmaceutics; 250(1); pp. 203-213; Jan. 2003.

Berge; Pharmaceutical salts; Journal of Pharmaceutical Sciences; 66(1); p. 1-19; Jan. 1977.

El Kashian et al.; Effects of trigeminal ganglion stimulation on the central auditory system; Hearing Research; 189(1-2); pp. 25-30; Mar. 2004.

Evans; Sleep consciousness and the spontaneous and evoked electrical activity of the brain. Is there a cortical integrating mechanism?; Neurophysiologie Clinique/Clinical Neurophysiology; 33(1); pp. 1-10; Feb. 2003.

French; The reticular formation: the nature of the reticular activating system; Journal of Neurosurgery; 15; pp. 97-115; Jan. 1958.

Fujikado et al.; Two pathways from the facial skin to the superior colliculus in the rat; Brain Research; 212(1); pp. 131-135; May 1981.

Garcia-Rill; The pedunculopotine nucleus; Progress in Neurobiology; 36(5); pp. 363-389; Jan. 1991.

Grunwerg et al.; Somatosensory input and thalamic projection of pedunculopontine tegmental neurons; Neuroreport; 3(8); pp. 673-675; Aug. 1992.

Harting et al.; Spatial relationships of axons arising from the substantia nigra spinal trigeminal nucleus and pedunculopontine tegmental nucleus within the intermediate gray of the cat superior colliculus; journal of Comparative Neurology; 305(4); pp. 543-558; Mar. 1991.

Henry et al.; General review of tinnitus prevalence, mechanisms, effects, and management; Journal of speech, Language, and Hearing research; 48(5); pp. 1204-1235; Oct. 2005.

Herraiz et al.; Trans-electrical nerve stimulation (TENS) for somatic tinnitus; Progress in Brain Research; 166; pp. 389-394; Jan. 2007.

Kaitin et al.; Sleep disturbance produced by electrical stimulation of the locus coeruleus in a human subject; Biological Psychiatry; 21(8-9); pp. 710-716; Jul. 1986.

Kapkin et al.; Transcutaneous electrical stimulation of subjective tinnitus; ORL; Journal for Oto-Rhino-Laryngology and its Related Specialities; 70(3); pp. 156-161; Apr. 2008.

Kreuzer et al.; Feasibility, safety and efficacy of transcutaneous vagus nerve stimulation in chronic tinnitus: an open pilot study; Brain Stimulation; 7(5); pp. 740-747; Sep. 2014.

Laurikainen et al.; Betahistine-induced vascular effects in the rat cochiea; The American Journal of Otology; 14(1); pp. 24-30; Jan. 1993.

Laurikainen et al.; The tonic sympathetic input to the cochlear vasculature in guinea pig; Hearing Research; 105(1-2); pp. 141-145; Mar. 1997.

Lee et al.; Combined effect of oleic acid and polyethylene glycol 200 on buccal permeation of [D-ala2, D-leu5] enkephalin from a cubic phase of glyceryl monooleate; International Journal of Pharmaceutics; 204(1-2); pp. 137-144; Jun. 2000.

Li et al.; High spatiotemporal resolution imaging of the neurovascular response to electrical stimulation of rat peripheral trigeminal nerve as revealed by in vivo temporal laser speckle contrast; Journal of Neuroscience Methods; 176(2); pp. 230-236; Jan. 2009.

Nicolazzo et al; Modification of buccal drug delivery following pretreatment with skin penetration enhancers; journal of Pharmaceutical Sciences; 93(8); pp. 2054-2063; Aug. 2004.

Rubinstein et al.; Electrical suppression of tinnitus with high-rate pulse trains; Otology and Neurology; 24(3); pp. 478-485; May 2003.

Schoenen et al.; Migraine prevention with supraorbital transcutaneous stimulator: a rondomized controlled trial; Neurology; 80(8); pp. 697-704; Feb. 2013.

(56) References Cited

OTHER PUBLICATIONS

Seidman et al.; Mechanisms of alterations in the microcirculation of the cochlea; New York Acedemy of Sciences; 884(1); pp. 226-232; Nov. 1995.

Senel et al.; Drug permeation enhancement via buccal route: possibilites and limitations; journal of Controlled Release; 72(1-3); pp. 133-144; May 2001.

Shulman; External electrical tinnitus suppression: a review; The American Journal of Otology; 8(6); pp. 479-484; Nov. 1987.

Sillman et al.; Electrically stimulated increases in cochlear blood flow: II. Evidence of neural mediation: Otolaryngology—Head and Neck Surgery; 101(3); pp. 362-374; Sep. 1989.

Sillman et al.; Electrically timulated increases in cochlear blood flow: I. frequency and intensity effects; Otolarynology—Head and Neck Surgery; 100(4); pp. 308-316; Apr. 1989.

Smith; Axonal projections and connections of the principal sensory trigeminal nucleus in the monkey; Journal of Comparative Neurology; 163(3); pp. 347-375; Oct. 1975.

Starokadomskyy et al.; New absorption promoter for the buccal delivery: preparation and characterization of lysalbinic acid; International Journal of Pharmaceutics; 308(1-2); pp. 149-154; Feb. 2006.

Sudhakar et al.; Buccal bioadhesive drug delivery—a promising option for orally less efficient drugs; journal of Controlled Release; 114(1); pp. 15-40; Aug. 2006.

Tachibana et al.; Effect of transcutaneous electrostimulation on noise-induced temporary threshold shift; Acta Oto Laryngogica; 112(4); pp. 595-598; Jan. 1992.

Adelman et al.; Relation between body structure and hearing during soft tissue auditory stimulation; BioMed Research International; vol. 2015; 6 pages; (http://dx.doi.org/10.1155/2015/172026; Apr. 16, 2015.

Akbari et al.; Development and evaluation of buccoadhesive propranolol hydrochloride tablet formulations: effects of fillers; IL Farmaco; 59(2); pp. 155-161; Feb. 2004.

Aston-Jones et al.; An integrative theory of locus coeruleus-norepinephrine function: adaptive gain and optimal performance; Annu. Rev. Neurosci.; 28: pp. 403-450; Jul. 21, 2005.

Aston-Jones et al.; Role of locus coeruleus in attention and behavioral flexibility; Biological Psychiatry; 46(9); pp. 1309-1320; Nov. 1, 1999.

Axelgaard Manufacturing Co. Ltd.; Little PALS® (product information); 2 pgs.; printed Feb. 11, 2013 from http://www.axelgaard.com/prod_little-pals.html.

Axelgaard Manufacturing Co. Ltd.; PALS® Platinum Blue (product information); 2 pgs.; printed Feb. 11, 2013 from http://www.axelgaard.com/prod_pals-platinum-blue.html.

Backhaus et al.; Sleep disturbances are correlated with decreased morning awakening salivary cortisol; Psychoneuroendocrinology; 29(9): pp. 1184-1191; Oct. 31, 2004.

Basta et al.; Chronic Insomnia and the Stress System; Sleep Medicine Clinics; 2(2): pp. 279-291; (Author Manuscript, 20 pages); Jun. 30, 2007.

Ben-Menachem et al.; Surgically implanted and no-invasive vagus nerve stimulation: a review of efficacy, safety and tolerability; Euorpean Journal of Neurology; 22(9); pp. 1260-1268; Sep. 2015.

Berlad et al.; Power spectrum analysis and heart rate variability in Stage 4 and REM sleep: evidence for state-specific changes in autonomic dominance; Journal of Sleep Research; 2(2): pp. 88-90; Jun. 1, 1993.

Berridge et al.; The locus coeruleus-noradrenergic system: modulation of behavioral state and state-dependent cognitive processes; Brain Research Reviews; 42(1); pp. 33-84; Apr. 30, 2003.

Brown et al.; Control of sleep and wakefulness; Physiological reviews; 92(3); pp. 1087-1187; Jul. 1, 2012.

Brown et al.;Locus ceruleus activation suppresses feedforward interneurons and reduces beta-gamma electroencephalogram frequencies while it enhances theta frequencies in rat dentate gyrus; Journals of Neuroscience; 25(6): pp. 1985-1991; Feb. 23, 2005.

Buchanan et al.; Salivary alpha-amylase levels as a biomarker of experienced fear; Communicative and Integrative Biology; 3(6); pp. 525-527; Nov. 1, 2010.

Buckley et al.; On the Interactions of the Hypothalamic-Pituitary-Adrenal (HPA) Axis and Sleep: Normal HPA Axis Activity and Circadian Rhythm, Exemplary Sleep Disorders; The Journal of Clinical Endocrinology and Metabolism; 90(5); pp. 3106-3114; May 1, 2005.

Buysse et al.; The Pittsburgh Sleep Quality Index: a new instrument for psychiatric practice and research; Psychiatric Research; 28(2); pp. 193-213; May 31, 1989.

Caporale et al.; Spike timing-dependent plasticity: a hebbian learing rule; Annu. Rev. Neurosci.; 31; pp. 25-46; Jul. 2008.

Carter et al.; Tuning arousal with optogenetic modulation of locus coeruleus neurons; Nature Neuroscience; 13(12); pp. 1526-1533; Dec. 1, 2010.

Chaieb et al.; Transcranial alternating current stimulation in the low kHz range increases motor cortex excitability; Restor Neurol Neurosci; 29(3); pp. 167-175; Mar. 2011.

Clancy et al.; Non-invasive vagus nerve stimulation in healthy humans reduces sympathetic nerve activity; Brain Stimulation; 7(6); pp. 871-877; Nov. 2014.

Cook et al.; Trigeminal nerve stimulation in major depressive disorder: acute outcomes in an open pilot study; Epilepsy and Behavior; 28(2): pp. 221-226; Aug. 31, 2013.

Coutinho et al.; Musical emotions: predicting second-by-second subjective feelings of emotion from low-level psychoacoustic features and physiological measurements; Emotion; 11(4); pp. 921-937; Aug. 2011.

Couto et al.: Descriptive and functional neuroanatomy of locus coeruleus-nonsdrenaline-containing neutrons involvement in bradykinin-induced antinociception on principal sensory trigeminal nucleus; Journal of Chemical Neuroanatomy; 32(1); pp. 28-45; Aug. 2006.

Dan et al., Spike timing-dependent plasticity: from synapse to perception; Physiological Reviews; 86(3); pp. 1033-1048; Jul. 2006.

DaSilva et al.; Electrode positioning and montage in transcranial direct current stimulation; J Vis Exp; 51; e2744; 11 pgs.; May 2011.

De Ridder et al.; Multitarget surgical neuromodulation: combined C2 and auditory cortex implantation for tinnitus; Neuroscience Letters; 30(591); pp. 202-206; Mar. 2015.

De Ridder et al.; Placebo-controlled vagus nerve stimulation paired with tones in a patient with refractory tinnitus: a case report; Otology and Neurotology; 36(4); pp. 575-580; Apr. 2015.

DeGiorgio et al., Trigeminal nerve stimulation for epilepsy: long-term feasibility and efficacy; Neurology; 72(10): pp. 936-938; Mar. 10, 2009.

DeGiorgio et al.; Randomized controlled trial of trigeminal nerve stimulation for drug-resistant epilepsy; Neurology; 80(9); pp. 786-791; Feb. 26, 2013.

Dehmel et al.; Cross-model interactions of auditory and somatic inputs in the brainstem and midbrain and their imbalance in tinnitus and deafness; American Journal of Audiology: 17(2); pp. S193-S209; 40 pages; (Author Manuscript); Dec. 2008.

Digitimer Ltd.; DS2 and DS3 Isolated Stimulator (product information); 2 pgs.; downloaded from http://www.digitimer.com/research/stimulators/index.htm on Feb. 10, 2014.

Elder et al.; The cortisol awakening response—applications and implications for sleep medicine; Sleep Medicine Reviews; 18(3): pp. 215-224; Jun. 30, 2014.

Electozyme; Company and Product Information; 3 pgs.; printed Feb. 11, 2014 from http://electrozyme.com/applications/.

Engelberg et al.; Transcutaneous electrical stimulation for tinnitus; The Laryngoscope; 95(10); pp. 1167-1172; Oct. 1985.

Eschenko et al.; Noradrenergic neurons of the locus coeruleus are phase locked to cortical up-down states during sleep; Cerebral Cortex; 22(2); pp. 426-435; Feb. 1, 2012.

Fang et al.; Transcutaneous vagus nerve stimulation modulates default mode network in major depressive disorders; Biological Psychiatry; 79(4); pp. 266-273; 18 pages (Author Manuscript); Feb. 2016.

Feurra et al.; Frequency specific modulation of human somatosensory cortex; Front Psychol; 2(13); 6 pgs.; Feburary 2011.

(56) References Cited

OTHER PUBLICATIONS

Frangos et al; Non-invasive access to the vagus nerve central projections via electrical stimulation of the external ear: IMRI evidence in humans; Brain Stimulation; 8(3); pp. 624-636; 13 pages (Author Manuscript); May 2015.
Franowicz et al.; Treatment with the noradrenergic alpha-2 agonist clonidine, but not diazepam, improves spatial working memory in normal young rhesus monkeys; Neuropsychopharmacology; 21(5); pp. 611-621; Nov. 1, 1999.
Garcia-Rill et al.; Pedunculopontine arousal system physiology—implications for insomnia; Sleep Science; 8(2); pp. 92-99; Apr. 2015.
Garraway et al.; Modulatory actions of serotonin, norepinephrine, dopamine, and acetylcholine in spinal cord deep dorsal horn neurons; Journal of Neurophysiology; 86(5); pp. 2183-2194; Nov. 1, 2001.
GoFlow; tDCS Kit; product information; 9 pgs . . . ; printed Feb. 10, 2014 (http://flowstateengaged.com/).
Golestanirad et al; Analysis of fractal electrodes for efficient neural stimulation; Frontiers in Neurengineering; 6(3); 10 pages; Jul. 2013.
Gracenote; Timeline-metadata-api; 3 pages; retrieved from the internet Jul. 7, 2015; (https://github.com/gracenote/timeline-metadata-api/blob/master/README.md).
Granger et al.; Salivary alpha-amylase in biobehavioral research: recent developments and applications; Annals of the New York Academy of Sciences; 1098(1); pp. 122-144; Mar. 1, 2007.
Grindhouse Wetware; Thinking Cap; product information; 1 pg.; printed Feb. 10, 2014 (http://www.grindhousewetware.com/thinkingcap.html).
Gummadaveli et al.; Neurostimulation to improve level of consciousness in patients with epilepsy; Neurosurgical Focus; 38(6); E10, 15 pages; Jun. 2015.
Gummadavelli et al.; Neurostimulation to improve level of consciousness in patients with epilepsy. Neurosurgical Focus; 38(6); pp. E10; (manuscript version, 14 pages); Jun. 2015.
Hagenow et al.; Histamine H4 receptor antagonists: a new approach for tinnitus treatment?; Recent Patents on CNS Drug Discovery; 10(1); pp. 6-9; Apr. 2015.
Hajos et al.; Norepinephrine but not serotonin reuptake inhibitors enhance theta and gamma activity of the septo-hippocampal system; Neuropsychopharmacology; 28(5); pp. 857-864; May 1, 2003.
Hass et al.; Waking with the hypothalamus. Pflugers Arch R Eur. J. Physiol.; 463(1): pp. 31-42; Jan. 1, 2012.
Herwig et al.; Intracortical excitability is modulated by a norepinephrine-reuptake inhibitor as measured with paired-pulse transcranial magnetic stimulation; Psychopharmacology (Berl); 164(2): pp. 228-232; Nov. 18, 2002.
Hirotsu et al.; Interactions between sleep, stress, and metabolism; From physiological to pathological conditions; Sleep Science; 8(3); pp. 143-152; Nov. 2015.
Horvath et al.; Evidence that transcranial direct current stimulation (tDCS) generates little-to-no reliable neurophysiologic effect beyond MEP amplitude modulation in healthy human subjects: A systematic review; Neuropsychologia: 66: pp. 213-236; Jan. 31, 2015.
Hyvarinen et al.; Transcutaneous vagus nerve stimulation modulates tinnitus-related beta and gamma-band activity; Ear and Hearing; 36(3); pp. e76-e85; 10 pages (Author Manuscript); May 2015.
Just et al.; Bold responses to trigeminal nerve stimulation; Magnetic Resonance Imaging; 28(8): pp. 1143-1151; Oct. 31, 2010.
Kanai et al.; Frequency-dependent electrical stimulation of the visual cortex; Curr. Biol.; 18(23); pp. 1839-1843; Dec. 9, 2008.
Krahl et al.; Vagus nerve stimulation for epilepsy: a review of central mechanisms; Surgical Neurology International; 3(Suppl4); S255-S259; Oct. 2012.
Kraus et al.; Bold fMRI deactivation of limbic and temporal brain structures and mood enhancing effect by transcutaneous vagus nerve stimulation; Journal of Neural Transmission; 114(11); pp. 1485-1493; Nov. 2007.
Kubota et al.; Role of the brain stem in cardiovascular changes induced by stimulation of the trigeminal nerve; Anesthesia Progress; 36(4-5); pp. 236-237; Jul. 1989.
Lee et al.; Neuromodulation of Brain States; Neuron; 76(1): pp. 209-222. Oct. 4, 2012.
Lemaire et al.; Electrical modulation of neuronal networks in brain-injured patients with disorders of consciousness: a systematic review; Annales francaises d'anesthesie et de reanimation; 33(2); pp. 88-97; Feb. 2014.
Lenhardt; Ultrasonic hearing in humans: applications for tinnitus treatment; Tinnitus Journal; 9(2); pp. 69-75; (year of pub. sufficiently earlier than effective US filing date and any foreign priority date) 2003.
Leproult et al.; Sleep loss results in an elevation of cortisol levels the next evening; Sleep; 20(10): pp. 865-870; Oct. 1997.
Lovibond et al.; The structure of negative emotional states: Comparison of the Depression Anxiety Stress Scales (DASS) with the Beck Depression and Anxiety Inventories; Behaviour Research and Therapy: 33(3); pp. 335-343; Mar. 31, 1995.
Lu et al.; A putative flip-flop switch for control of REM sleep; Nature; 441 (7093): pp. 589-594; Jun. 1, 2006.
Magis et al.; Safety and patients' satisfaction of transcutaneous supraorbital neurostimulation (ISNS) with the Cefaly(R) device in headache treatment: a survey of 2,313 headache sufferers in the general population; The Journal of Headache and Pain, 14(1); pp. 95; (manuscript version, 8 pages) Dec. 1, 2013.
Mahalingam et al; Transbuccal delivery of 5-Aza-2'-deoxycytidine: effects of drug concentration, buffer solution, and bile salts on permeation: AAPS PharmSci Tech.; 8(3); E28-E33, 10 pages (Author manuscript); Sep. 2007.
McCreery et al.; Charge density and charge per phase as cofactors in neural injury induced by electrical stimulation; IEEE Transactions on Biomedical Engineering; 37(10); pp. 996-1001; Oct. 1990.
McGough et al.; An eight-week, open-trial, pilot feasibility study of trigeminal nerve stimulation in youth with attention-deficit/hyperactivity disorder; Brain Stimulation; 8(2); pp. 299-304; Apr. 30, 2015.
Meltzer et al; Direct comparison of two new actigraphs and polysomnography in children and adolescents; Sleep; 35(1); pp. 159-166; Jan. 1, 2012.
Michiels et al.; The effect of physical therapy treatment in patients with subjective tinnitus: a systematic review; Frontiers in Neuroscience; 10; article 545, 8 pages; Nov. 2016.
Mueller et al.; A quantitative overview of biophysical forces impinging on neural function; Physical Biology: 11(5); 051001, 13 pages; Aug. 2014.
Nash et al.; Differential activation of the human trigeminal nuclear complex by noxious and non-noxious orofacial stimulation; Human Brain Mapping; 30(11); pp. 3772-3782; Nov. 1, 2009.
Nieuwenhuis et al.; Decision making, the P3, and the locus coeruleus-norepinephrine system; Psychological Bulletin; 131(4); pp. 510-532; Jul. 2005.
Parvizi et al.; Consciousness and the brainstem; Cognition; 79(1): pp. 135-160; Apr. 30, 2001.
Paulus, W.; Transcranial electrical stimulation (IES-tDCS; tRNS, tACS) methods; Neuropsychol Rehabil.; 21(5); pp. 602-617; Oct. 2011.
Penzel et al.; Dynamics of Heart Rate and Sleep Stages in Normals and Patients with Sleep Apnea; Neuropsychopharmacology; 28(S1); pp. S48-S53; Jul. 1, 2003.
Piquet et al.; Supraorbital transcutaneous neurostimulation has sedative effects in healthy subjects; BMC Neurology: 11(1); p. 135; (manual transcript, 8 pages); Oct. 28, 2011.
Plewnia et al.; Enhancement of human cortico-motoneuronal excitability by the selective norepinephrine reuptake inhibitor reboxetine; Neuroscience Letters; 330(3); pp. 231-234; Sep. 27, 2002.
Prausnitz; The effects of electric current applied to skin: a review for transdermal drug delivery; Advanced Drug Delivery Reviews; vol. 18; pp. 395-425; Feb. 8, 1996.
Pusch et al.; Electrical stimulation of the vestibular system prevents postoperative nausea and vomiting; Acta Annesthesiol Scand.; 44(9); pp. 1145-1148; Oct. 2000.

(56) References Cited

OTHER PUBLICATIONS

Raval et al.; Trigeminal nerve ganglion stimulation-induced neurovascular reflexes in the anaesthetized cat: role of endothelin(B) receptors in cardotid vasodilatation; British Journal of Pharmacology; 126(2); pp. 485-493; Jan. 1999.
Riemann et al.; The hyperarousal model of insomnia: A review of the concept and its evidence; Sleep Medicine Reviews; 14(1); pp. 19-31; Feb. 28, 2010.
Rill et al.; Pedunculopontine arousal system physiology—implications for insomnia; Sleep Science; 8(2); pp. 92-99; Jun. 30, 2015.
Rohleder et al.; Psychosocial stress-induced activation of salivary alpha-amylase: an indicator of sympathetic activity; Annals of the New York Academy of Sciences; 1032(1); pp. 258-263; Dec. 1, 2004.
Saiote et al.; High-frequency TRNS reduces BOLD activity during visuomotor learning; PLOS one; 8(3); e59669; 8 pgs.; Mar. 2013.
Sandri et al.; Mucoadhesive and penetration enhancement properties of three grades of hyaluronic acid using porcine buccal and vaginal tissue, caco-2 cell lines, and rat jejunum; Journal of Pharmacy and Pharmacology; 56(9); pp. 1083-1090; Sep. 2004.
Sara; The locus coeruleus and noradrenergic modulation of cognition; Nature Reviews Neuroscience; 10(3): pp. 211-223. Mar. 1, 2009.
Schmidt et al.; Adrenaline rush: the role of adrenergic receptors in stimulant-induced behaviors; Molecular Pharmacology; 85(4): pp. 640-650; Apr. 1, 2014.
Schutter et al.; Brain oscillations and frequency-dependent modulation of cortical excitability; Brain Stimulation; 4(2); pp. 97-103; Apr. 2011.
Seugnet et al.; Identification of a biomarker for sleep drive in flies and humans; Proceedings of the National Academy of Sciences; 103(52); pp. 19913-19918; Dec. 26, 2006.
Shiozawa et al.; Transcutaneous vagus and trigeminal nerve stimulation for neuropsychiatric disorders: a systematic review; Arquivos de neuro-psiquiatria; 72(7): pp. 542-547; Jul. 2014.
Shore; Multisensory intelgration in the dorsal cochlear nucleus: unit responses to acoustic and trigeminal ganglion; European Journal of Neuroscience; 21(12); pp. 3334-3348; Jun. 2005.
Siegal; Brain mechanisms that control sleep and waking; Die naturwissenshaften; 91(8); pp. 355-365; Aug. 2004.
Siegel; Brain mechanisms that control sleep and waking. Naturwissenschaften; 91(8); pp. 355-365; Aug. 1, 2004.
Sjostrom et al.; Spike timing, calcium signals and synaptic plasticity; Current opinion in Neurobiology; 12(3); pp. 305-314; Jun. 2002.
Somana et al.; Cerebellar afferents from the trigeminal sensory nuclei in the cat. Brain Res.; 38(1); pp. 57-64; Jan. 1980.
Song et al.; Cortical development and remapping through spike timing-dependent plasticity; Neuron; 32(2); pp. 339-350; Oct. 2001.
STD Pharmaceutical Products; Idrostar intophoresis machine (product and use information); 9 pgs.; Dec. 2011 (printed Feb. 11, 2014 from http://www.iontophoresis.info/instructions/).
Strassman et al; Response of brainstem trigeminal neurons to electrical stimulation of the dura; Brain Research; 379(2): pp. 242-250; Aug. 6, 1986.
Tanaka et al.; Salivary alpha-amylase and cortisol responsiveness following electrically stimulated physical stress in bipolar disorder patients; Neuropsychiatric Disease and Treatment: 8; pp. 1899-1905; Jan. 1, 2013.
Terney et al.; Increasing human brain excitability by transcranial high-frequency random noise stimulation; The Journal of Neuroscience; 28(52); pp. 14127-14155; Dec. 2008.
Thoma et al.; Acute stress responses in salivary alpha-amylase predict increases of plasma norepinephrine; Biological Psychology; 91(3): pp. 342-348; Dec. 31, 2012.
Tremblay et al.; Uncertain Outcome of Prefrontal tDCS; Brain Stimulation; 7 (6): pp. 773-783; Dec. 31, 2014.
Trevizol et al.; Trigeminal Nerve Stimulation (TNS) for Generalized Anxiety Disorder: A Case Study; Brain Stimulation; 8(3): pp. 659-660; Jan. 1, 2015.
Trevizol et al.; Trigeminal Nerve Stimulation (TNS) for Post-traumatic Stress Disorder: A Case Study; Brain Stimulation; 8(3): pp. 676-678; Jan. 1, 2015.
Turi et al.; Both the cutaneous sensation and phosphene perception are modulated in a frequency-specific manner during transcranial alternating current stimulation; Restor. Neurol. Neurosci.; 31(3); pp. 275-285; Jan. 2013.
Tyler et al.; Experience-dependent modification of primary sensory synapses in the mammalian olfactory bulb; Journal of Neuroscience; 27(35); pp. 9427-9438; Aug. 2007.
Tyler et al.; Transdermal neuromodulation of noradrenergic activity suppresses psychophysiological and biochemical stress responses in humans; Scientific Reports; 5; (manual transcript, 22 pages); Feb. 8, 2015.
Tyler et al.; U.S. Appl. No. 61/550,334 entitled "Improvement of Direct Communication," filed Oct. 21, 2011.
Tyler et al.; U.S. Appl. No. 61/663,409 entitled "Device and Methods for Noninvasive Neuromodulation Using Targeted Transcranial Electrical Stimulation," filed Jun. 22, 2012.
Tyler et al.; U.S. Appl. No. 62/166,674 entitled "Systems and Methods for Suppression of Stress Responses by Transdermal Electrical Neuromodulation," filed May 26, 2015.
Tyler; The mechanobiology of brain function; Neuroscience; 13(12); pp. 867-878; Dec. 2012.
Upadhyay et al.; Noninvasive mapping of human trigeminal brainstem pathways; Magnetic Resonance in Medicine; 60(5): pp. 1037-1046; Nov. 1, 2008.
Van Stegeren et al.; Salivary alpha amylase as marker for adrenergic activity during stress: effect of betablockade; Psychoneuroendocrinology; 31(1); pp. 137-141; Jan. 31, 2006.
Vanneste et al.; Do tDCS and TMS influence tinnitus transiently via a direct cortical and indirect somatosensory modulating effect? A combined TMS-tDCS and TENS study; Brain Stimulation; 4(4); pp. 242-252; Oct. 2011.
Vanneste et al.; Noninvasive and invasive neuromodulation for the treatment of tinnitus: an overview; Neuromodulation: Technology at the Neural Interface; 15(4); pp. 350-360; Jul. 2012.
Vanneste et al.; Transcutaneous electrical nerve stimulation (TENS) of upper servical nerve (C2) for the treatment of somatic tinnitus; Experimental Brain research; 204(2); pp. 283-287; Jul. 2010.
Voisin et al.; Nociceptive stimulation activates locus coeruleus neurones projecting to the somatosensory thalamus in the rat; The Journal of Physiology; 566( 3); pp. 929-937; Aug. 1, 2005.
Voss et al.; Induction of self awareness in dreams through frontal low current stimulation of gamma activity; Nature Neuroscience; 17(6); pp. 810-812; Jun. 1, 2014.
Watson et al.; Development and validation of brief measures of positive and negative affect: the PANAS scales; Jouranl of Personality and Social Psychology; 54(6); pp. 1063-1070; Jun. 1988.
Weiss et al; Validity of Activity-Based Devices to Estimate Sleep; Journal of Clinical Sleep Medicine : 6(4); pp. 336-342; Aug. 2010.
Wu et al.; Trancutaneous induction of stimulus-timing-dependent plasticity in dorsal cochlear nucleus; Frontiers in Systems Neuroscience; vol. 9; Article 116; 10 pages, doi10.3389/fnsys.2015. 00116; Aug. 2015.
Ylikoski et al.; Non-inasive vagus nerve stimulation reduces sympathetic preponderance in patients with tinnitus; Acta Oto Laryngologica; 137(4); pp. 426-431; 6 pages, doi.org/10.1080/00016489.2016. 1269197; Apr. 2017.
Zeng et al.; Tinnitus treatment with precise and optimal electric stimulation: opportunities and challenges; Current Opinion in Otolaryngology and Head and Neck Surgery; 23(5); pp. 382-387, 12 pages, (Author Manuscript); Oct. 2015.
Pal et al.; U.S. Appl. No. 14/956,193 entitled "Transdermal electrical stimulation devices for modifying or inducing cognitive state," filed Dec. 1, 2015.
Wetmore et al.; U.S. Appl. No. 17/423,747 entitled "Systems and

(56) References Cited

OTHER PUBLICATIONS methods for craniocervical and auricular neuromodulation," filed Jul. 16, 2021.

\* cited by examiner $t_a$ = anode phase duration (μsec)
$t_c$ = cathode phase duration
$t_g$ = interphase gap duration
$t_p$ = time for one cycle period; 1/f duty cycle (%) = $(t_a + t_c)/t_p$
charge imbalance (%) = $(t_a - t_c)/(t_a + t_c)$ $t_a$ = anode phase duration (μsec)
$t_c$ = cathode phase duration
$t_g$ = interphase gap duration
$t_p$ = time for one cycle period; 1/f duty cycle (%) = $(t_a + t_c)/t_p$
charge imbalance (%) = $(t_a - t_c)/(t_a + t_c)$

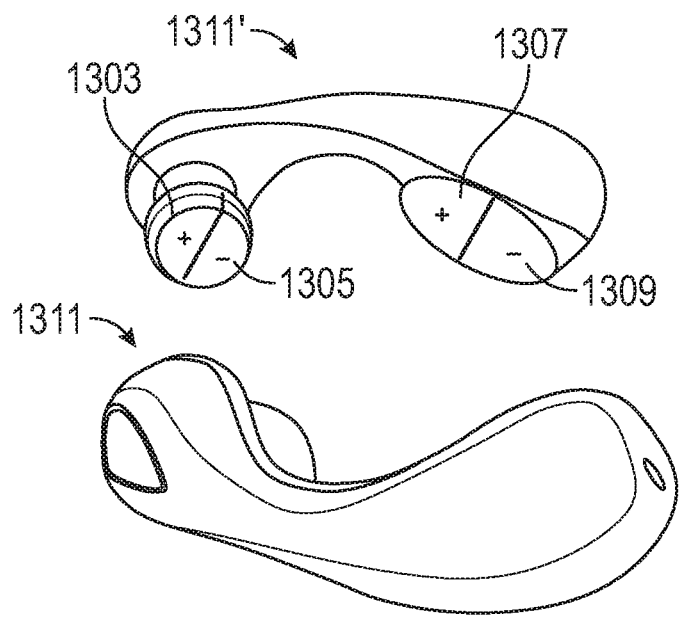
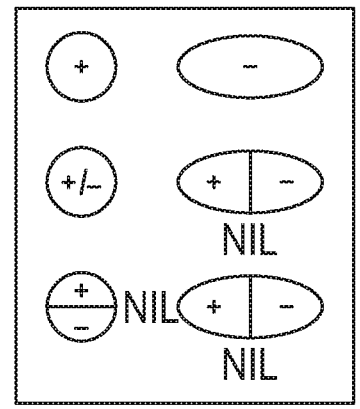
FIG. 13A
FIG. 13B
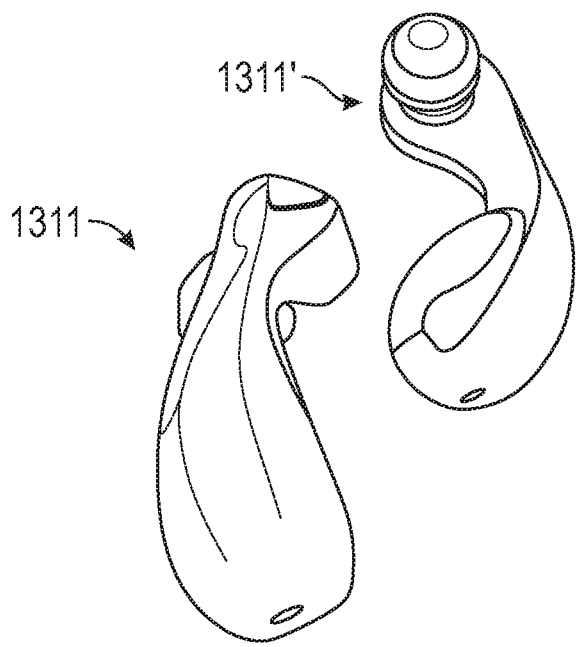
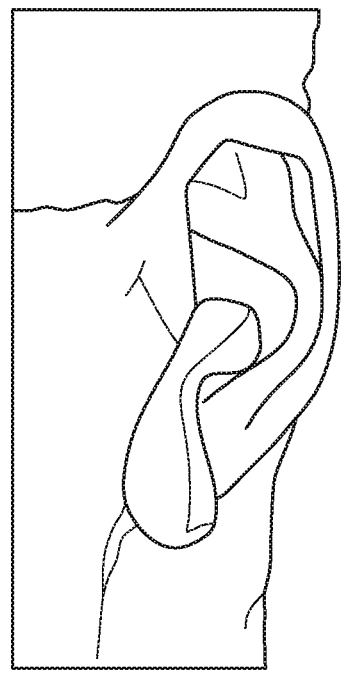
FIG. 13C

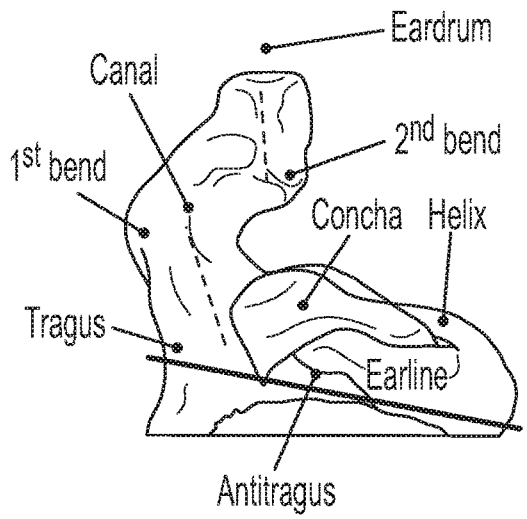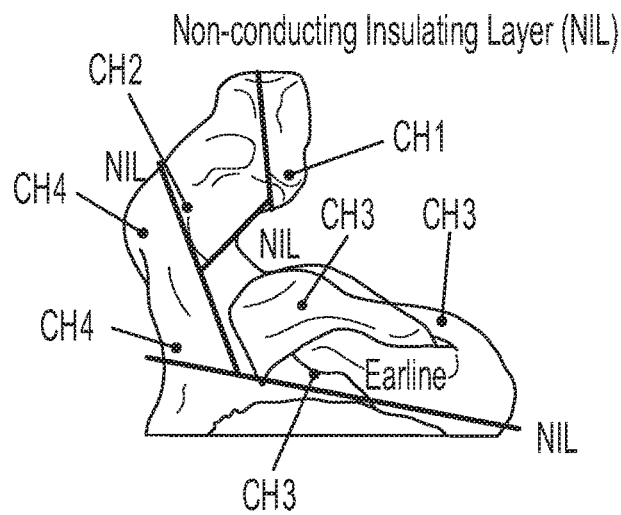
FIG. 15A  FIG. 15B
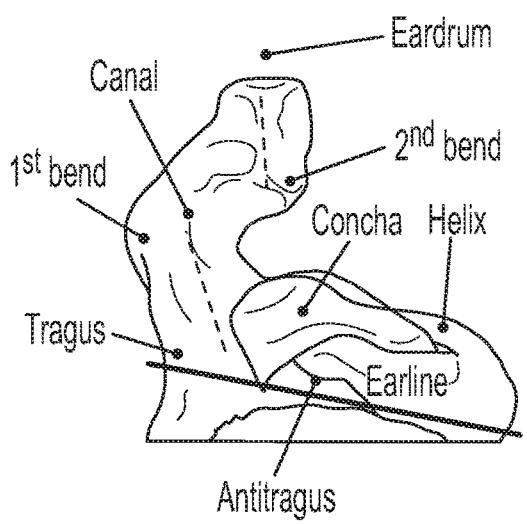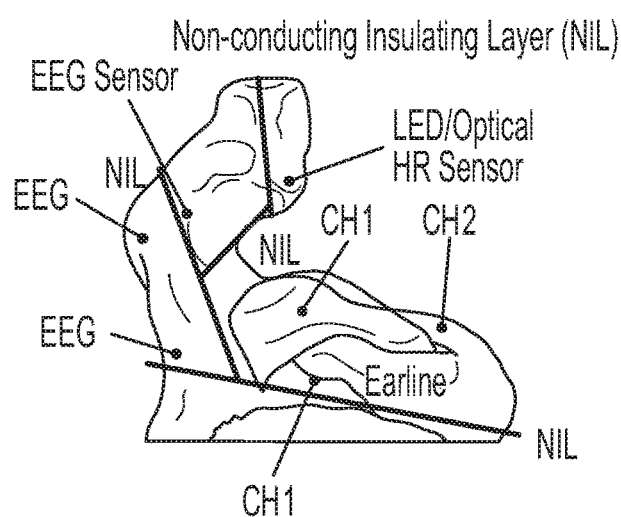
FIG. 16

```
┌─────────────────────────────────────────────────────────────────┐
│   inserting a first earpiece comprising a low-impedance hydrogel into │
│    the subject's first ear canal so that the hydrogel expands to contact │
│    a wall of the first ear canal, wherein the first hydrogel comprises a first │
│  contact for transmitting a treatment signal (e.g., a sensory biasing signal). │
│   Treatment signal may be electrical, thermal, optical, mechanical or some │
│                        combination of these.                    │
│                              2101                               │
└─────────────────────────────────────────────────────────────────┘
                                  │
                                  ▼
┌ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┐
   (optionally) inserting a second earpiece comprising a low-impedance
│  hydrogel into the subject's other ear canal so that the hydrogel expands │
     to contact a wall of the ear canal, wherein the hydrogel comprises a
│       second contact for transmitting a treatment signal (e.g., a sensory │
          biasing signal, that could be the same or different from the first
│                          treatment signal).                     │
                                2103
└ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ─ ┘
                                  │
                                  ▼
┌─────────────────────────────────────────────────────────────────┐
│   applying the treatment signal from the contact(s), and/or between │
│       multiple contacts, such as the first and second contact   │
│                              2105                               │
└─────────────────────────────────────────────────────────────────┘
```

FIG. 21A inserting a first low-impedance hydrogel into the subject's first ear canal so that the hydrogel expands to contact a wall of the first ear canal, wherein the first hydrogel comprises a first electrical contact
2121

(optionally) inserting a second low-impedance hydrogel into the subject's second ear canal so that the hydrogel expands to contact a wall of the second ear canal, wherein the second hydrogel comprises a second electrical contact
2123 applying a treatment electrical signal between the first and second electrical contacts, wherein the treatment electrical signal comprises a biphasic, pulsed signal having a frequency of greater than 200 Hz, so that the wall of the first ear canal receives a current density of greater than 2 mA/cm2
2125

FIG. 21B inserting a first compressible and thermally-conductive hydrogel into a subject's first ear canal so that the hydrogel expands to contact a wall of the first ear canal, wherein the first hydrogel comprises a first plurality of thermal delivery regions; and
2131

(optionally) inserting a second compressible and thermally-conductive hydrogel into the subject's second ear canal so that the hydrogel expands to contact a wall of the second ear canal, further comprising selectively modulating the temperature of each of a second plurality of thermal delivery regions of the second hydrogel
2133 selectively modulating the temperature of each thermal delivery region of the first plurality of thermal delivery regions with temperature profiles having a frequency of greater than 300 Hz to generate a change in temperature of between 0.1 and 3 degrees C having for a duration of between 1 second and 1 minute, wherein the temperature profiles of the thermal delivery regions are different from each other
2135

FIG. 21C identifying a need for enhanced attention to an event occurrence
2201 triggering a sensory input within a subject's ear canal within 1-7 seconds of the occurrence of the event, wherein the sensory input comprises one or more of: an electrical stimulation, a thermal stimulation, a mechanical stimulation.
2205

FIG. 22

METHODS AND DEVICES FOR MODULATION OF INTEGRATED NEURAL NETWORKS TO INFLUENCE COMPOSITE SENSORY PROCESSES

CROSS REFERENCE TO RELATED APPLICATIONS

This patent application claims priority to U.S. provisional patent application No. 62/794,394, filed on Jan. 18, 2019, titled "METHODS AND DEVICES FOR MODULATION OF INTEGRATED NEURAL NETWORKS TO INFLUENCE COMPOSITE SENSORY PROCESSES," herein incorporated by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

Apparatuses and methods for applying non-invasive auricular stimulation to modulate multiple integrated neural networks.

BACKGROUND

Despite the promise of non-invasive neuromodulation approaches, therapies using such approaches have proven difficult.

For example, although the cervical and auricular branches of the vagus nerve have been stimulated and have shown promise for therapeutic treatment of disorders such as neurosensory disorders (e.g., tinnitus), depression, anxiety, insomnia, etc., it has proven difficult to successfully treat subjects non-invasively in this manner. For example, cervical nerve stimulation, both invasive and noninvasive, has been used with limited success. Such therapies typically apply stimulation via a single channel, or have a single pulse generation circuit for delivering monophasic or biphasic symmetrical, charge balanced pulses with stimulus frequency ranges less than 200 Hertz.

Described herein are methods and apparatuses that may be used to help treat subject's including those suffering from disease and/or disorders related to sympathetic function, including neurosensory disorders (e.g., tinnitus), anxiety, depression, insomnia, and the like.

SUMMARY OF THE DISCLOSURE

The methods and apparatuses described herein relate to the application of sensory biasing signals to a subject's outer ear (including the ear canal) to treat and/or prevent a disorder in a subject. The treatment may be for a disorders in which it may be beneficial to non-invasively modulate neural networks through the ear canal (and/or other portions of the ear). Neurosensory biasing may be referred to as scrambled neuromodulation programs.

The sensory biasing signal may be electrical, thermal, optical, and/or mechanical and/or combinations of these. The methods and apparatuses may be configured to apply signals to two or more regions of the skin in contact with one or more nerves (nerve pathways, nerve clusters, nerve networks, etc.), including separately applying sensory biasing signals to different regions and therefore different nerves.

For example, described herein are external ear stimulating electrodes, including in particular multi-channel external ear stimulating electrodes (MEESE). An apparatus for electrical treatment may be applied at least within the ear canal, and may use a low-impedance (e.g., less than 2 KOhm, 1 KOhm or less, 500 Ohms or less, between 100-500 Ohms, between 200-500 Ohms, etc.), compressible hydrogel for contacting the ear canal, and may generally be adapted to deliver greater than about 2 mA/cm$^2$ when compressed and in contact with the inner ear.

Any of these apparatuses may be multi-channel, e.g., delivering sensory biasing signals to different regions (via different contacts, including electrical contacts, thermal contacts, optical contacts, mechanical contacts, etc.) within the ear canal and/or on other regions of the ear and body. In some variations different sensory biasing signals may be applied to different regions concurrently or at different times.

Thus, described herein are apparatuses, including apparatuses for delivering sensory biasing signals to a subject's ear (e.g., ear canal) that may include: a first low-impedance and compressible hydrogel configured to fit into a first ear canal so that the hydrogel expands to contact a wall of the first ear canal, wherein the first hydrogel comprises a first electrical contact; and a controller coupled with the first electrical contact, the controller configured to deliver a treatment electrical signal to the first electrical contact, wherein the treatment electrical signal comprises a biphasic, pulsed signal having a frequency of greater than 200 Hz to deliver a current density of greater than 2 mA/cm$^2$.

In some variations the sensory biasing signal may be applied between the inner ears of the subject (e.g., from a first contact within the left inner ear to a second contact within the right inner ear). For example, described herein are apparatuses, including apparatuses for delivering sensory biasing signals to a subject's ear (e.g., ear canal) that may include: a first low-impedance and compressible hydrogel configured to fit into a first ear canal so that the hydrogel expands to contact a wall of the first ear canal, wherein the first hydrogel comprises a first electrical contact; a second low-impedance and compressible hydrogel configured to fit into a second ear canal so that the hydrogel expands to contact a wall of the second ear canal, wherein the second hydrogel comprises a second electrical contact; and a controller coupled with the first and second electrical contacts, the controller configured to deliver a treatment electrical signal between the first and second electrical contacts, wherein the treatment electrical signal comprises a biphasic, pulsed signal having a frequency of greater than 200 Hz to deliver a current density of greater than 2 mA/cm$^2$.

In some variations the apparatus may be multi-modal, as described above. For example, an apparatus may include: a first low-impedance and compressible hydrogel configured to fit into a first ear canal so that the hydrogel expands to contact a wall of the first ear canal, wherein the first hydrogel comprises a first plurality of electrical contacts; a second low-impedance and compressible hydrogel configured to fit into a second ear canal so that the hydrogel expands to contact a wall of the second ear canal, wherein the second hydrogel comprises a second plurality of electrical contacts; a controller coupled with the first and second electrical contacts, the controller configured as a multi-channel controller configured to independently deliver treatment electrical signals between one or more of the first plurality of electrical contacts and one or more of the second plurality of electrical contacts, wherein the treatment electrical signals each comprise a biphasic, pulsed signal having a frequency of greater than 200 Hz to deliver a current density of greater than 2 mA/cm$^2$.

The hydrogel may have an impedance of less than 1.5 KOhms (e.g., less than 1 KOhm, less than 900 Ohms, less than 800 Ohms, between 100-600 Ohms, between 200-500 Ohms, etc.). The hydrogel may comprise a silicone hydrogel. In some variations the hydrogel may have a water content that is between 40-95% (e.g., between 40-50%, between 40-60%, between 50-60%, between 50-75%, between 60-70%, between 60-85%, between 70-80%, between 70-90%, between 80-95%, etc.). In some variations the hydrogel is a double network hydrogel.

The controller may be housed in a housing. In some variations the controller may include one more display screens, one or more memories, one or more processors, one or more power sources (e.g., batteries, capacitors, etc.), and/or one or more controls (e.g., buttons). The controller may be configured to display information for subject feedback, such as sensed subject-specific information (e.g., temperature, blood pressure, heart rate, etc.). The controller may display timing information (including time to next dose, duration of dose, etc.).

The controller may be configured to deliver the treatment signal (e.g., treatment electrical signal) for a predetermined time period of between about 0.2 minutes and 30 minutes (e.g., between about 0.5 min and 30 minutes, between about 1 min and 30 minutes, between about 5 minutes and 30 minutes, etc.).

The hydrogel may be divided up into different (and independent) contact regions. For example, the first hydrogel may include the first electrical contact and a third electrical contact that may be insulated from each other; the second hydrogel may include the second electrical contact and a fourth electrical contact. As mentioned, the controller may be configured as a multimodal controller configured to separately control the application of electrical signals between the first, second, third and fourth electrical contacts (or additional contacts). Thus, the first electrical contact may be electrically isolated from the third electrical contact.

Any of the apparatuses described herein may include a speaker configured to emit audio signals into the first ear canal when the hydrogel is worn in the first ear canal. Thus, the first (and/or second) hydrogel may be hollow, having a central region through which sound may be transmitted. In some variations the controller may be configured to drive the speaker to emit an audio signal (e.g., a tone, sequence of tones, chords, etc.) in conjunction with the treatment electrical signal.

The controller may be configured so that the frequency of the applied electrical signal is greater than about 250 Hz (e.g., 250 Hz or greater, 300 Hz or greater, 350 Hz or greater, 400 Hz or greater, 500 Hz or greater, etc.). The controller may be configured so that the current density that is greater than 2 mA/cm$^2$ (e.g., 3 mA/cm$^2$ or greater, 4 mA/cm$^2$ or greater, 5 mA/cm$^2$ or greater, 7 mA/cm$^2$ or greater, etc.). The ability of the apparatuses described herein to achieve these relatively high current densities without inducing pain may be due, in part, to the hydrogel, and in particularly to the compression of the highly conductive hydrogel within the ear canal. In any of these apparatuses, the hydrogel may be compressed by 2% or more, 5% or more, 7% or more, 8% or more, 9% or more, 10% or more, 15% or more, etc.

In general, the controller may be configured so that the treatment electrical signal has a pulse width of 150 microseconds or less (e.g., 140 microseconds or less, 130 microseconds or less, 120 microseconds or less, 110 microseconds or less, 100 microseconds or less, 80 microseconds or less, 50 microseconds or less, etc.).

Any of the apparatuses described herein may have a hydrogel having a shore A durometer of 80 or less (e.g., between 20-80, between 30-75, between 25-65, between 25-80, 40 or less, 45 or less, 50 or less, 55 or less, 60 or less, 65 or less, 70 or less, 75 or less, etc.).

In some variation the multiple contacts (e.g., electrical contacts, thermal contacts, optical contacts, mechanical contacts, etc.) may be arranged radially and/or along the length of the ear canal when the apparatus is worn. For example, the plurality of electrical contacts may be arranged radially around the first ear canal when the device is worn in the first ear canal.

One or more additional contacts (e.g., electrical, thermal, optical, mechanical, etc.) may be present on the apparatus and configured to contact other regions of the ear (e.g., the pinna, etc.) when the apparatus is worn. For example, the apparatus may include one or more external electrical contacts that may be configured to couple with an outer region of an ear containing the first ear canal, wherein the multi-channel controller is further configured to concurrently deliver additional treatment electrical signals to the one or more external electrical contacts while delivering treatment electrical signals between one or more of the first plurality of electrical contacts and one or more of the second plurality of electrical contacts.

As mentioned, the signals described herein may be applied concurrently. The signals may be identical or similar, or may be different, including different modalities (e.g., thermal, electrical, etc.). As used herein concurrently applied signals may overlap in time. The concurrently applied signals may overlap completely (e.g., may start and stop at the same time), or the second (or additional) signals may start and stop during the duration of first signal, while the first signal is ongoing. In some variations the concurrently applied signals may overlap partially, e.g., the first signal may start before the second signal and may end before or at the same time as the second signal (e.g., may be concurrently overlapping).

Also described herein are apparatuses configured to deliver thermal signals (e.g., thermal sensory biasing signals) to the subject, e.g., the subject's ear canal. In some variations the apparatus may include multiple contacts for contacting specific regions of the ear canal. For example, the apparatus may include a low-impedance and compressible hydrogel configured to fit into a first ear canal so that the hydrogel expands to contact a wall of the first ear canal, wherein the first hydrogel comprises a first plurality of thermal contacts; a plurality of thermal channels, wherein each thermal contact of the plurality of thermal contacts is coupled to one or more heating/cooling sources by a thermal channel of the plurality of thermal channels; and a controller coupled with the one or more heating/cooling sources, wherein the controller is configured as a multi-channel controller configured to independently deliver thermal treatment to each of the plurality of thermal contacts, wherein the thermal treatment comprises a temperature change of between 0.1 and 5 degrees C.

In some variations the apparatus includes additional modes (e.g., electrical, optical, mechanical), including additional contacts on/within the hydrogel or separate from the hydrogel. For example, an apparatus may include: a low-impedance and compressible hydrogel configured to fit into a first ear canal so that the hydrogel expands to contact a wall of the first ear canal, wherein the first hydrogel comprises a thermal contact and an electrical contact; a thermal channel coupling the thermal contact to a heating/cooling source; and a multi-channel controller configured to independently deliver a treatment electrical signal to the electrical contact and a treatment thermal signal to the thermal contact, wherein the treatment electrical signal comprises a biphasic, pulsed signal having a frequency of greater than 200 Hz to deliver a current density of greater than 2 mA/cm2 and wherein the treatment thermal signal comprises a temperature change of between 0.1 and 5 degrees C.

The one or more heating/cooling sources may be any appropriate heating and/or cooling source. For example, the heating/cooling source may be a thermoelectric cooler (TEC). In some variations the heating/cooling source may be a resistive heater. A heating/cooling source may be an evaporation-based cooling, a fan cooler, etc. The signal used to drive the heating/cooling may be similar to that used to drive the electrical signal (e.g., in frequency, duration, pulse width, etc.) or may be different. For example, the controller may be configured to apply a drive signal comprising a pulsed signal having a frequency of greater than 200 Hz to the one or more heating/cooling sources.

In some variations the plurality of thermal contacts are arranged radially around the first ear canal when the device is worn in the first ear canal. Alternatively or additionally, the plurality of thermal contacts may be arranged down the length of a projection (e.g., post, shaft, etc.) extending into the ear canal over which the hydrogel may be positioned. The projection may be hollow and/or may house a speaker, one or more sensors, etc. Any of the apparatuses described herein may include a projection configured to fit into the ear canal over which the hydrogel may be coupled.

The apparatus may include one or more external thermal contacts configured to couple with an outer region of an ear when the apparatus is worn in the ear canal, wherein the multi-channel controller is further configured to concurrently deliver additional thermal treatment to the one or more external thermal contacts while delivering thermal treatment to the first plurality of thermal contacts.

As mentioned above, the hydrogel may comprise a silicone hydrogel. The same electrically conductive hydrogel may also be configured to have a high thermal conductivity.

In general, one or more contacts or wires (e.g., thermal channels) may be configured to couple the thermally contacts of the hydrogel with the heater/cooler and the controller. For example, the apparatus may include one or more thermally conductive wires. Similar to the electrically conductive regions, the projection (e.g., post) may include a contact or plate that couples through the hydrogel with the thermal contacts.

The apparatuses described herein may include one or more thermal sensors configured to determine a temperature within the ear canal.

In general, the temperature applied by the thermal contact to the skin (e.g., within the ear canal) may be between about 0.1 degrees C. and 5 degrees C. (e.g., between 0.1 degrees C. and 4 degrees C., between 0.5 degrees C. and 5 degrees C., between about 0.1 degrees C. and 3 degrees C., etc.). This may include cooling and/or heating. The temperature difference may be relative to the temperature of the inner ear (body temperature). In some variations the controller is configured to deliver the thermal treatment for a predetermined time period, e.g., between about 0.2 minutes and 30 minutes.

As mentioned, any of these apparatuses may include a speaker configured to emit audio signals into the first ear canal when the first hydrogel is worn in the first ear canal. The controller may be configured to drive the speaker to emit an audio signal in conjunction with the thermal treatment.

Also described herein are method of treatment. These methods typically include methods of applying sensory biasing signal(s) to a subject. Treatment may include prevention (e.g., preventative treatments) and/or curative treatments. The subject may be a human or animal (e.g., mammal).

In some variations the method of treatment includes methods of applying sensory biasing signals between the ear canals (e.g., right and left ear canals). For example a method of treatment may include: inserting a first low-impedance hydrogel into the subject's first ear canal so that the hydrogel expands to contact a wall of the first ear canal, wherein the first hydrogel comprises a first electrical contact; inserting a second low-impedance hydrogel into the subject's second ear canal so that the hydrogel expands to contact a wall of the second ear canal, wherein the second hydrogel comprises a second electrical contact; and applying a treatment electrical signal between the first and second electrical contacts, wherein the treatment electrical signal comprises a biphasic, pulsed signal having a frequency of greater than 200 Hz, so that the wall of the first ear canal receives a current density of greater than 2 mA/cm$^2$.

In some variations applying the treatment comprises applying at a current density that is at or below a sensory threshold for feeling the applied treatment electrical signal. Thus, the subject may not be able to feel the applied sensory biasing signal(s) consciously.

The treatment may be, for example, a treatment for improving sleep, including but not limited to treating insomnia. For example, the treatment may be a method of treating insomnia and the subject is an insomniac subject. A method of treating insomnia may include: inserting a first low-impedance hydrogel into the subject's first ear canal so that the hydrogel expands to contact a wall of the first ear canal, wherein the first hydrogel comprises a first electrical contact; inserting a second low-impedance hydrogel into the subject's second ear canal so that the hydrogel expands to contact a wall of the second ear canal, wherein the second hydrogel comprises a second electrical contact; and increasing drowsiness by applying a treatment electrical signal between the first and second electrical contacts for at least 10 minutes before the subject's target bedtime, wherein the treatment electrical signal comprises a biphasic, pulsed signal having a frequency of greater than 200 Hz, so that the wall of the first ear canal receives a current density of >2 mA/cm$^2$. The method may further include removing the first and second electrical contacts before the subject's bedtime after applying treatment. For example, the treatment electrical signal may be applied for 10 minutes or more before the subject goes to bed.

In some variations the methods may be method of treating a neurosensory disorder, such as, but not limited to, tinnitus. For example, a method of treating a neurosensory disorder may include: inserting a first low-impedance hydrogel into the subject's first ear canal so that the hydrogel expands to contact a wall of the first ear canal, wherein the first hydrogel comprises a first electrical contact; inserting a second low-impedance hydrogel into the subject's second ear canal so that the hydrogel expands to contact a wall of the second ear canal, wherein the second hydrogel comprises a second electrical contact; and reducing the severity of the neurosensory disorder by applying a treatment electrical signal between the first and second electrical contacts, wherein the treatment electrical signal comprises a biphasic, pulsed signal having a frequency of greater than 200 Hz, so that the wall of the first ear canal receives a current density of >2 mA/cm$^2$. The treatment may be a tinnitus treatment (e.g., in or for a subject suffering from tinnitus). In any of the methods described herein (including but not limited to methods of treating tinnitus), an audio signal (e.g., audio tone, sequence of tones, phrase, chord, music, speech, etc.) may be delivered to the subject concurrent with the delivery of the treatment electrical signal.

As used herein a subject may refer to a patient. The subject may be any subject that may benefit from the methods described herein. A subject may be diagnosed or undiagnosed with a condition to be treated using the methods and apparatuses described herein. The subject may be human or non-human (e.g., mammalian).

The methods described herein may also be adapted for treating anxiety or depression. For example, a method of treating anxiety may include: inserting a first low-impedance hydrogel into the subject's first ear canal so that the hydrogel expands to contact a wall of the first ear canal, wherein the first hydrogel comprises a first electrical contact; inserting a second low-impedance hydrogel into the subject's second ear canal so that the hydrogel expands to contact a wall of the second ear canal, wherein the second hydrogel comprises a second electrical contact; and applying a treatment electrical signal between the first and second electrical contacts, wherein the treatment electrical signal comprises a biphasic, pulsed signal having a frequency of greater than 200 Hz, so that the wall of the first ear canal receives a current density of >2 mA/cm2, thereby reducing the subject's anxiety.

A method of treating depression in a subject may include: inserting a first low-impedance hydrogel into the subject's first ear canal so that the hydrogel expands to contact a wall of the first ear canal, wherein the first hydrogel comprises a first electrical contact; inserting a second low-impedance hydrogel into the subject's second ear canal so that the hydrogel expands to contact a wall of the second ear canal, wherein the second hydrogel comprises a second electrical contact; and applying, in a series of repeated treatments, a treatment electrical signal between the first and second electrical contacts, wherein the treatment electrical signal comprises a biphasic, pulsed signal having a frequency of greater than 200 Hz, so that the wall of the first ear canal receives a current density of >2 mA/cm2, thereby reducing the severity of the subject's depression.

Thus, the methods described herein may include methods for the treatment of one or more of: anxiety, depression or a neurosensory disorder.

Any of these methods may include applying a second electrical signal between the first and second low impedance hydrogels from a third electrical contact that is separate from a first electrical contact, wherein the second electrical signal comprises comprise a biphasic, pulsed signal having a frequency of greater than 200 Hz. This signal may be applied concurrently or before or after the application of the first electrical signal. For example, the second electrical signal may be applied concurrently with the treatment electrical signal. The second electrical signal maybe different than the treatment electrical signal.

As mentioned above, the frequency may be greater than 250 Hz (e.g., greater than 300, greater than 350, greater than 400, greater than 450, etc.). The current density may be 2.5 mA/cm$^2$ or greater, 3 mA/cm$^2$ or greater, 4 mA/cm$^2$ or greater, 5 mA/cm$^2$ or greater, etc. The treatment electrical signal has a pulse width of 150 microseconds or less.

In general in any of the methods described herein the contacts (thermal, electrical, etc.) may be configured to be positioned at a predetermined position within the ear canal. For example, the first contact may be configured to be positioned at least 5 mm from the opening into the ear canal (e.g., >5 mm from the opening, 7.5 mm or greater from the opening, 10 mm or greater from the opening, 12.5 mm or greater from the opening, 15 mm or greater from the opening, etc.). In some variations the contacts are configured to be positioned (when the apparatus is worn and/or the method performed) with the contacts at least halfway (e.g., 50% or more) the distance from the opening of the ear canal to the bend in the ear canal (from the tragus to the first bend), such as 55% or more, 60% or more, 65% or more of the distance to the first bend.

Any of these methods and apparatuses may also include applying an electrical stimulation to the subject's neck concurrently with applying the sensory biasing signal to the ear(s). For example, any of these methods may include concurrently applying the electrical stimulation to the back of the subject's neck. Alternatively or additionally, and of these methods may include applying sensory biasing signals to the ear canal and applying sensory biasing signals to one or more regions of the auricle of the subject's ear (concurrently or sequentially). Sensory biasing signals applied to the auricle and/or neck (in some variations applied electrical stimulation) may be different than the sensory biasing signal applied in the ear canal (e.g., treatment electrical signals).

The treatments described herein may be applied one or more times per day, for one or more days. For example, a series of repeated treatments may include a series of treatments separated by less than 3 days (e.g., 2 days or less, 1 day or less, 12 hours or less, 8 hours or less, 6 hours or less, etc.). Treatment may be in the mornings and/or at night.

Applying the treatment may comprise applying at a current density that is at or below a sensory threshold for feeling the applied treatment electrical signal. Any of these methods may include delivering an audio signal to the subject concurrent with the delivery of the treatment electrical signal.

As mentioned, in some variations the methods may include thermal sensory biasing signals. For example a method of treatment may include: inserting a first compressible and thermally-conductive hydrogel into the subject's first ear canal so that the hydrogel expands to contact a wall of the first ear canal, wherein the first hydrogel comprises a first plurality of thermal delivery regions; and selectively modulating the temperature of each thermal delivery region of the first plurality of thermal delivery regions with temperature profiles having a frequency of greater than 300 Hz to generate a change in temperature of between 0.1 and 3 degrees C. having for a duration of between 1 second and 1 minute, wherein the temperature profiles of the thermal delivery regions are different from each other. The method may include inserting a second compressible and thermally-conductive hydrogel into the subject's second ear canal so that the hydrogel expands to contact a wall of the second ear canal, further comprising selectively modulating the temperature of each of a second plurality of thermal delivery regions of the second hydrogel.

In some variations the first and second ear canal are concurrently modulated using the same temperature profiles. Alternatively, the first and second ear canal may be concurrently modulated using different temperature profiles.

In any of these methods, the sensory biasing signals may be scrambled or randomized as part of the treatment. For example, the sensory biasing signals applied between different target regions (or to the same target region at different times) may be different in frequency, pulse width, pulse duration, interpulse distance, pulse amplitude/signal amplitude, etc. The sensory biasing signals may be non-repeating.

In variations in which temperature sensory biasing signals are applied, the method may include sensing the temperature within the ear canal. The applied sensory biasing signal may be derived or based on the sensed temperature from within the ear canal. For example, the temperature applied by the signal may be +/− the temperature of the ear canal by within 0.1 to 5 degrees C., etc. Any of these methods may include adjusting the temperature profiles based on the sensed temperature. The applied sensory biasing temperature signal may be heating or cooling (or both heating and cooling). As mentioned, in some variations the methods may include applying a signal (e.g., as sensory biasing signal) to the subject's neck, including cooling or warming the subject's neck (e.g., cooling or warming the back of the subject's neck), and/or one or more regions of the auricle of the subject's ear.

As mentioned above, the treatment may be for improving or enhancing sleep, including but not limited to treating insomnia (e.g., in an insomniac subject). For example, the selective modulating the temperature of each thermal delivery region may be applied for 10 minutes or more before the subject goes to bed. The treatment may be a method of treating one or more of: anxiety, depression or a neurosensory disorder. For example, the treatment may be a method of treating tinnitus.

As mentioned, any of the thermal treatments may also include applying an electrical signal within the ear canal concurrently with the selective modulation of the temperature of each thermal delivery region. The hydrogel may be any of the hydrogels described above. The thermal conductivity may be, for example, between 0.1 to 1 W/(m*K) (e.g., between about 0.2 to 0.8, between about 0.3 to 0.8, between about 0.4 to 0.8, between about 0.5 to 0.9, between about 0.55 to 0.9, greater than 0.25, greater than 0.3, greater than 0.35, greater than 0.4, greater than 0.45, greater than 0.5, etc.).

As mentioned, the plurality of thermally conductive regions may be arranged radially around the first ear canal when the first hydrogel is positioned in the subject's ear canal and/or down the length of the ear canal.

For example, a method of treating insomnia may include: inserting a first compressible and thermally-conductive hydrogel into the subject's first ear canal so that the hydrogel expands to contact a wall of the first ear canal, wherein the first hydrogel comprises a first plurality of thermal delivery regions; and selectively modulating the temperature of each thermal delivery region of the first plurality of thermal delivery regions with temperature profiles having a frequency of greater than 300 Hz to generate a change in temperature of between 0.1 and 3 degrees C. having for a duration of between 1 second and 1 minute, wherein the temperature profiles of the thermal delivery regions are different from each other, thereby increasing drowsiness and/or sustained sleep duration. The method may include removing the first and second electrical contacts before the subject's bedtime after applying treatment. The treatment may be applied for 10 minutes or more before the subject goes to bed.

For example, a method of treating anxiety may include: inserting a first compressible and thermally-conductive hydrogel into the subject's first ear canal so that the hydrogel expands to contact a wall of the first ear canal, wherein the first hydrogel comprises a first plurality of thermal delivery regions; and selectively modulating the temperature of each thermal delivery region of the first plurality of thermal delivery regions with temperature profiles having a frequency of greater than 300 Hz to generate a change in temperature of between 0.1 and 3 degrees C. having for a duration of between 1 second and 1 minute, wherein the temperature profiles of the thermal delivery regions are different from each other, thereby reducing the subject's anxiety.

A method of treating a neurosensory disorder may include: inserting a first compressible and thermally-conductive hydrogel into the subject's first ear canal so that the hydrogel expands to contact a wall of the first ear canal, wherein the first hydrogel comprises a first plurality of thermal delivery regions; and reducing the severity of the neurosensory disorder by selectively modulating the temperature of each thermal delivery region of the first plurality of thermal delivery regions with temperature profiles having a frequency of greater than 300 Hz to generate a change in temperature of between 0.1 and 3 degrees C. having for a duration of between 1 second and 1 minute, wherein the temperature profiles of the thermal delivery regions are different from each other. In some variations the method is a method of treating tinnitus.

A method of treating depression in a subject may include: inserting a first compressible and thermally-conductive hydrogel into the subject's first ear canal so that the hydrogel expands to contact a wall of the first ear canal, wherein the first hydrogel comprises a first plurality of thermal delivery regions; and applying a series of repeated treatments, by selectively modulating the temperature of each thermal delivery region of the first plurality of thermal delivery regions with temperature profiles having a frequency of greater than 300 Hz to generate a change in temperature of between 0.1 and 3 degrees C. having for a duration of between 1 second and 1 minute, wherein the temperature profiles of the thermal delivery regions are different from each other, thereby reducing the severity of the subject's depression.

In general, and as mentioned, also described herein are apparatuses configured to deliver a treatment as described above in any of methods discussed herein.

The methods and apparatuses may also or alternatively be used for modulating attention. This may be used to improve performance, learning, or any task in which it would be beneficial to enhance attention. For example, described herein are methods of improving attention comprising: identifying a need for enhanced attention to an event occurrence; an triggering a sensory input within a subject's ear canal within 1-7 seconds of the occurrence of the event, wherein the sensory input comprises one or more of: an electrical stimulation, a thermal stimulation, a mechanical stimulation.

In general, the identification of the need for attention may include manually identifying the need for enhanced attention to the event occurrence. Alternatively, identifying the need may comprise automatically (or semi-automatically) identifying the need for enhanced attention to the event occurrence. For example, identifying the need may comprise detecting a lack of attention in the subject based one or more of: electroencephalogram (EEG) data, eye tracking data, and electrooculographic signal (EOG). The need may be manually identified (or semi-automatically identified) by a third party (or in some variations, the user) triggering a need for additional attention by predicting when the third party would like the subject to pay additional (or particular) attention. In some variations a computer system may be configured to, based on contextual input, such as identifying key phrases or words from a spoken conversation, that the subject should pay additional attention.

In some variations, the sensory input within the subject's ear canal is triggered within 2-5 seconds of the occurrence of the high-attention event (e.g., 2-5 seconds before the additional attention is desired). This may allow time for the subject to process and respond to the sensory input.

Triggering the sensory input may include triggering a sub-sensory threshold sensory input. For example, triggering the sensory input within the subject's ear canal may-comprises comprise applying a temperature change of between about 0.1 and 5 degrees (e.g., between 0.1 and 3 degrees, between 0.1 and 2 degrees, between 0.1 and 1 degree, etc.). In any of these methods and apparatuses, the sensory input may include thermal stimulation and may comprise modulating the temperature at a frequency of greater than 300 Hz to generate a change in temperature of between 0.1 and 5 degrees C. (e.g., between 0.1 and 4 degrees C., between 0.1 and 3 degrees C., between 0.1 and 2 degrees C., between 0.1 and 1 degree C., etc.). The sensory input may comprise electrical stimulation, the electrical stimulation may comprise a biphasic, pulsed signal having a frequency of greater than 200 Hz, so that the wall of the first ear canal receives a current density of greater than 2 mA/cm$^2$.

In any of these variations the sensory input may be varied, e.g., by changing the sensory input every 10-60 seconds following triggering. In some variations, the method may further include switching the sensory input between one or more different locations within the subject's ear canal or outer ear every 10-60 seconds following triggering. Thus, any of these methods may include switching the sensory input between one or more of electrical stimulation, a thermal stimulation, and a mechanical stimulation every 10-60 seconds following triggering. In general, triggering may include applying the sensory input within both of a subject's ear canals or within just one of the subject's ear canals.

BRIEF DESCRIPTION OF THE DRAWINGS

A better understanding of the features and advantages of the methods and apparatuses described herein will be obtained by reference to the following detailed description that sets forth illustrative embodiments, and the accompanying drawings of which:

In FIGS. 1A and 1B, several nerves, including branches of cranial nerve V (trigeminal nerve), cranial nerve VII (facial nerve), and cranial nerve X (vagus nerve), as well as the greater auricular nerve and auriculotemproal nerve, which are branches of the cervical plexus (spinal nerves C2 and C3) innervate the pinna and external ear. These nerves carry motor signals and sensory signals from and to the brain. Several of these nerves provide communication between the external world and key arousal regions of the brain stem including the reticular nucleus, locus coeruleus and nucleus of the solitary tract. FIG. 1C shows the outer ear is a highly vascularized structure to provide oxygen to the nerves through neurovascular coupling. The activity of nerves influences the activity of blood vessels and capillary and the activity of blood vessels and capillaries can also affect the activity of nerves. These dynamics can influence larger changes in vascular activity including blood pressure and heart rate given the tight coupling of the trigeminal and vagus nerves to cardiovascular and cerebrovascular activity. Through vascular signaling mechanisms and vascular coupling the modulation of local blood flow in the ear by the methods and apparatuses described herein, which may deliver pulsed electrical stimuli having a frequency higher than about 200 Hertz to exert an effect on cochlear blood flow. The apparatuses described herein may target any of the nerves illustrated through the outer ear region and ear canal. This may permit peripheral neurosensory biasing as described herein. As a non-limiting example, this may be used to treat (including to prevent) a neurosensory disorder, such as tinnitus.

In FIG. 3A, the illustration shows neurosensory influences on cortical gain and composite auditory processing; for example, hearing is a composite process that is regulated by multiple sensory and physiological systems. FIG. 3A shows how signals from cranial nerves and cervical nerves work in coordination with classical auditory pathways to ensure appropriate gain control of auditory information processed by the cortex as a perception. Note the scaled (normalized) synaptic weights of the greater auricular nerve (C2-C3), the trigeminal nerve, the auricular branch of the vagus, the facial nerve, and the vestibulocochlear (auditory) nerves are illustrated as equal in the periphery under baseline conditions of normal functioning. In contrast, FIG. 3B shows organic dysfunction, injury or damage, or age-related decline can lead to aberrant gains of auditory information resulting in hearing disorders like tinnitus or hearing loss as illustrated. A disruption to the peripheral nerve synaptic weights giving rise to the composite hearing process leads to disrupted activity since homeostatic regulation and neural integrators experience a loss of function beginning at the earliest stages of auditory information processing at the soft tissues of the external ear, head, face, and neck that have receptors and properties for sensing mechanical waves that eventually reach the cochlea for conversion into neural signals representing sound. The methods and apparatuses described herein include a MEESE (e.g., a neurosensory bias interface) configured to deliver multisite high-frequency, temporally dispersed modulation of cranio-auricular and craniocervical sites to improve upon existing neurostimulation methods and devices known in the art for treating hearing disorders like (but not limited to) tinnitus.

FIG. 7A illustrates a convention waveform which has been used to treat tinnitus with TENS applications. These pulses are typically monophasic or symmetrical biphasic, charge-balanced pulses with no interphase delay or gap as illustrated ($I_{peak}$=peak current; $t_a$=anodic phase pulse width in time; $t_c$=cathodic phase pulse width in time). They typically have implemented pulse frequencies in transdermal neurostimulation or TENS applications that are less than 150 Hertz. FIG. 7B illustrates one example of a waveform that may be used with an apparatus (such as, but not limited to) a MEESE interface or neurosensory biasing interface for introducing scrambled or punctate neuromodulation. These waveforms may be used for other pulsed neurostimulation approaches to influence, e.g., composite hearing processes using pulsed stimuli having an anodic and cathodic phase not symmetric in time or amplitude, and may be charge balanced with an interphase gap or delay as illustrated. In this example, pulse frequencies may be higher than about 200 or 300 Hertz (Hz). In some embodiments a minimal interphase gap duration greater to or about 10 microseconds, such as 75, 100, 150, 300, or 500 microseconds may be used to separate anodic and cathodic phases. In other embodiments pulse gaps may be less than or equal to 1 millisecond. Charge balancing of neurosensory biasing or punctate neuromodulation stimuli in embodiments of the inventions described may be achieved by using an anodic phase amplitude that is greater than the cathodic phase which is longer than the anodic phase as illustrated. For example, the anodic phase may be four times the amplitude of the cathodic phase, but the cathodic phase may be four times as long in time as the anodic phase, resulting in a charge balanced stimulus. These pulse strategies may be used, e.g., to treat tinnitus or to alter auditory perceptions using transdermal neurostimulation methods as described herein. FIG. 7C shows a symmetric, biphasic and charge balanced signal. FIG. 7D shows an example of an asymmetric, charge balanced signal.

FIG. 8A illustrates waveforms which have been conventionally used to treat tinnitus with TENS applications and are shown as biphasic, charge balanced, symmetrical pulses with no interphase gap. FIG. 8B illustrates pulse strategies and shapes that may be used as described here. FIGS. 8C and 8D illustrate additional strategies for introducing functional neurosensory bias to alter composite sensory processes. For example, FIG. C shows the modulation of high frequency carrier pulses (for example at 1, 2, 5, 8, or 10 kilohertz) that are burst modulated, amplitude modulated, or pulse modulated at lower frequencies such as 1, 2, 5, 10, 40, or 80 Hertz. Burst, pulse, or amplitude modulation shapes may be lower frequency than the carrier frequency and have a sinusoidal, triangular, stair-cased, or arbitrary form as shown in FIG. 8D.

FIGS. 13A-13C show another example of an apparatus (e.g., configured as an MEESE), configured as wearable headphones. FIG. 13A shows the two earpieces of the apparatus; FIG. 13B shows possible configurations of the electrical contacts of the apparatus. FIG. 13C shows one earpiece of the apparatus worn in an ear. In this example, the apparatus includes two bipolar stimulating electrodes per headphone where one channel is designed to stimulate the external acoustic meatus and the other channel designed to stimulate the ear lobe in order to modulate the activity of the vagus and/or trigeminal nerves and the greater auricular nerve (e.g., C2-C3) simultaneously or nearly simultaneously. The portion of the headset designed to deliver pulsed electrical stimuli may be made of a conductive polymer like a conductive silicon or conductive urethane or other biocompatible conductive material; in particular, the material may be a conductive hydrogel. MEESE electrodes may be constructed using non-conductive insulating layers (NIL) as shown and can be made of non-conductive materials acting as a shim between active bipolar electrode regions.

FIGS. 14A-14B illustrate examples of the anatomy to which the apparatuses described herein may be configured to conform. FIG. 14C illustrates one method of manufacturing a Multi-channel External Ear Stimulating Electrode (MEESE), e.g., using a personalized or normalized ear molding or scanned approach. For some embodiments described herein, an ear mold may be use to manufacturing customized or personalized multi-channel external ear stimulating electrodes. Injection-based molds and/or casts of the outer ear including entry into the external auditory meatus are illustrated in FIG. 14B. The shape of a resulting mold is shown. Either custom molds or other casting and molding processes including those using three-dimensional printing methods may be used to fabricate multi-channel external ear stimulating electrodes. In other embodiments laser or ultrasonic scanning methods may be used for capturing the shape and contours of the external ear to aid in developing personalized or customized or generalized external ear stimulating electrodes consisting of one or more transdermal neurostimulation channels (including those comprising neurovascular units of the neurovascular triad).

FIGS. 15A and 15B illustrate examples of methods of making custom Multi-channel External Ear Stimulating Electrode (MEESE). A custom constructed MEESE containing four stimulation channels (shown) may be made using the molds provided. In this example, the custom apparatus may be constructed using a conductive material fabricated from injection molds or scans of an individual's ear shape; the electrode are arranged long the length of the ear canal, as shown (FIG. 15B).

FIG. 16 shows another example of an apparatus, configured as a multi-sensor Auricular Transducer Electrode (MATE). This variation is a specific embodiment of a MEESE having multiple sensors and at least one neurostimulation channel constructed as a personalized neurosensory biasing interface or MATE.

FIG. 17A illustrates a method of modulating cervical spinal nerves in combination with peripheral nerves that innervating the external ear or peri-auricular regions of the ear from sites or near sites as illustrated by checker-box filled circular areas. FIG. 17B shows one embodiment of an apparatus that may perform this method, including earpieces and a neckband worn around the dorsal region of the neck in a manner that enabled simultaneous transdermal stimulation of the cervical plexus and the external ear. FIGS. 17C and 17D illustrate exemplary prototypes of these apparatuses.

In FIG. 19 the apparatus includes a base unit connected to pair of ear contacts (e.g., earphones).

FIG. 21A schematically illustrates one example of a method of treating a subject as described herein.

FIG. 21B schematically illustrates another example of a method of treating a subject using electrical sensory biasing signals as described herein.

FIG. 21C schematically illustrates another example of a method of treating a subject using thermal sensory biasing signals as described herein.

FIG. 22 schematically illustrates a method of enhancing attention as described herein.

DETAILED DESCRIPTION

Figures 1A, 1B, 1C:
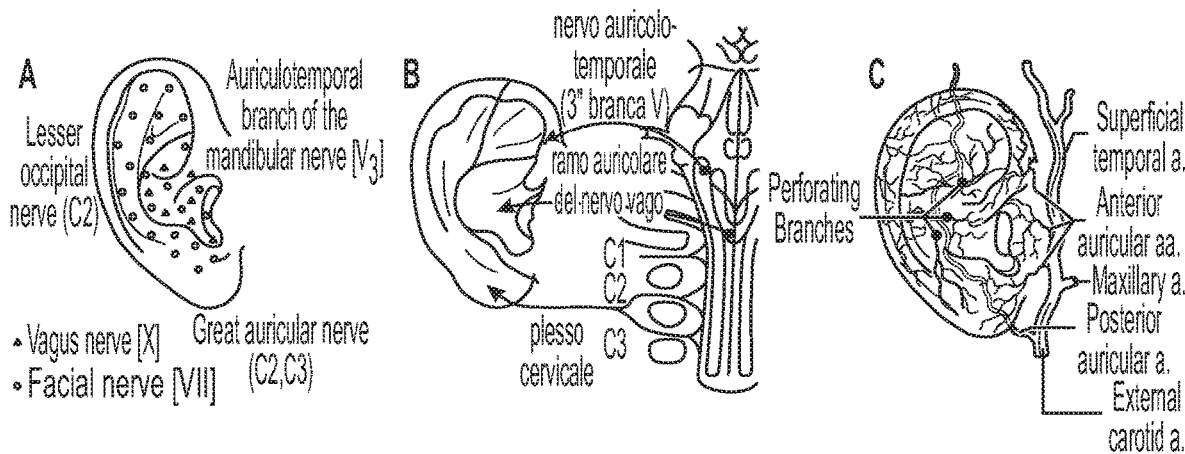
FIGS. 1A-1C illustrates the neuronal and neurovascular structure of the outer ear.
Figure 2A:
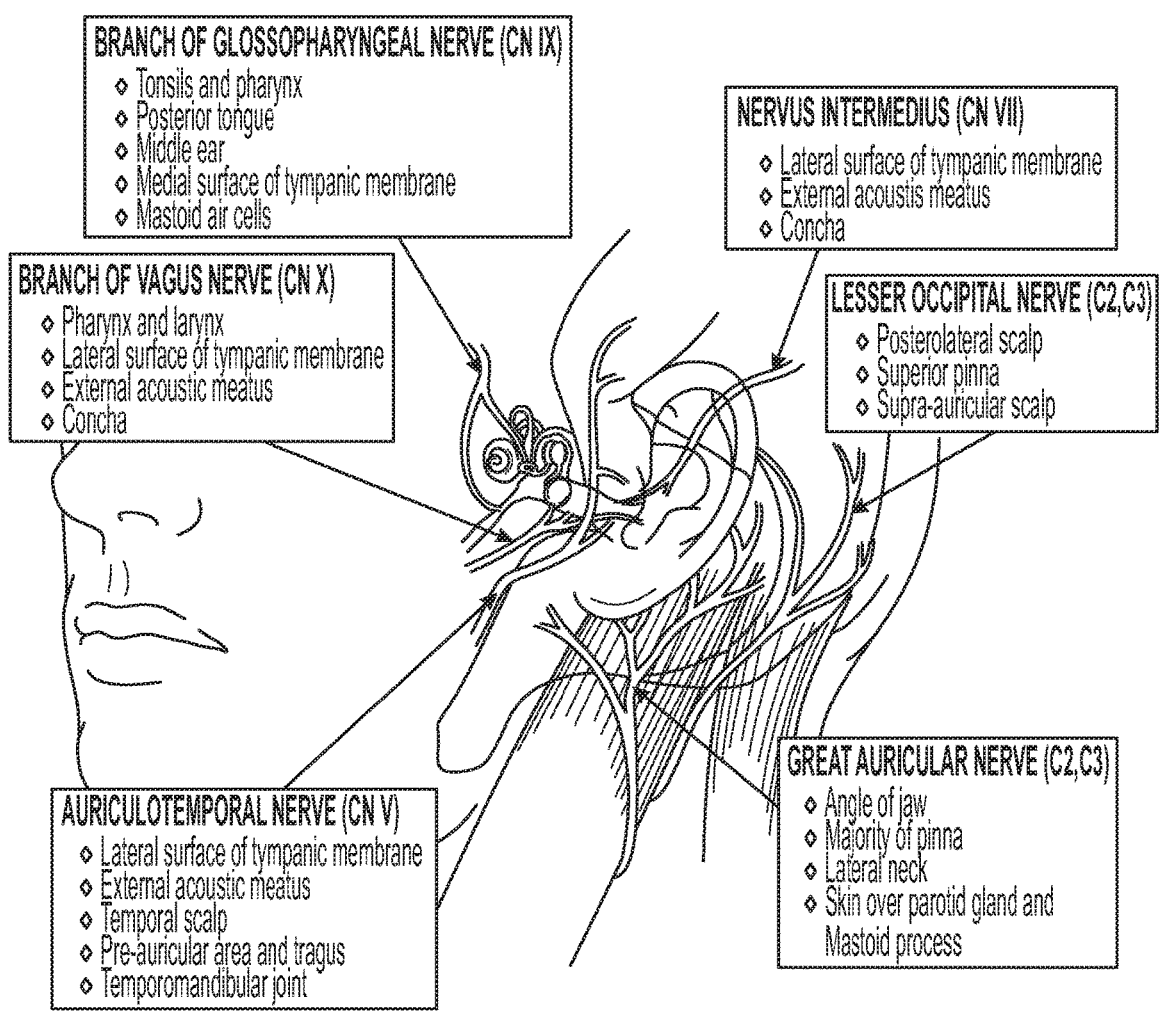
FIGS. 2A-2C illustrate pathways from the external ear, face, head, and neck that may be use by the methods and apparatuses described herein to achieve functional neurosensory biasing of cranio-cervical networks. This may influence auditory gain mechanisms and composite auditory processing. For example, the methods described herein may introduce neurosensory bias by interfacing with cranial nerves (CN) and cervical nerves through an apparatuses described herein, including external ear stimulating electrode, such as a multi-channel external ear stimulating electrode or MEESE, apparatuses. The external ear (including the external auditory canal, or ear canal) may be used to modulate several distinct sensory nerve pathways of cranial and cervical origins with high frequency pulsed stimuli, e.g., having a primary frequency greater than about 250 Hertz (and in some variations less than about two kilohertz or higher). Some variations may include a bipolar MEESE design for modulating the trigeminal nerve (CN branch V3) and the vagus nerve (CN X) from within the external acoustic meatus. A neurosensory biasing interface as described herein may be configured to enable additional MEESE channels and contact sites for simultaneously modulating the activity of the greater auricular nerve (C2-C3) in targeting the pinna and the facial nerve by targeting the concha. Modulating these sites may allow altering composite auditory processing or the perception of sound by altering local blood flow of the ear including cochlear blood flow, as well as by altering or biasing the filtering properties and contributions of neural activity in certain brainstem nuclei like the locus coeruleus on auditory gain control.
Figure 2B:
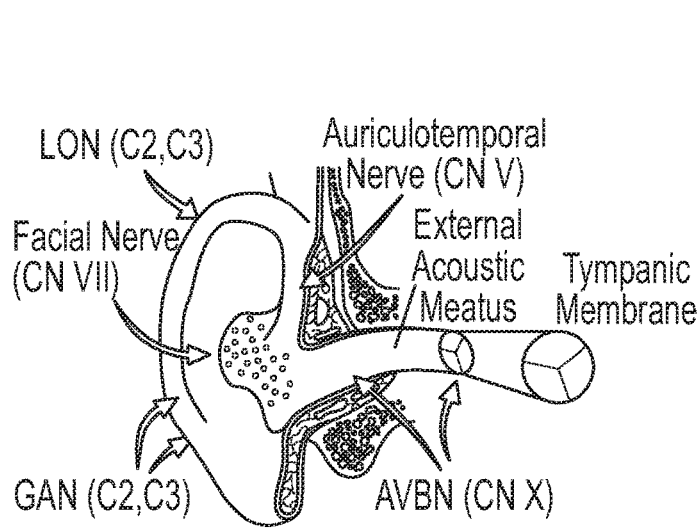
Figure 2C:
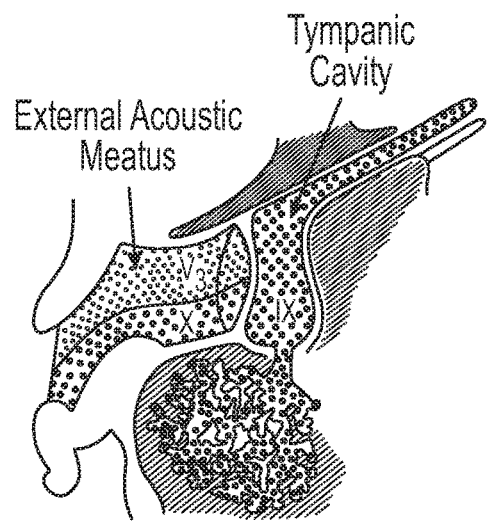

In general, described herein are methods and apparatuses for treating disorders by applying external auricular stimulation to non-invasively modulate neural pathways (and networks) through the ear canal, and/or other portions of the ear, to cause neurosensory biasing. Neurosensory biasing may be referred to as scrambled neuromodulation. Thus, described herein are methods for performing these methods to treat a subject. These methods may be performed by any particular stimulation modality or multiple modalities. For example, these methods may be performed electrically, by electrically stimulating one or more regions of the outer ear (including within the ear canal) as described herein. Alternatively or additionally, these methods may be performed thermally, by thermally modulating one or more external regions of the outer ear (including within the ear canal); thermal modulation may include increasing and/or decreasing the temperature of the stimulation region as described herein. In some variations thermal modulation may comprise warming, which may be performed using ultrasound and/or cooling (e.g., using a TEC). Alternatively or additionally, these methods may be performed mechanically (e.g., ultrasonically), by mechanically modulating one or more external regions of the outer ear (including within the ear canal); mechanical modulation may include vibrating the one or more simulation regions. Alternatively or additionally, these methods may be performed optically, by applying light to optically modulate one or more external regions of the outer ear (including within the ear canal).

For example, a method of treating a subject may include treating the subject by neurosensory biasing. In variations in which electrical stimulation is used to apply neurosensory biasing, the electrical stimulation may be applied between two electrodes in either ear and/or in some variations multiple discrete regions (e.g., within the ear canal). When applied in the ear canal, the electrical stimulation my generally be applied, e.g., between the left and right ear, at a high current density (e.g., $>1.5$ $mA/cm^2$, $>1.8$ $mA/cm^2$, or $>2$ $mA/cm^2$, $>3$ $mA/cm^2$, $>4$ $mA/cm^2$, etc.). As will be described herein, higher current densities may be achieved by applying current between both ears (e.g., at discrete locations within the ear canal), and using compressible, high-conductance hydrogel electrodes to deliver the high current density. The apparatuses and methods described herein are configured so that these high current densities are both safe and effective, in contrast to what is commonly believed, e.g., in the TENS field. In some variations the method described herein may include methods of treating a subject by thermal treatment, e.g., of the ear canal. Thermal treatment may typically heating and/or cooling one or more regions (and in particular, multiple regions).

In general, any of the methods and apparatuses described herein may be multimodal methods, and may include concurrently or sequentially applying stimulation (electrical, thermal, mechanical, etc.) to multiple locations, typically including within the ear canal. As described herein, these multiple locations may correlate to different neural pathways (e.g., different cranial nerves and/or auricular nerve and/or auriculotemproal nerve, or other branches of the cervical plexus, etc. The multi-modal stimulation described herein may include applying different modes (electrical, thermal, mechanical, optical, etc.) to multiple different locations and/or to the same location. As mentioned, in some variations the applied stimulation may induce neurosensory biasing, which may result in scrambled neuromodulation. Thus, in any of these methods and apparatuses the applied energy may be configured to be non-repeating at the same or different locations.

These methods may generally be used to treat disorders of the sympathetic nervous system, or disorder and diseases for which modulation of the sympathetic nervous system would be beneficial. For example, the methods of treatment described herein may be methods of treating (by neurosensory biasing) a subject to improve sleep (e.g., reducing sleep onset, increasing sleep duration and/or depth, etc.) and in particular, may be useful for treating insomnia. In some variations the methods of treatment described herein may be useful for treating a neurosensory disorder (including Tinnitus). In some variations, these methods of treatment may be useful for treating anxiety and/or depression.

Also described herein are apparatuses for performing any of these methods. For example, apparatuses may include external ear stimulating electrodes, including in particular multi-channel external ear stimulating electrodes (MEESE) and Multi-sensor Auricular Transducer Electrode (MATE). An external ear stimulating electrode apparatus may be configured for electrical treatment, including being configured to deliver low-impedance current via a compressible and conductive hydrogel to one or more locations within an ear canal, and in particular to both ear canals. These apparatuses may also include a controller to deliver current to both ears at a high current density, such as greater than about 2 mA/cm$^2$. Any of these apparatuses may also be configured to deliver additional modalities to other regions of the outer ear (e.g., ear canal), such as thermal simulation and/or ultrasound stimulation, etc.

The apparatuses described herein, including the external ear stimulating electrode apparatuses, may generally be configured as multichannel apparatus for electrical treatment to ear canal. Both the controller and the earpiece(s) may be configured as multi-channel apparatuses. For example, the controller may be configured as a multi-channel controller. The earpieces may also be configured as multi-channel ear pieces. Any of these apparatuses may include one or more hydrogel contacts for delivery of the modulating energy (e.g., electrical energy and/or thermal energy).

Any of these apparatuses may, in the earpiece, also include one or more sensors for detecting impedance, temperature, heart rate, blood pressure, bioelectric activity (e.g., EMG, EEG, etc.). The controller may be configured to receive and/or modify the stimulation based on these sensed signal(s).

Also described herein are apparatuses for thermal treatment. These apparatuses may include, for example, a controller for generating control waveforms (similar or identical to those that may be used for electrical stimulation), a Peltier (e.g., thermoelectric cooler, TEC) and a thermally conductive conduit (e.g., a wire formed of a thermally conductive material) coupled to the compressible and thermally conductive hydrogel.

The thermal neuromodulation and electrical apparatuses and methods described herein may be configured to use non-repeating (e.g., non-cyclical) waveforms. Thus, these methods and apparatuses do not require cyclical modulation. Instead, any of these methods and apparatuses may use scrambled and/or random neuromodulation signals. For example the methods and apparatuses described herein may use a Gaussian, Poisson or Binomal model of a time-point and deliver randomized (not cyclical or repeating) stimuli that in some variations may approximate some mean or have some characteristic variance component applied to the model calculating and driving voltages to the end actuator (e.g., electrode or thermoelectric substrate).

In some variations, one or more of the pulse width, interphase interval, pulse frequency, and pulse amplitude may be altered such that no two successive stimulus features are the same. This switching of stimulation parameters may prevent the body from acclimating. This scrambled neuromodulation technique represents a fundamentally different approach than cyclical approach of neuromodulation traditionally used and may use a different hardware, software and/or firmware (such as a microprocessor and digital signal processor or DSP) to drive the random or scrambled neuromodulation protocols.

Auricular Multimodal Sensory Stimuli

As mentioned, the methods and apparatuses described herein may generally be configured for auricular stimulation of the outer ear, including auricular stimulation within the inner ear (or inner ears). The auricle or external ear is a complexly shaped structure, innervated by a dense plexus of sensory afferents that transmit somatosensory, proprioceptive, and neurovascular information to the brain as illustrated in FIGS. 1A-1C and 2A-2C. Auditory sensations and perceptions results from integrated sensory inputs (for example, somatosensory and proprioceptive inputs) that include classical hearing mechanisms where sound pressure affects hair cells, the cochlea, and tympanic membrane. In addition to environmental stimuli, hearing and the processing of auditory information is significantly influenced by internal physiological systems or states, such as blood pressure or the activity of neurovascular circuits that includes a neuron, glial cell, and capillary or blood vessel, which may be referred to as the neurovascular triad.

Figure 3A:
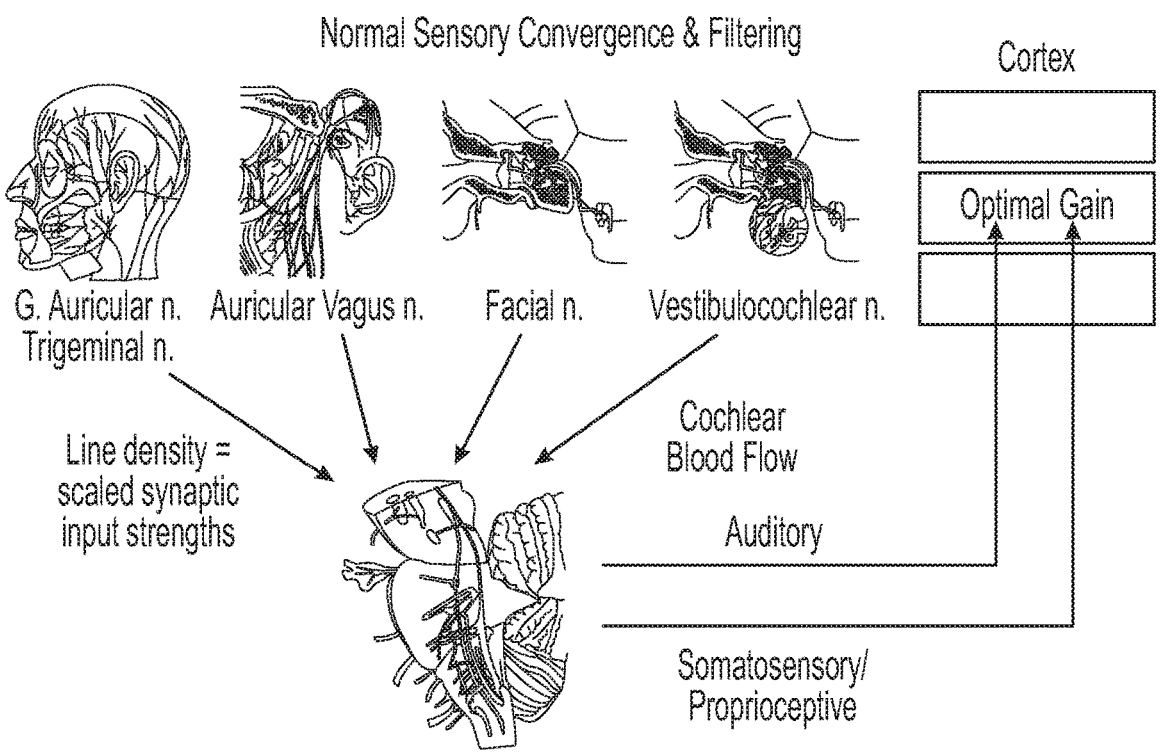
FIG. 3A illustrates sensory convergence and filtering in a subject without tinnitus.
Figure 3B:
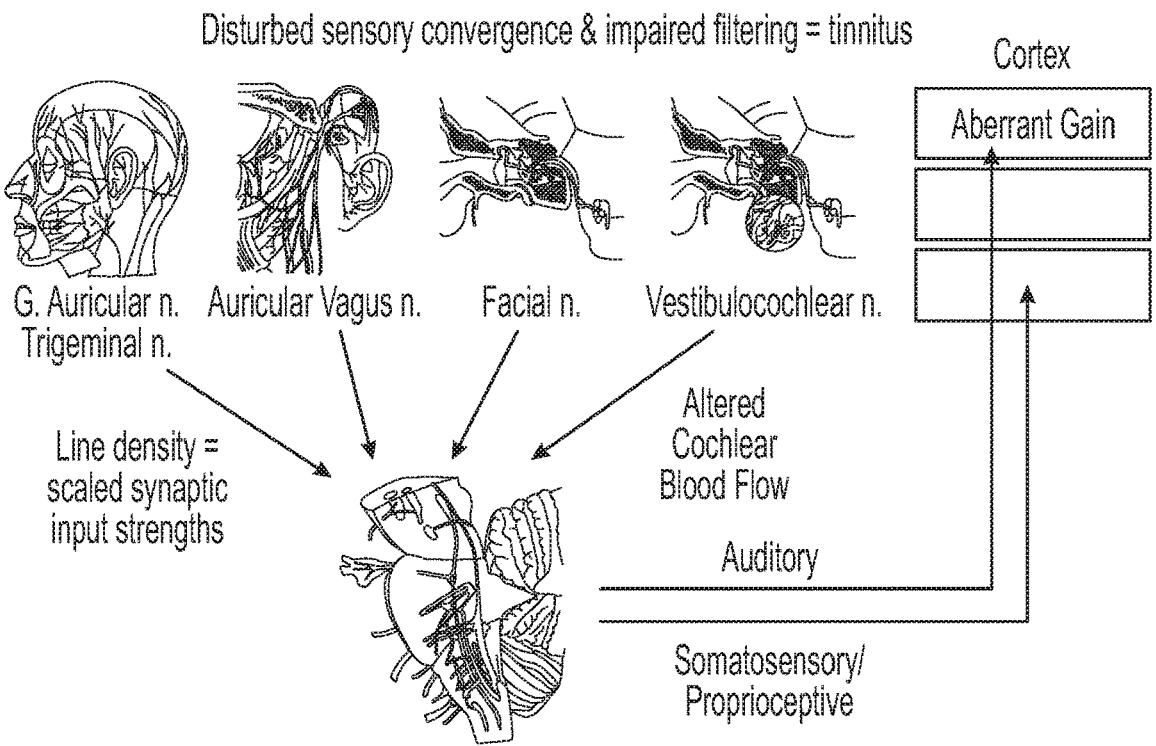
FIG. 3B shows sensory convergence and filtering in a subject with tinnitus.
Figure 4:
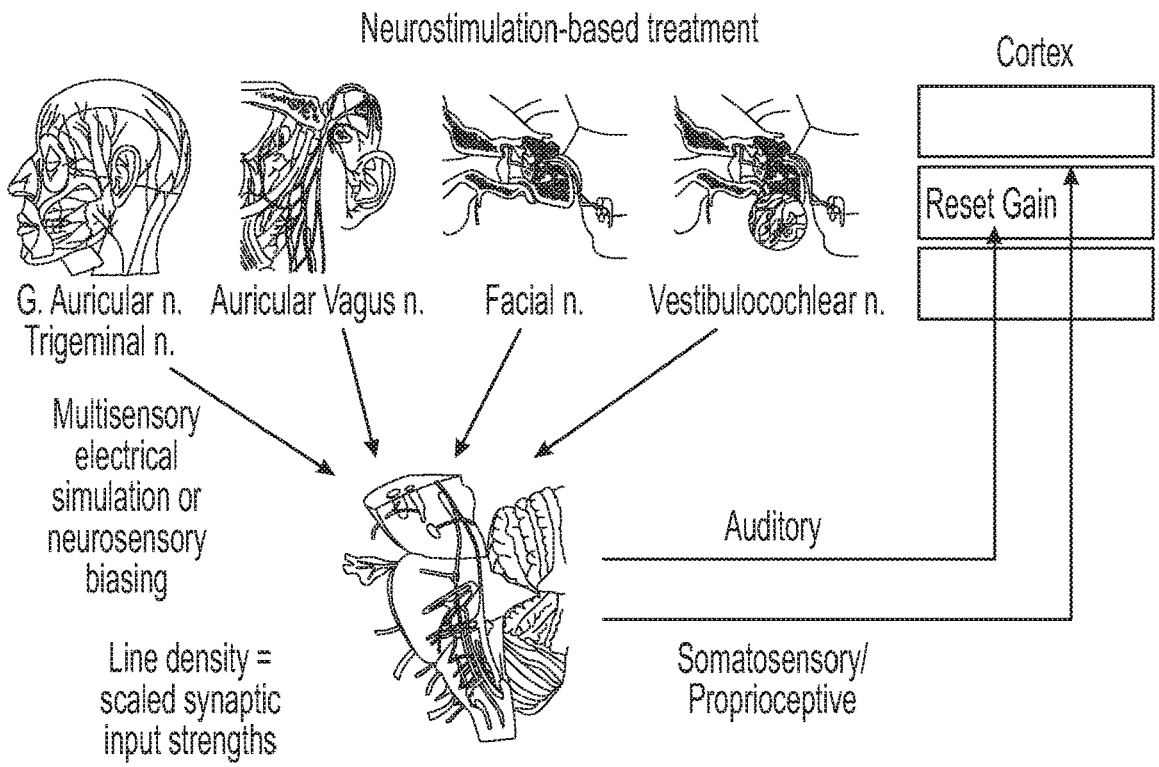
FIG. 4 illustrates functional neurosensory biasing of the external ear, showing that this biasing (e.g., applying stimulation to (in this example) multiple targets from the outer ear (including ear canal) may reset aberrant cortical gain and restores composite auditory processes. Note that functional neurosensory biasing using a MEESE or other neurosensory biasing interface at the external ear to deliver pulsed stimuli greater than about 200 or 300 Hertz in this example produces scaled (normalized) synaptic weights of the greater auricular nerve (C2-C3), the trigeminal nerve, the auricular branch of the vagus, and the facial nerve that are greater than the vestibulocochlear (auditory) nerve. Biasing peripheral neural networks and neurovascular activity of the external ear enables the homeostatic reset or perturbation of runaway gain processes that underlie some aspects of tinnitus as illustrated in comparison to FIG. 3B.

Psychophysiological states such as stress or fear can lead the differential gain of auditory sensitivity enabling a person greater acute awareness. In an aroused or fear state, individuals may experience greater auditory sensitivity to broadband sounds in a manner that gates attention, where as in a chronically stressed state individuals may become hypersensitive to particular frequencies in a manner that distracts attention or exacerbates stress. Similarly, sensory inputs arising from moving the jaw or vibration of the vocal cords can lead to decreased auditory gain or diminished auditory sensitivity. In these cases for example to decrease the stimulation of a person's cortex by the airborne sounds and soft tissue and bone conducted sounds of his or her spoken voice mediated by the trigeminal nerve and cervical spinal nerves of the cervical plexus. These differential gains originate through filtering processes in the brain stem and ascending paths to and including the cortex as further described below and as illustrated in FIG. 3A. FIGS. 3A-4 illustrate an integrated sensory treatment hypothesis for tinnitus; this theory may generally apply to other sensory disorders as well. In FIG. 3A, subconscious and conscious (e.g., subthreshold and suprathreshold) sensory inputs conveying mechanical pressure waves or sound may be integrated, sorted, and transmitted to the cortex from the brain stem. Disrupted filtering arising from perturbed somatosensory processing components or contributors to the bulk signal (versus the pure auditory components) may lead to runaway gain of certain auditory frequencies perceived as tinnitus via pathological plasticity. In FIGS. 3A-4, line density may correlate to scaled synaptic input strengths.

Thus, high activity in some sensory pathways dampens the activity of auditory streams resulting in suppressed responses to auditory stimuli. Conversely low activity of other or the same sensory processes may amplify certain auditory perceptions depending on other variables and the activity of integrated neural networks. Even other processes can lead to the generation of spontaneous sounds or auditory hallucinations perceived by the cortex. Here, damage or dysfunction of different sensory components that give rise to audible perceptions can also affect hearing by increasing or decreasing the gain of one or more audible frequencies as represented in FIG. 3B. For example, damage to hair cells or exacerbated stress (increased sympathetic activity of the autonomic nervous system) can produce the sensation of a ringing sound as manifested in a class of neurological disorders known as tinnitus, which is classified into different categories depending on symptoms experienced and cause of the disorder.

In some neuropsychiatric conditions, such as schizophrenia certain positive symptoms may include auditory hallucinations that originate through higher-ordered disruption to multi-sensory integration and gain (FIG. 3B).

One example of neurosensory disorder that may be treated effectively as described herein is tinnitus. Due to the integration of multimodal sensory information, stimulation (e.g., electrical stimulation) of somatosensory networks innervating the outer ear, head, face, and neck have a high influence on auditory processing. These influences may provide variably effective treatments for tinnitus and other distortions to auditory perception. Several methods of treating tinnitus with varying degrees of effectiveness are known to exist in the art. These methods include pharmacological or chemical means, relaxation techniques and physical therapy, digital filtering of air-coupled sounds, and neuromodulation. Neuromodulation methods are of particular relevance to the methods and apparatuses described herein. Some prior art provides descriptions of peripheral nerve stimulation methods where the cervical vagus or auricular branch of the vagus nerve are targeted with surgically implanted or surface electrodes respectively as further described below to relieve the symptoms of tinnitus. Vagal nerve stimulation (VNS) has also shown some promise for treating tinnitus especially when coupled to digital audio filtering and stimulation methods as described below. These therapies do not provide a broadly accessible or highly effective means of treating tinnitus.

One of the major shortcomings of these treatments is that they do not realistically treat hearing as an integrated set of parallel and serial neural networks and only act to regulate a couple of select sensory streams or networks that in concert with other somatosensory streams and physiological states give rise to audible perceptions. To regulate hearing processes or to effectively treat tinnitus, multiple sensory pathways and physiological systems of integrated neural networks may be targeted and modulated stimulated simultaneously or nearly simultaneously. The methods and apparatuses described herein for modulating multiple neural circuits, such as somatosensory networks and neurovascular networks simultaneously or nearly simultaneously to achieve desired outcomes, such as treating tinnitus or distorted auditory perceptions.

The multi-modal nature of hearing involves the obvious stimulation of the inner ear by air-coupled sound. Also familiar to those skilled in the art, soft tissues and bone or ossified tissues also conduct sound waves (mechanical vibrations) that contribute to the composite sensation of hearing. Besides these classical pathways, there are several somatosensory nerves or afferent fibers that innervate the auricle or outer ear (pinna) and head including the neck regions that also contribute to the composite perception of hearing. There are multiple lines of evidence in the literature showing that bimodal and multi-modal sensory integration begins to occur in first order auditory nuclei and that these processes can be modulated to influence auditory processes including dysfunctional ones like those manifested in tinnitus as further described below.

The cochlear nucleus (CN) is the first site of multisensory integration in the ascending auditory pathway. The principal output neurons of the dorsal cochlear nucleus (DCN), fusiform cells, receive somatosensory information relayed by the CN granule cells from the trigeminal and dorsal column pathways. Somatosensory inputs originate in the periphery and transmit sensory information through the brain stem to higher brain regions. These somatosensory inputs are transmitted directly and indirectly through second-order nuclei to the ventral cochlear nucleus (VCN), dorsal cochlear nucleus (DCN), and inferior colliculus. As illustrated in FIGS. 3A-3B and 4 the DCN receives auditory input directly via the vestibulocochlear nerve (cranial nerve VIII) and somatosensory input indirectly from the trigeminal nerve (cranial nerve V) via granule cells. Multisensory integration is believed to occur, in part, in DCN cells that receive both trigeminal and auditory nerve input, such as fusiform cells. Evidence of this has demonstrated by observations that electrical trigeminal ganglia stimulation preceding auditory stimulation by as much as 95 milliseconds can alter the balance of excitatory and inhibitory pathways resulting in suppressed auditory responses.

Electric stimulation is a potent means of neuromodulation that has been used to restore hearing and minimize tremor, but its application on tinnitus symptoms has been limited. A recent review of electrical neurostimulation methods that have been investigated to treat plasticity has grouped these methods into three basic categories: 1) non-invasive, direct current stimulation methods that use an active electrode in the ear canal, tympanic membrane, or temporal scalp; 2) inner ear stimulation methods that use charge-balanced biphasic stimulation by placing an active electrode on the promontory or round window, or a cochlear implant array in the cochlea; 3) intraneural implants that can provide targeted stimulation of specific sites along the auditory pathway or associated nerves. Electric stimulation provides a unique opportunity to suppress tinnitus and identify the challenges ahead which include matching electric stimulation sites and patterns to tinnitus locus and type, meeting the oftentimes-contradictory demands between tinnitus suppression and other indications, such as speech understanding, and justifying the costs and risks of electric stimulation for tinnitus symptoms.

Vagus nerve stimulation represents an established treatment strategy for epilepsy and affective disorders. The use of transdermal vagal nerve stimulation (tVNS) on chronic tinnitus (e.g. tVNS of the auricular branch of the vagus) show that tVNS can be well tolerated for 6 months in subjects with no history of cardiac disease although there were no clinically relevant improvements of tinnitus complaints. tVNS may modulate tinnitus-related neural activity patterns, such as cortical gamma rhythms. Therapeutic modulation of gamma-band oscillations with tVNS has been reported in epileptic subjects. Effective treatment paradigms for treating tinnitus with non-invasive cranial nerve stimulation, may be achieved by combining tVNS with auditory stimulation, filtering, or re-training paradigms. For example, VNS paired with tones could become an effective therapy for the treatment of tinnitus. In addition to vagal nerve stimulation methods, electrical neurostimulation of somatosensory inputs including those of the trigeminal nerve may result in a complex combination of excitation and inhibition that alters the rate, timing, and amplitudes of responses to acoustic stimulation.

One particular form of tinnitus recognized as somatic tinnitus syndrome includes those forms of tinnitus that are associated with somatosensory dysfunctions involving the head and upper neck. Transcutaneous electrical nerve stimulation (TENS) of areas of skin close to the ear, which is innervated by cervical spinal nerves of the cervical plexus and branches of the trigeminal nerve increases the activation of the DCN through the somatosensory pathways may improve the symptoms of tinnitus in some subjects.

As will be described herein, higher frequencies (greater than 200) are of interest when delivering transdermal stimuli to alter hearing processes. Briefly higher frequencies of transdermal pulses produce far fewer effects on pain fibers and muscle fibers, as well as produce fewer skin sensations than lower frequency pulse rates that make transdermal stimulation unpleasant for the user or subject.

The methods and apparatuses described herein may dynamically stimulate various brain regions at different frequencies and intensities, and may be physiologically tailored to the subject's brain state in an attempt to maximize efficacy.

Modulation of Sympathetic Activity

The methods and apparatuses described herein may be configured to operate through network mechanisms described below and illustrated in FIGS. 1A-1C, 2A-2C, 3A-3B, and 4, and may include treatment of refractory epilepsy, tinnitus, depression, anxiety, post-traumatic stress disorder and other neurological and neuropsychiatric disease. The methods and apparatuses described herein may pass electrical current patterns from electrical contacts on the body (e.g., skin) to nerves. The electrical currents in turn modulate or stimulate neuronal activity or action potentials. There are twelve pairs of cranial nerves, which can provide powerful conduits to central regulators of brain activity. Afferent fibers of the trigeminal (CN V), facial (CN VII), vagal (CN X), accessory (CN XI), and hypoglossal (CN XII) nerves, as well as afferents of cervical nerves like cervical spinal nerves and the phrenic nerve project directly to sensory nuclei of the brain stem. These nerves are readily accessible using surface electrodes placed on the head, face, and neck. Sensory information relayed by these nerves is transmitted to auditory regions of the brainstem as described above and cortical areas via thalamocortical pathways. Prior to, during, and after signal propagation to cortex however, the incoming peripheral signals undergo extensive local processing in a series of highly inter-connected structures including the ascending reticular activating system (RAS) located in the brainstem. These sites of sensory integration in the brain is where higher consciousness is thought to originate in brain stem circuits filtering, integrating, and processing incoming sensory information. It is also here that cranial and spinal nerves modulate the activity of RAS nuclei like the locus coeruleus (LC), raphe nuclei (RN), and pedunculopontine nuclei (PPN), which in turn regulate cortical processing.

Bottom-up pathways the LC, RN, and PPN influence brain activity and behavior by controlling arousal, attention, sleep/wake cycles, and higher cognitive functions including learning and memory by regulating levels of norepinephrine (NE), serotonin (5-HT), and acetylcholine (ACh) respectively. These signaling pathways and molecules are the classical targets of many potent classes of drugs, such as beta-blockers, selective serotonin reuptake inhibitors (SSRIs) monoamine oxidase inhibitors (MAOIs), and amphetamine derivatives used to treat diseases or to enhance human performance including cognition. Pharmacological methods swamp systems usually in an unspecific manner resulting in complications or off-target side effects. Due to its targeting abilities, peripheral neuro-impedance neuromodulation system (NINS) may offer a controlled method of achieving drug-like outcomes with fewer side effects. Further, since these pathways represent some of the most powerful endogenous neuromodulators known to exist in the brain, learning to harness their signaling abilities with pulsed transdermal electrical stimulation (pTES) of cranial nerves will be imperative to the success of future methods intended to modulate composite sensory processes, as well as cognitive processes like attention.

As described herein, transdermal auricular vagal nerve stimulation (taVNS) can be achieved using an ear-bud headphone style electrode. Any of the apparatus variations described herein may be integrated with an audio headphone. Broadband or multi-channel Functional Neurosensory Biasing of multiple cranial nerves and neurovascular or soft tissue networks as described herein may overcome some of the need to implement idealized stimulation parameters to achieve effective therapeutic responses by circumventing the involvement of neural activity alone to achieve an effect and rather modulating multiple neural and physiological systems simultaneously or nearly simultaneously using for example a Multi-channel External Ear Stimulating Electrode (MEESE).

The methods and apparatuses described herein may modulate blood flow, as some or all of the therapeutic effect. For example, and without being bound by a particular theory of operation, the trigeminal nerve plays a very strong role in controlling neurovascular activity that regulates blood flow to facial, head, and neck skin and muscles, as well as the dura mater and brain. Several studies have demonstrated that trigeminal nerve stimulation can significantly alter neurovascular activity to produce changes in blood flow up to fifty percent in a manner mediated by endothelin receptors. Within the inner ear, labyrinthine function and cochlear blood flow is tightly coupled to proper homeostasis. Perturbations in cochlear blood flow and labyrinthine microcirculation can lead to significant cochlear and vestibular dysfunction, including sudden sensorineural hearing loss, presbyacusis, noise-induced hearing loss, and certain vestibulopathies. Alterations in blood supply to the cochlea caused by aging or damage is likely, in part, responsible for altered auditory sensitivity associated with some hearing disorders like tinnitus. Thus modulation of cochlear blood flow may be a target for treating tinnitus.

Beta-histamine (BH) has been shown capable of increasing cochlear blood flow (CBF) in the inner ear by acting on histamine type 3 (H3) and noradrenergic alpha type 2 (alpha-2) receptors. The modulation of the fluid dynamics by beta-histamine acting in part on H3 and alpha-2 receptors is thought to regulate natural hearing processes across a range of autonomic states (for example stressed or relaxed autonomic activity). Further, BH has been used in many cases to treat cochlear disorders, such as tinnitus and Meniere's disease and histamine receptors remains a molecular target of interest for treating tinnitus.

Altered fluid dynamics affected by soft tissue conduction of sound have been thought to manifest as pulsatile tinnitus in some conditions. Changes in fluid dynamics from low amplitude events reaching the cochlea through soft tissue conduction are believed to activate hair cells, which can lead to pulsatile tinnitus. Other studies have been able to uncouple air-coupled sound from bone conducted sound and soft tissue couple sound. Others have shown the differential masking of bone conducted sound using soft tissue conducted sound. Thus, in some instances, local effects of electrical stimulation on neurovascular coupling may underlie its ability to modulate CBF, sympathetic mechanisms regulating CBF. Vascular tones are essential component to maintaining steady regional blood flow and dynamic responsiveness of a vascular bed. Sympathetic innervation can contribute to vascular tone. Evoked changes in cochlear blood flow (CBF) may be linked with activation of the sympathetic fibers to the cochlear vasculature.

Figure 6:
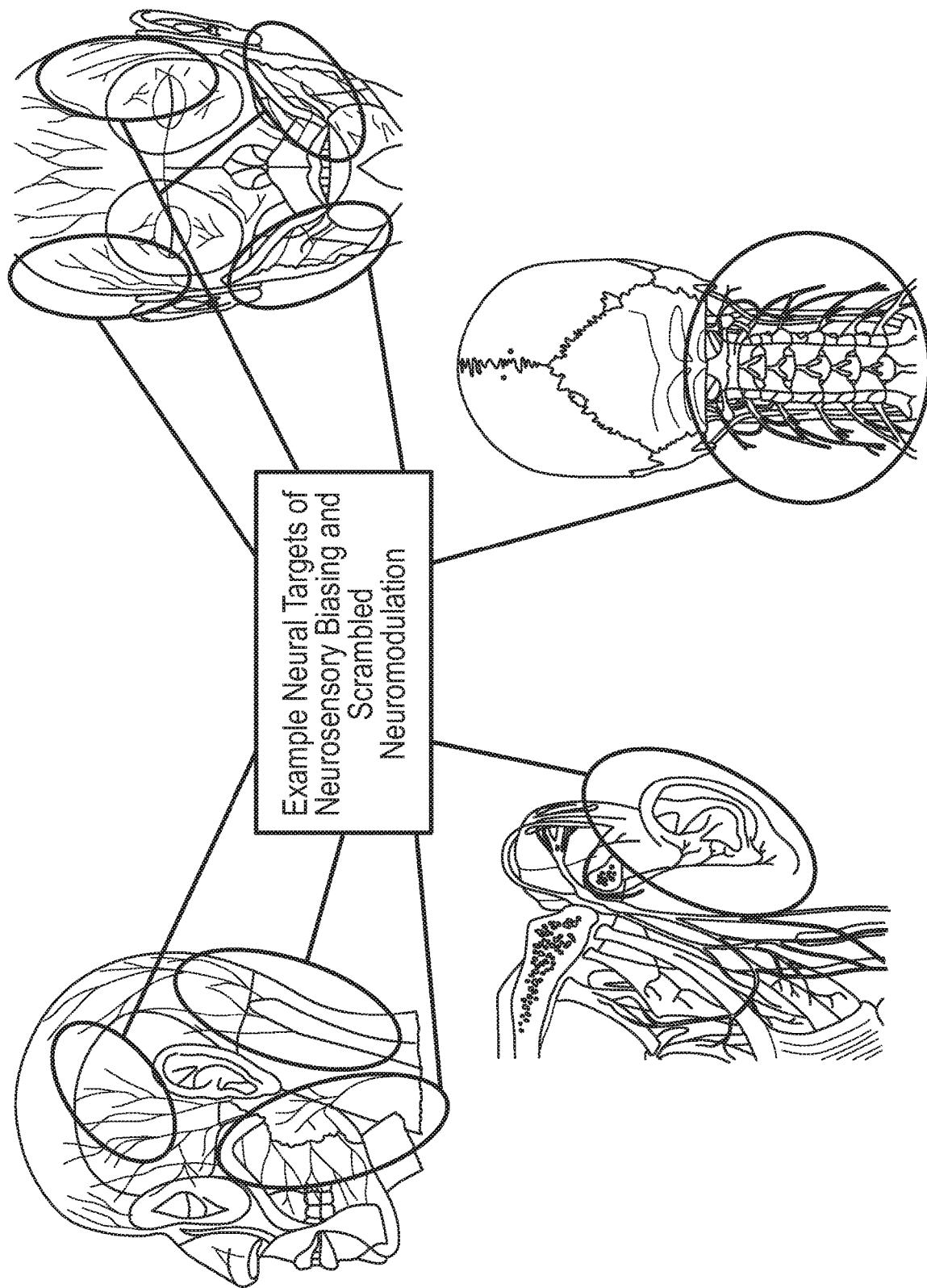
FIG. 6 illustrates exemplary targets of the functional neurosensory biasing, scrambled neuromodulation programs, or punctate neuromodulation that may be delivered as described herein. Although the methods and apparatuses described herein may be focused primarily on the ear, e.g., outer ear, including the ear canal, alternatively or additionally, these methods and apparatuses may be adapted to apply these methods (e.g., functional neurosensory biasing) to one or more of the external ear, head, face, and neck in order to influence cortical gain and composite auditory processing. There are multiple target locations for the delivery of neurobiasing stimuli using a MEESE interface or punctate neuromodulation devices as described herein to alter or distort auditory perceptions for therapeutic purposes, or to enhance communications and entertainment.

FIG. 6 illustrates examples of neural targets for the methods and apparatuses described herein; in particular these regions may be targets for the sensory biasing signals and scrambled neuromodulation as described herein. In addition to the outer ear (e.g., ear canal), other cranial nerves may be targets, and/or nerves on the back of the subject's neck.

Multi-Channel External Ear Stimulating Electrodes

Methods and devices are described for modulating multiple integrated neural networks to alter composite sensory processes, such as audition or hearing. Some embodiments of these apparatuses may enhance entertainment and communication by providing a cranio-cervical tuning apparatus worn in or around the outer ear or auricle. Some embodiments consist of methods and devices for introducing Functional Neurosensory Bias and for Neurosensory Scrambling Neuromodulation to influence composite or multi-modal sensory processes, such as hearing. These methods and apparatuses may be intended to alter sensory perceptions or hallucinations using methods of Neurosensory Biasing or Neurosensory Scrambling, for example to treat tinnitus or positive symptoms of schizophrenia by simultaneously modulating the activity of multiple cranial nerves and the vasculature of the ear using Multi-channel External Ear Stimulating Electrodes (MEESE; see, e.g., FIGS. 1A-1C, 4 and FIGS. 7A-13).

Figure 7A:
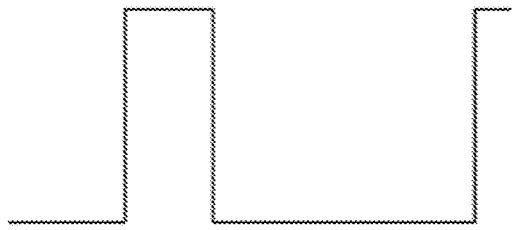
FIGS. 7A-7D illustrates basic neurosensory biasing pulse characteristics.
Figure 7B:
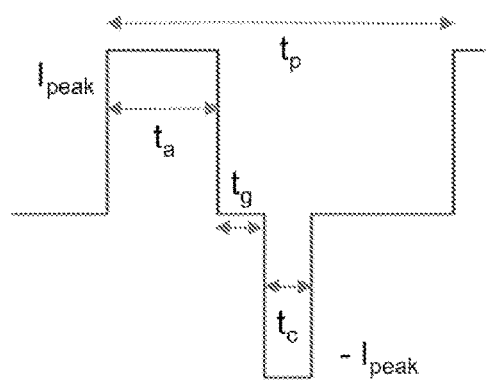
Figure 7C:
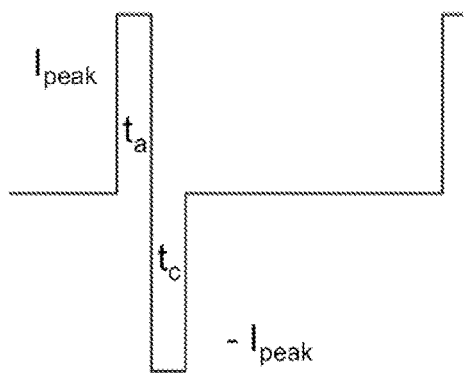
Figure 7D:
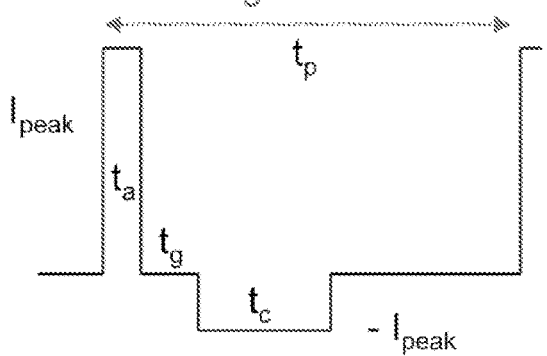
Figure 8A:
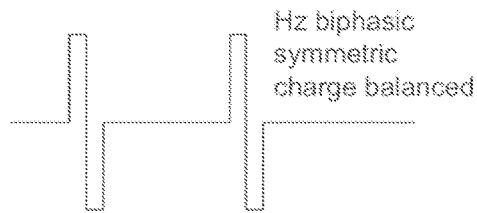
FIGS. 8A-8D illustrates complex neurosensory biasing pulse characteristics.
Figure 8B:
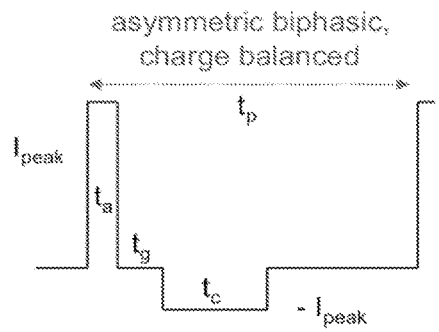
Figure 8C:
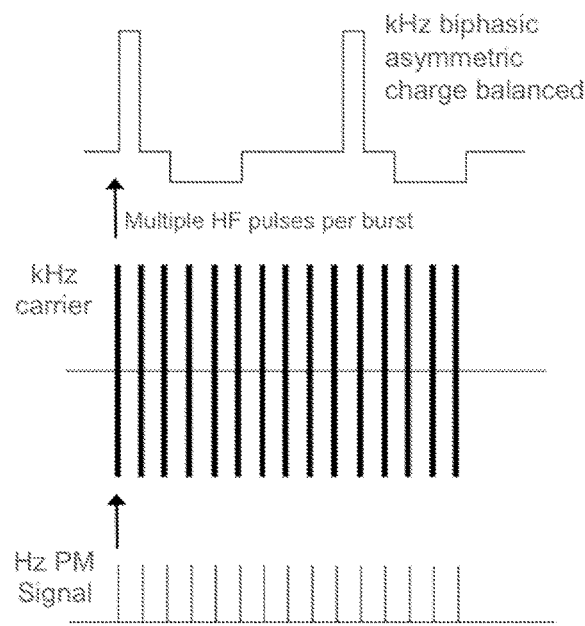
Figure 8D:
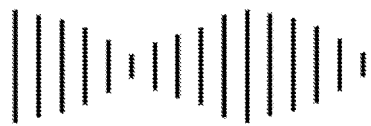
Figure 8D:
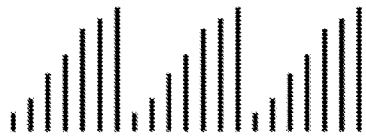
Figure 9:
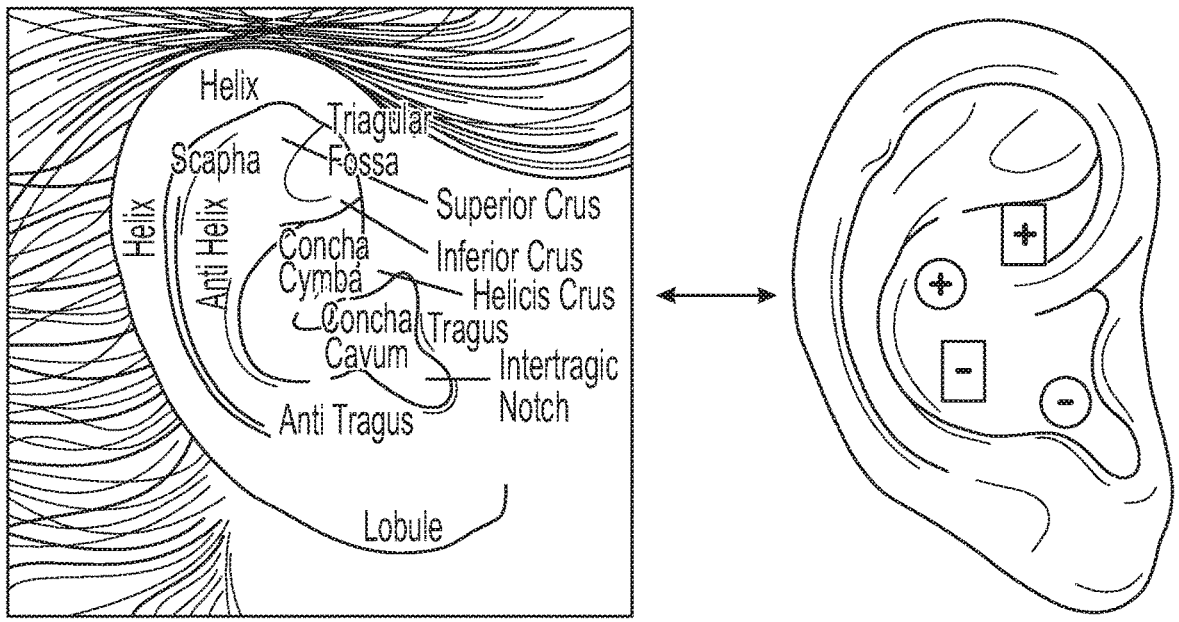
FIG. 9 illustrates one example of a multi-channel external ear stimulating electrode for neurosensory biasing or to influence composite sensory processes. In some embodiments more than one neurostimulation channel may be used to stimulate a discrete portion of the ear (including within the ear canal) by making contact between a conductive polymer (e.g., hydrogel) and/or other conductive material and the epidermis of the outer ear in locations including a plurality of the following locations concha cymba and cavum, tragus, external acoustic meatus (ear canal), and anti helix as shown. In some embodiments neurosensory biasing is achieved through a multi-electrode external ear stimulating electrode (MEESE) containing a minimum of one stimulating electrode and one sensing electrode (for example, heart rate sensor or EEG electrode) or at least two stimulating electrodes (for example, four channels as illustrated at the top of FIG. 9. Embodiments containing two or more sensors (for example, a heart rate sensor and an EEG sensor) and a neurostimulation electrode may be referred to as a MATE (Multi-sensor Auricular Transducer Electrode) and an example is shown in FIG. 16. In some embodiments described herein, MEESE and MATE can be used interchangeably. An example of locations where an MEESE containing two stimulating electrodes and no sensing electrodes may connect with an outer ear region is illustrated in the lower right of FIG. 9, showing circular anode cathode pairs depict channel one and square anode cathode pairs represent channel two to deliver neurosensory biasing affecting local neurovascular dynamics of the ear, as well as the integration and gain of auditory information. In some variations of the methods and devices described herein including neurosensory biasing systems different neurosensory biasing waveforms may be used to induce scrambled neuromodulation or to influence auditory perceptions may include unique waveform parameters minimally defined by a peak current ($I_{max}$) and center frequency ($f_c$) of the pulsed stimuli. An advantage of MEESE approaches may include current steering that can be implemented by altering the timing of anode and cathode activation across the different channels in a manner that shapes the electric field produced in the external ear. Thus, any of these methods and apparatuses may be configured to apply current steering in (e.g., using an MEESE, or other apparatus described herein, acting as a local phased array in a dynamic and controllable manner).
Figure 10:
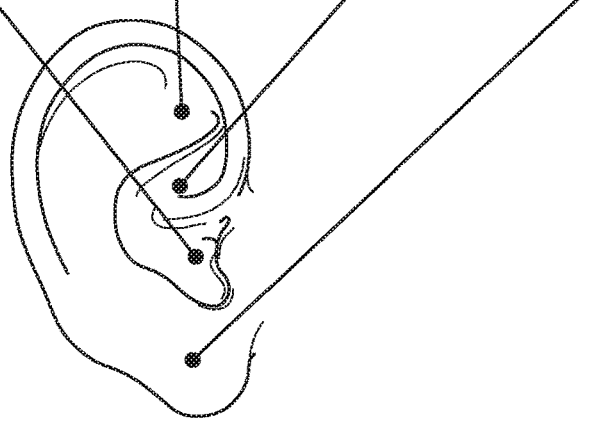
FIG. 10 illustrates one example of a multi-sensory scrambling or neurosensory biasing method. In some variations this method may be used as a treatment, including a treatment to alter hearing quality or auditory perception or awareness (e.g., to treat an auditory or other sensory disorder such as tinnitus). For example, a sensory scrambling neuromodulation method or system may include a multi-channel external ear stimulating electrode in which, for example, channel one delivers a maximum of forty percent of the total current averaged across a stimulation period while channels two, three, and four deliver a maximum of twenty percent of the total current or charge during any stimulus or treatment period. In such an embodiment different or the same pulse frequencies may be used to distribute these currents for example in a manner as illustrated where channels one and two deliver greater than ninety percent of the total power between 0.3-1 kilohertz (thousand of cycles per second) and channels three and four may deliver greater than ninety percent of total power between 100 and 1,000 kilohertz (or one megahertz). Parallel, serial, or randomized timing protocols can be used to deliver a fixed sequence or alternating sequences of pulsed currents to the skin of external ear in a manner similar to illustrated for the purposes of induce or altering sensory perceptions for communication or entertainment purposes or to distort or alter them in a manner that provides a treatment or relief from neurological, somatic, and otologic disorders like tinnitus or neuropsychiatric disorders like schizophrenia.

FIG. 7B illustrates one exemplary waveform that may be used as part of the methods and apparatuses described herein; this waveform may be configured as a sensory biasing signal (which may be referred to herein as a neurosensory biasing signal or scrambled neuromodulation). In FIG. 7B the signal is a bipolar, asymmetric, and charge balanced signal. The signal has a peak current ($I_{peak}$), a time for the cycle period ($T_p$), an anodic phase duration ($T_a$), a cathodic phase duration ($T_c$), and an interphase gap ($T_g$). Although the waveform shown is square, other shapes (triangular, sinusoidal, etc.) may be used. FIG. 7C shows a symmetric, biphasic and charge balanced signal. FIG. 7D shows an example of an asymmetric, charge balanced signal. As shown in FIG. 8A-8D, these signals may be modulated, including amplitude modulated, pulse modulated, etc.

There are several major peripheral nerve branches that innervate the outer ear or auricle or pinna (FIGS. 1A-1C and 2A-2C). Three are cranial nerves of vagal, facial, and trigeminal origin. Another two branches originate from the C2 and C3 cervical nerves. In addition to a dense supply of peripheral nerve fibers, the skin of the outer ear has a rich network of blood vessels, arteries, and capillaries. Any of the methods described herein may utilize biphasic, asymmetric, charge balanced currents where the anodic phase has, e.g., about four times the current amplitude of the following cathodic phase that is, for example, about four times as long as the preceding anodic phase. Methods and devices for delivering rectangular or semi-rectangular, trapezoidal or triangular anodic and cathodic pulses having charge balancing in such a manner can be delivered to the skin of the external ear in a manner intended to alter auditory perceptions to treat symptoms of tinnitus or for consumer applications in communications or entertainment applications. Other charge balanced ratios of rectangular or other shaped current pulses may be used for example when an anodic phase has about ten percent of the amplitude of the cathodic phase, but may be, for example, 100 microseconds in duration versus its accompanying shorter cathodic phase that may be, e.g., only 10 microseconds long separated by an interphase gap of greater than, for example, 10 microseconds. Other examples may implement combinations of anode and cathode phases that have a duration longer than about 20 or 50 microseconds and an interphase gap longer than about 5 or 10 microseconds in either an asymmetric or symmetrical manner that maintains charge balancing. In some embodiments pulses may be less than about 500 microseconds or less than 1 millisecond in alternating or pulse current modes. In other embodiments a current offset may be used that produces a change in the electric field of the tissue for a period of time greater than about 10 milliseconds and up to tens of seconds before cycling back through a zero current offset state.

One major function of the human ear is to provide sensory inputs to the brain by way of air-coupled sound. The skin of the outer ear also acts to provide sensory inputs, but that are not of an auditory nature. These somatosensory inputs carried by nerve afferents of the aforementioned nerves serve to regulate awareness, arousal, balance, orientation and other higher brain functions. Thus the ear, inclusive of outer and inner ear nerve circuits, receives a rich array of constant auditory and somatosensory stimuli. In order to provide neurosensory bias that can mimic, enhance, or suppress ongoing activity at some reasonable level of fidelity, it would be best conducted by stimulating multiple regions of the external ear using different channels to differentially regulate the activity of nerves innervating those regions. In some embodiments, the methods or apparatuses described herein may provide coordinated or randomized regulation of different nerves in different or discrete anatomical regions of the body through different channels applying different or same frequencies or energies as illustrated in (FIGS. 9-13 and 15A-16).

Previous descriptions include the use of TENS methods or tVNS methods that utilize pulse frequencies generally lower than about 150 Hertz, which is not ideally suitable to provide the greatest comfort or effect for a user depending on the desired outcome. To overcome this limitation of previously described methods, an embodiment the methods and apparatuses described herein may include a single or multi-channel external ear stimulating electrode (MEESE) that delivers pulsed electrical stimulation at frequencies greater than about 150 Hertz, preferably greater than about 200, about 220, about 300, about 330, about 440, about 350, about 500, about 700, about 750, about 880, or about 900 Hertz, for example. Such an embodiment of the presently described invention may include at least one other channel that transduces visible (light) electromagnetic radiation towards the user's ear, head, or skin for either sensing vascular activity or for modulation purposes such as those described in photobiomodulation methods or low-laser therapy methods. Alternatively or additionally any of these apparatuses may include a thermal channel that delivers thermal energy. Alternatively or additionally, any of these apparatuses may include a mechanical channel that delivers mechanical energy.

Pulsed electrical stimuli having a frequency of about 200 or 300 Hertz or higher may be used to bias the activity of brain circuits known to carry sensory information to the brain to alter sensory processing. Multiple channels and multiple frequencies may be used to bias ongoing brain circuit activity to achieve an effect on perceptual processes or other desired outcomes as described.

For introducing Functional Neurosensory Bias to brain systems or for modulating integrated neural networks to influence composite sensory processing, discomfort or pain is not a desired feature of the neurostimulation outcome. Thus, the bottom range (200 to 300 hertz) of the ultra-low frequency band may be considered a lower boundary as frequencies lower than this have been well described capable of stimulating pain fibers, which can lead to discomfort. Extending to a higher practical boundary, very high frequencies are defined as neuromodulation events, such as pulsed electrical currents or magnetic fields that extend to frequencies less than about 300 megahertz, but in most cases will not exceed 10 kilohertz and only in some cases may there be needs to extend up to the megahertz range.

Functional Neurosensory Biasing

Complex scaling of primary sensory inputs has been shown to occur at the earliest stages of primary sensory input and integration, in the sensory periphery as first shown in the mammalian olfactory bulb. At these earliest stages of information processing in the sensory organs themselves like the skin and ears, the perceptions of stimuli begin to be shaped by the general physical and mechanobiological properties of neural circuits combined with highly organized innervation schemes that are under the persistent influence of descending neuromodulatory commands from brainstem nuclei exerting actions in the periphery. This complexity enables information originating from the peripheral soft tissues of the outer ear to be encoded and integrated by multiple neural networks in the brain beginning in the cervical regions of the spinal cord and brainstem to influence auditory processes. In similar cases of the ear, one may imagine the soft tissue of the external ear operate as a sensitive pressure transducer encoding spatially rich somatosensory information regarding mechanical pressure waves, such as sound. Rather than this information being consciously registered in the cortex, it rather subconsciously shapes information processed via classical auditory pathways that convert mechanical pressure waves into perceived sound beginning in the inner ear. In this manner the flesh of the ear acts as a tunable antennae array that adjusts the gain of other peripheral sensory streams based on local events that do not need to reach a central integrator for processing. Biasing the way it influences the processing of other sensory streams can be perturbed by locally modulating the environment.

Figure 18:
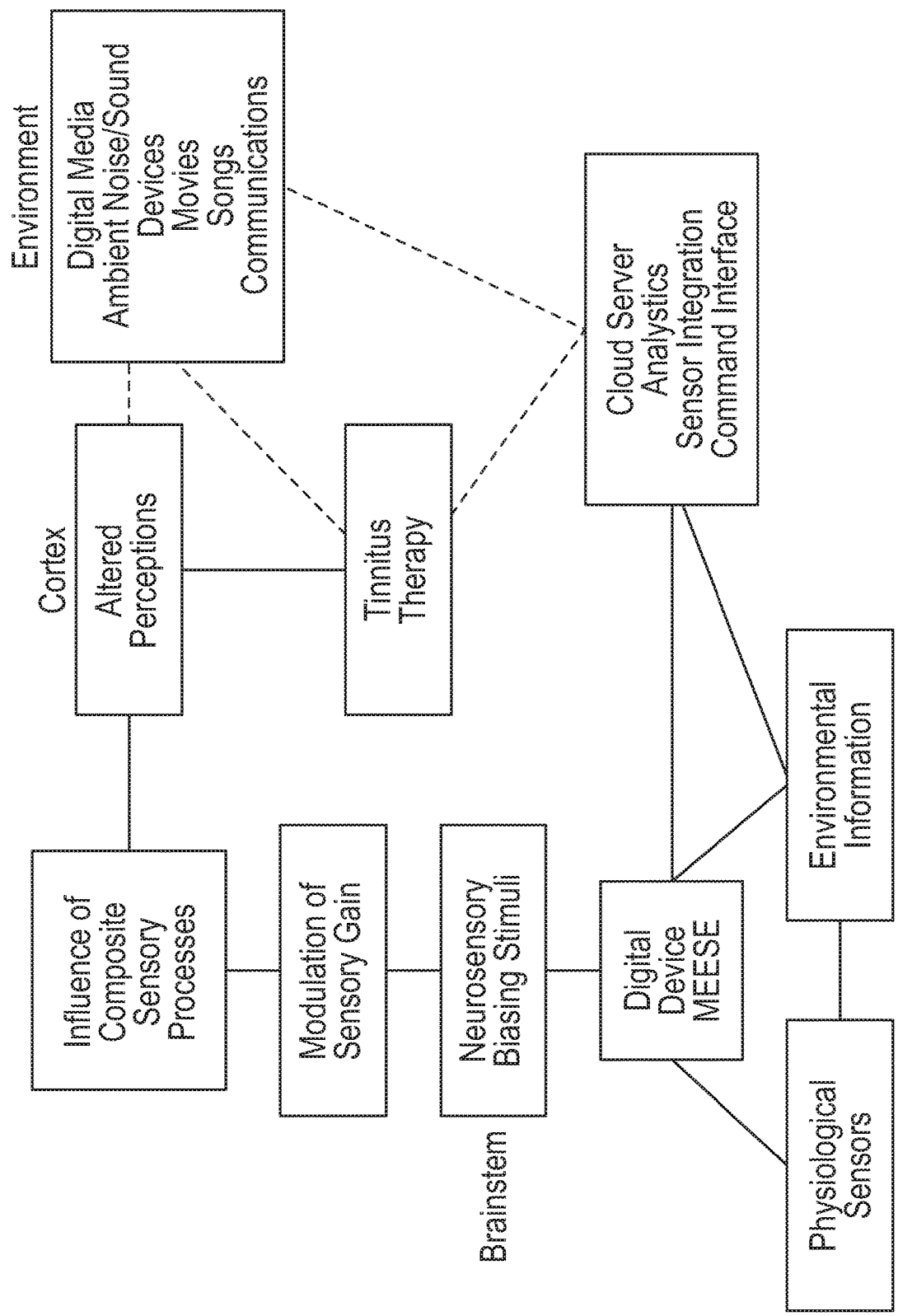
FIG. 18 is a schematic diagram illustrating operation of an apparatus (e.g., system) for neurosensory biasing including an interface configured to have network functions. The illustration shows the integration of a Neurosensory Biasing System in a connected architecture working in cooperation with physiological and environmental sensors through a cloud interface, cloud server, or a back-end as a service (BaaS). The user can use the MEESE or Neurosensory Biasing System to apply treatment, e.g., of tinnitus, such as to alter auditory perceptions while optionally interacting digital media or as desired to tune hearing quality in degraded or noisy environments. Thus, in this example, a user can use the MEESE to treat hearing dysfunctions, such as tinnitus.

Rather than the flesh of the outer ear sensing mechanical pressure waves or mechanical somatosensory information, an embodiment of the methods and apparatuses described herein is configured to deliver local electrical currents to the skin in a spatially segregated manner that can mimic or disrupt the natural encoding of variables conveying sound direction, wind, ambient noise to affect the perception of auditory information processed in the brainstem and eventually cortex. Being able to regulate such gains by introducing neurosensory bias through multi-channel external ear stimulate electrodes can be used for communication purposes to alter perceptions via human machine interactions or to enhance entertainment especially virtual reality, immersive, or other advanced digital entertainment methods known to those skilled in Media or Arts. See, e.g., FIG. 18. In other embodiments, stimulating one or multiple regions of the ear uses the introduction of functional neurosensory bias to influence the gains of perceived auditory information in a manner that reduces the symptoms of tinnitus including somatic tinnitus and tinnitus caused organically or due to damage or injury.

The methods and apparatuses described herein may deliver signals intended to functionally bias neurosensory activity through the pulsed modulation of salient sensory systems like neurovascular coupled sensory mechanisms, as well as conventional sensory mechanisms of peripheral nerves (see, e.g., FIGS. 9-13 and 14-17). Sensory bias is defined as an alteration of brain activity or nervous system responses that are generated by the functional modulation of tissues including nerves or vascular beds using pulsed energy, such as electrical currents delivered to the skin of the body as described.

Neurosensory biasing can be achieved through the direct modulation of sensory structures and peripheral nerves using pulsed energy as described. Sensory biasing may also be achieved through the indirect modulation of nervous system activity, for example by modulating local blood flow and in turn neurovascular coupling using pulsed electrical currents ranging from ultra-low to very high frequencies. Sensory biasing may also be achieved by modulating enzymatic processes such as ion exchange rates that are known to influence nerve activity used pulsed currents. Sensory biasing may also be achieved by modulating calcium dynamics in nerves during graded potential or action potential generation or before or after those potentials for a period of time lasting milliseconds to hours.

Functional Sensory Bias or Functional Neurosensory Bias is defined as the use of sensory biasing stimulation methods described herein to alter perception, perceptual awareness, or human machine interactions. In other embodiments, Functional Sensory Bias can be used to alter or influence aberrant brain networks in a therapeutic manner, such as to treat tinnitus or auditory distortions that manifest from a biological, physical, or psychological origin. Another use of Functional Sensory Biasing is to alter sensory filtering processes in a manner that optimizes auditory sensations of a pleasurable nature, such as operating in or out of phase with auditory stimulation such as during binaural beats stimulation/listening sessions or in conjunction with other digital audio filtering methods. Another embodiment of Functional Sensory Biasing would be the stimulation of regions of portions of the auricle or external ear in a manner that would to optimizes hearing or perceptual awareness within a desired auditory frequency regime <25 kHz to optimize detection within particular frequency bands, such as to improve detection of signals within common spoken voice bands from about 80 to 300 hertz.

An example of the outcome on tinnitus produced by introducing Functional Neurosensory Bias to the external ear is shown in FIG. 4. Analogous to sensory stimulation's ability to disrupt seizure activity, multisensory stimulation of nerves which process relevant (anatomical and functional) sensory information simultaneously with sound pressure displacement of the tympanic membrane may jam tinnitus perceptions.

Other aspects of these methods and apparatuses describe the use of wireless communication protocols known in the art such as WiFi, WiMax, Bluetooth, cellular protocols, and future methods that may incorporate, e.g., terahertz waves to provide high speed communication between wearable devices or stationary or portable devices located less than one meter and up to thousands of miles away where at least one of the devices contains one or more neurostimulation channels that is intended to stimulate, modulate, or bias the activity of a cell, nerve, or blood vessel in the external ear using a pulsed electrical current that has a pulse-width of 50 nanoseconds or longer like 1, 10, 20, 50, 100, 300, 500, or 1000 microseconds and an amplitude of 1 nanoampere or higher for example 100, 150, 300, 1000, or 2000 microamperes.

Embodiments of the methods and apparatuses described herein that are intended to bias ongoing neurosensory signals in the brain include devices that deliver pulsed electrical currents to the skin of the outer ear through one or more channels to discrete regions of the auricle. These devices may comprise a system for generating artificial or digitized somatosensory signals at the skin of the auricle or outer ear including the external auditory meatus, concha, tragus, and other fleshy parts of the ear protruding outside the head. The artificial or digitized sensory are defined as being extrasensory in nature since they are not responding to conventional environmental cues, such as touch, mechanical pressure, temperature, or pain. These artificial, digitized or extrasensory stimulation programs may consist of ultra-low to very high frequency events originating at the superficial skin of the human outer ear to bias brainstem activity and ascending network activity in auditory cortex, prefrontal cortex, somatosensory cortex, visual cortex, limbic centers, motor cortex, or the thalamus as determined through behavioral, electrophysiological, or more salient responses. Another embodiment includes a method of the same for effecting baroreception by way of altering the activity of baroreceptors located in or around the ear achieved by transmitting pulsed electrical currents through the superficial layers of skin on the outer ear.

A method of the same is described for biasing brainstem activity by delivering ultra-low to high frequency pulsed electrical currents to the skin of the outer ear or pinna including or not including the concha, external auditory meatus, tragus, and other anatomical regions of the ear in order to modulate the physiological response characteristics or activity of Merkel's disks, Meissner's corpuscles, Ruffini's corpuscles, and Pacinian corpuscles, as well as other receptor bodies known in the art to be located in the skin. See, e.g., FIGS. 5A-5B and 6.

Figure 5A:
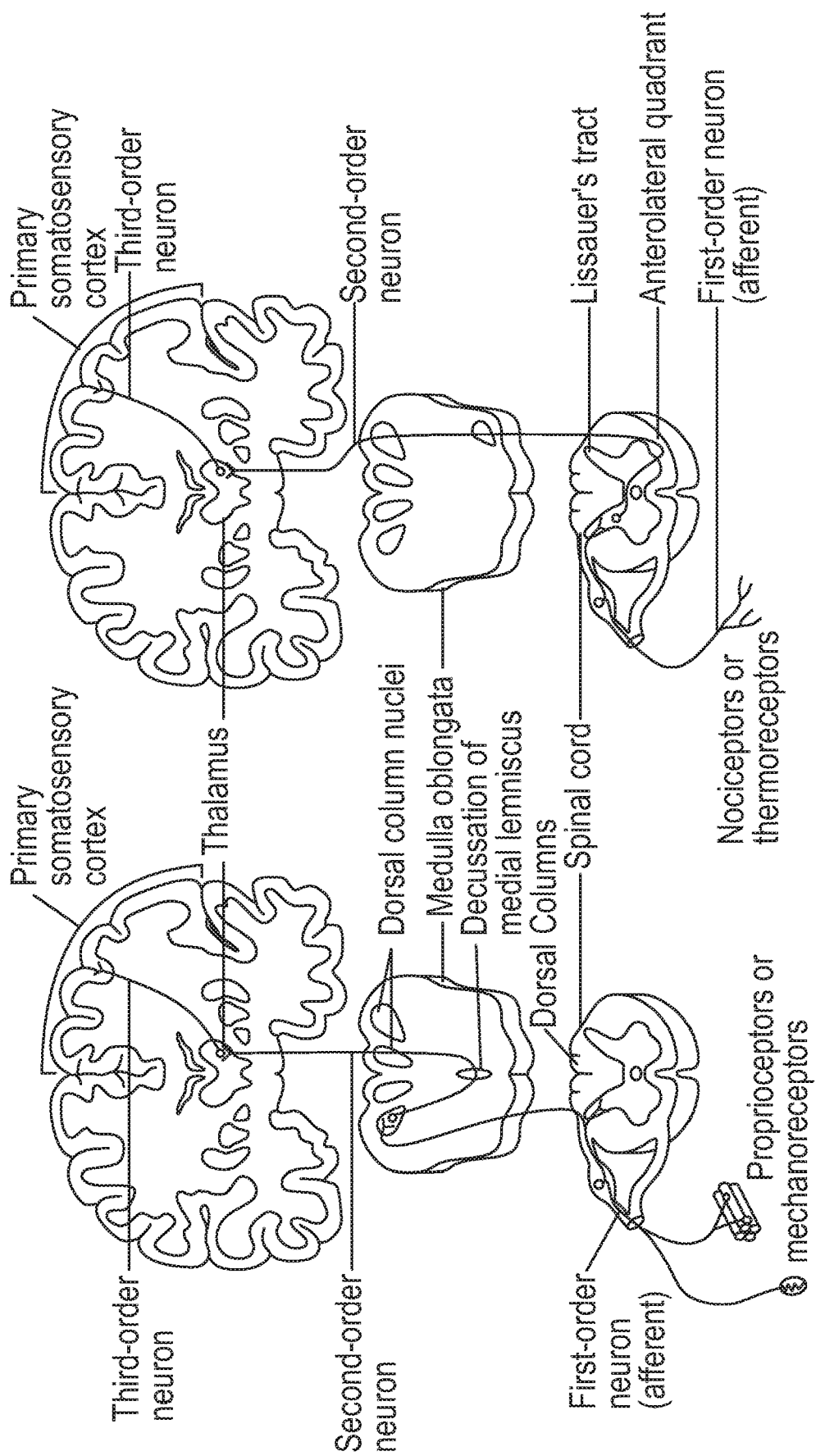
FIGS. 5A and 5B illustrate one example of peripheral neurosensory biasing as described herein. For example, pulsed electrical stimuli having a frequency of about 300 hertz or higher may be used to bias the activity of brain circuits (shown in FIGS. 5A and 5B) known to carry sensory information to the brain. Multiple channels and multiple frequencies may be used to bias ongoing brain circuit activity to achieve an effect on perceptual processes or other desired outcomes. Given the integration of multiple sensory systems and the impact of electrical activity in these pathways on composite sensory processes like hearing or attention, a variety of peripheral sensory receptors in locations other than those located on the external ear, head, face, and neck receptors for example on the wrist, leg or foot may also be used to modulate hearing processes or other composite sensory processes to varying degrees. Peripheral neurosensory biasing may be used in conjunction (as part of) any of the methods described herein, unless otherwise indicated.
Figure 5B:
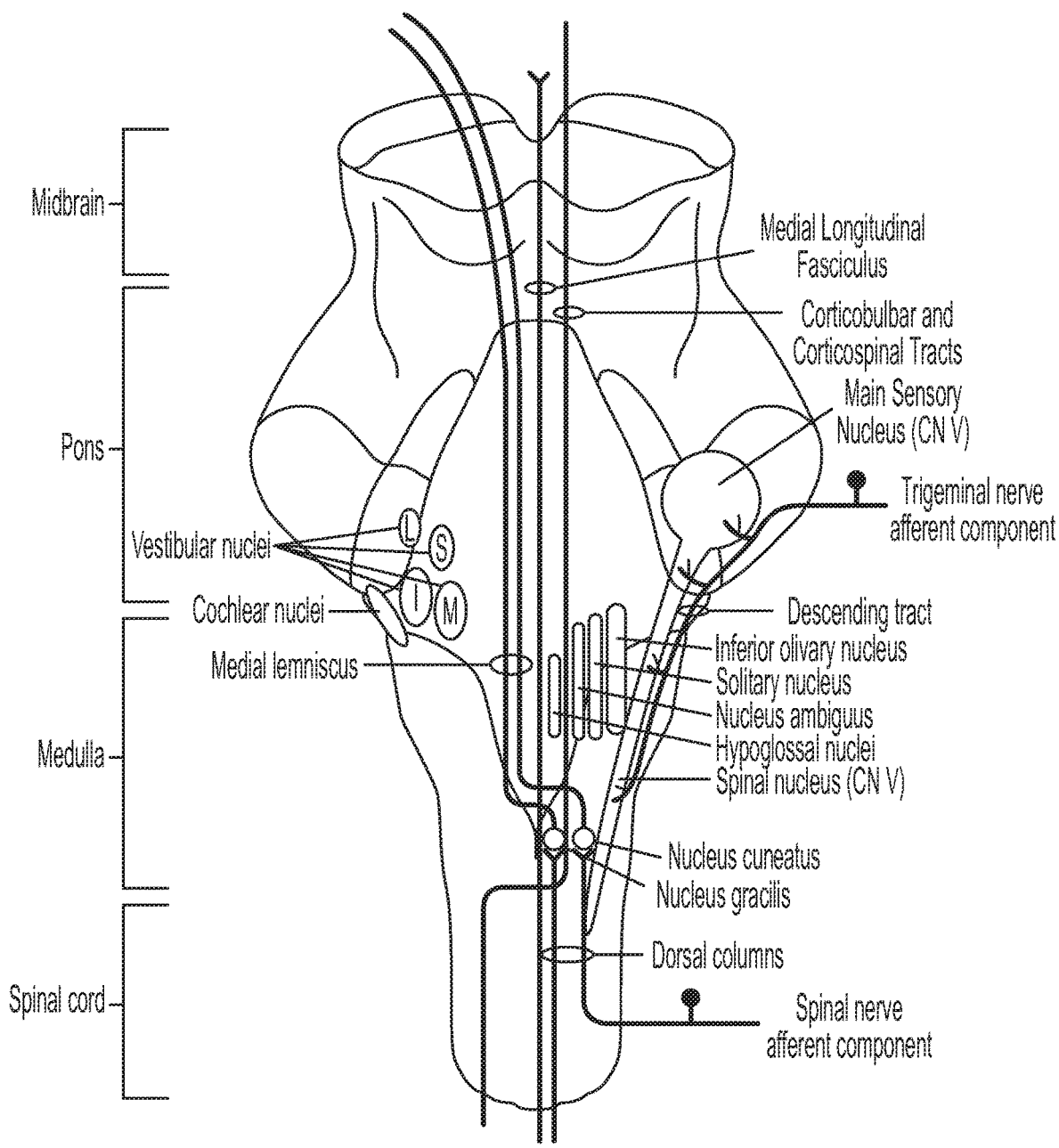

In FIGS. 5A-5B, pulsed electrical stimuli having a frequency of about 300 hertz or higher are used to bias the activity of brain circuits known to carry sensory information to the brain. Multiple channels and multiple frequencies may be used to bias ongoing brain circuit activity to achieve an effect on perceptual processes or other desired outcomes.

A method of the same for biasing brainstem activity by delivering ultra-low to very high frequency pulsed electrical currents to the hair follicles of the pinna or outer ear, in some cases including the fine hairs in the epidermal layers of the skin lining the external auditory meatus, is described. For example, a method for biasing brainstem activity may include delivering ultra-low to high frequency pulsed electrical currents to the skin of the outer ear or pinna, in some cases including the concha, external auditory meatus, tragus, and other anatomical regions of the ear in order to modulate the physiological response characteristics or activity of Merkel's disks, Meissner's corpuscles, Ruffini's corpuscles, and Pacinian corpuscles, as well as other receptor bodies known in the art to be located in the skin. Any of these methods may include heating the tissue of the outer ear less than three degrees Celsius to modulate ongoing neuronal activity in the nerves innervating the external ear, as well as blood flow or enzymatic activity of tissues of the auricle.

A device and method for delivering digitized signals to the skin of the outer ear for the purposes of enhancing human-machine interactions may include affecting somatosensory receptors or neurovascular activity of the outer ear or cochlear blood flow. See, e.g., FIGS. 5A-6, 9-13 and 14-17. Any of these methods may regulate cardiovascular function for therapies, diagnostics, or other purposes.

An embodiment of the methods and apparatuses described herein may include one or more (e.g., 1-20, 1-18, 1-15, 1-10, 2-20, etc.) independent electrode channels operating in a synchronized, asynchronous, or randomized manner to deliver ultra-low to very high frequency pulsed electrical currents to the outer ear. The multiple channel approaches described in this invention may be configured to transduce broadband somatosensory stimuli to the skin and nerves of the outer ear. An example embodiment of this is a method for neurosensory biasing with tremendously high bandwidth spanning about 100 hertz to about ten kilohertz or 50 kilohertz or one or ten megahertz.

There are several major peripheral nerves which innervate the outer ear and to affect broadband somatosensory stimulus from a physiological perspective the use of multiple, independent channels may be preferred.

Thus, any of the apparatuses described herein may include a multi-channel external ear neurostimulation electrode, device, or system that may incorporate wireless communication modules known in the art, such as Wi-Fi, Bluetooth, Wi-Max. A MEESE may include terahertz resonators and antennas for communicating with other external devices at high speeds located less than one meter from a neurostimulation device. Any of these methods may provide for wireless communication with devices more than one meter away and may include the use of electromagnetic radiation at frequencies in the megahertz, gigahertz, or terahertz range.

An example embodiment of the described inventions is a four-channel, electrode custom molded for to fit in a user's outer ear (e.g., ear canal). The four channels may provide discrete pulsed waveforms to four different regions of the ear that are each mainly innervated by different nerve fibers as described below. The timing of stimuli is adjusted by a user or control operator, such that alternating regions of the outer ear are stimulated in a sequential manner that repeats for a period of time desired by the user or operator. Neurostimulation adjustments may be made using a user control interface over a network or local device control interface until the desired effects are achieved. Such desired effects may include a change in heart rate, a change in the power of the alpha, beta, or gamma band of EEG signals, a change in perceptual awareness, a change in local blood flow, an amplification, filtering, or demodulation of other sensory (auditory, proprioceptive/postural/balance or visual cues for example) signals processed in the brain stem and cortex. Desired effects may be transient lasting tens to hundreds of milliseconds or chronic lasting hours to days and weeks.

Any of the apparatuses described herein may be customized (e.g., custom formed) to a subject's anatomy. For example, molds may be constructed of polymers, elastomers, or other plastics and moldable materials known in the art that have electrically conductive values or not. The process for creating external ear molds that are to be worn in the ear should be conducted on an individual basis with the end user's jaw open as is known in the art of constructing ear molds to ensure a proper fit. In another embodiment of the methods and apparatuses described herein, an ear mold may be constructed for a normalized ear or for normalized ears of different shapes and sizes for universal fitting rather than personalized molding. See, e.g., FIGS. 13-17.

Any of the apparatuses described herein may be single-channel or multi-channel (e.g., 2 channel, 3 channel, 4 channel, etc.), and may include an outer ear neurostimulator (including post or projection into the ear canal) that includes an auditory speaker for delivering concurrent or sequential auditory and somatosensory stimuli. See, e.g., FIGS. 9-13 and 14-17. Any of these apparatuses may be configured as an outer ear neurostimulator device for delivering ultra-low to very high frequency somatosensory stimulation waveforms to the human outer ear for the treatment of tinnitus. Any of these methods may include a multichannel outer ear neurostimulation device.

An outer ear neurostimulator may be configured for delivering ultra-low to very high frequency somatosensory stimulation waveforms to the human outer ear for the treatment of cardiovascular dysfunctions, such as hypertension and arrhythmias. Any of the method described herein may use a multichannel outer ear neurostimulation device.

An outer ear neurostimulator may be configured for delivering ultra-low to very high frequency somatosensory stimulation waveforms to the human outer ear to modulate processes related to physiological homeostasis, such as body weight or body temperature. A method of modulating processes related to physiological homeostasis, such as body weight or body temperature, may include a multichannel outer ear neurostimulation device. An outer ear neurostimulator may be used to deliver ultra-low to very high frequency somatosensory stimulation waveforms to the human outer ear for the reduction of fever.

An outer ear neurostimulator may be configured to deliver ultra-low to very high frequency somatosensory stimulation waveforms to the human outer ear for the treatment of neuropsychiatric diseases including major depressive disorder, generalized anxiety disorder, and other stress related disorders like posttraumatic stress disorder. In some variations the apparatus may be configured as a closed loop multichannel outer ear neurostimulator that receives commands signals as a function of EEG signals recorded from the external ear including the external auditory meatus or from periaurcular regions, such as behind or around the external ear. For example, a closed loop multichannel outer ear neurostimulator may receive commands signals as a function of heart rate or EEG recorded from the ear and delivers pulsed electrical stimuli to alter blood flow to the ear in a manner that alters auditory sensations and perceptions. In some variations a closed loop multichannel outer ear neurostimulator may receive commands signals as a function of heart rate recorded from the ear and delivers pulsed electrical stimuli to influence cochlear blood flow or blood pressure or heart rate by stimulating the external ear using neurosensory biasing methods or a single or multichannel external ear stimulating electrode.

Any of the apparatuses described herein may be configured as multichannel external ear neurostimulation devices incorporating a thermistor or temperature sensor for tracking changes in temperature produced by somatosensory biasing through the delivery of ultra-low to very high frequency pulsed electrical currents to regions of the outer ear inclusive or not of the external auditory meatus. For example, a multichannel external ear or auricular neurostimulation device may incorporate one or more optical sensors and light emitting diodes for conducting spectroscopic analysis of blood oxygenation, blood flow, heart rate, or other cardiovascular dynamics produced by somatosensory biasing through the delivery of ultra-low to very high frequency pulsed electrical currents to regions of the outer ear inclusive or not of the external auditory meatus. A multichannel stimulator may be configured to deliver a neuromodulation biasing sequence, where differential current intensities are delivered to nerves of the outer ear. For example, a maximum power level ratio (total power/neurostim current intensity to individual channel power/current intensity) of 1 shall be distributed across at power ratio of 0.4 to the auricular branch of the vagus and approximately 0.2 each to the trigeminal, facial, and cervical nerve branches innervating the skin of the outer ear. Different power rations across various nerves may be used in ranges for each nerve ranging from 0.01 to 0.99 such that the total power spectrum of the neurostimulation programs are dispersed across one or more nerves or anatomical regions of the outer ear. In some variations, a multichannel stimulator may deliver a neuromodulation biasing sequence, where the spectral power of neurostimulation frequencies is differentially distributed across nerves of the outer ear. For example, seventy percent of the power in the frequency band ranging from 500 hertz to 1,000 hertz may be delivered to regions of the outer ear chiefly innervated by the auricular branch of the vagus nerve while thirty percent of that power band is directed to the skin of the outer ear that is primarily innervated by the trigeminal nerve. In a similar fashion 95 percent of the power in the neuro stimulation frequency band ranging from 2,000 hertz to 2,000,000 hertz may be simultaneously delivered to the trigeminal nerve and five percent of that power may be delivered to the auricular branch of the vagus nerve. Different frequency components of a composite broadband sensory stimulus may be used in ranges from about 200 Hertz to above one kilohertz or above up to, in some cases, about 100 kilohertz such that each nerve or region receives powers of a frequency band ranging from 0.01 to 0.99 such that the total power spectrum of the neurostimulation programs are dispersed across one or more nerves or anatomical regions of the outer ear whereby one region receives stimulation at frequencies less than about one kilohertz and other channels may receive stimulation at frequencies higher than about one kilohertz.

A multichannel external ear neurostimulation device may incorporate one or more ultrasound transducers for imaging alterations to hemodynamic activity, blood flow for example, of arteries in the ear or brain produced by somatosensory biasing achieved through the delivery of ultra-low to very high frequency pulsed electrical currents to regions of the outer ear inclusive or not of the external auditory meatus. In some variations, a multi-channel electrode (e.g., four-channel electrode) composed of conductive silicon, conductive rubber, graphene, or other electroconductive polymer or biocompatible electrically conductive material may be used to transmit currents to the skin of the outer ear. An embodiment of the electrodes may also include the delivery of ultra-low to high frequency pulsed electrical currents to the skin lining the ear canal. The electrode should have interleaved nonconducting regions or non-conducting Insulating Layers (NILs) to enable electrical isolation of channels for independent stimulation of different anatomical regions of the outer ear. Electrodes may have a multi-layer construction composed of a nano-carbon ink printed materials, layers of conductive polymers, or layers of conductive metal fabrics or materials including hydrogel substrates that may be used to improve electrical coupling of a MEESE or similar device to the external ear.

Any of these methods may be configured for introducing pulsed electrical currents to different locations of the skin's surface from multiple channels in an intelligently scrambled sequence. The described architecture may provide for complex human machine interactions by enabling uniquely scrambled electrostimulation sequences delivered to discrete body locations in a manner that is tied to environmental, computational, logic, or physiological triggers. Electrical stimulation used for neurosensory biasing is not restricted to the external ear and similar effects may be achieved using on or more peripheral nerve stimulation sites operating together or in isolation. An embodiment of such may include a wristband to stimulate the median nerve or an ankle band to stimulate nerves innervating the calf and foot. These devices may work in cooperation with external auditory electrodes, but may not need to in order to modulate composite sensory processes like hearing.

As neuromodulation systems become integrated with sensors, sensor bodies or sensor networks there is a need to achieve multiplexed neuromodulation such that neurostimulation can be achieved by delivering pulsed currents to different regions of the body. For example, pulsed stimulation may need to be delivered to the hand or wrist in one set of human machine interactions whereas the skin of an ear may need to be stimulated under another set of human machine interactions. Intelligent Scrambling of a Neuromodulation Sequence may refer to the dynamic nature and requirement for timing commands and cued events that occur across variable sensor network activity. For example, consider a situation where stimulation of nerve afferents of the external ear occur to orient a user's perceptual awareness of a target condition 500 milliseconds after a predetermined digital event occurs. The occurrence of such a digital event, for example the emergence of an object in a digital frame, which repeats at random time intervals several times per hour or more. In addition to this series of neurostimulation events, pulsed electrical signals may be commanded to stimulate the peripheral nerves of the wrist or external ear within 50 milliseconds of an analog signal elsewhere in an environmental network (for example, an internet of things or connected home) crossing some predetermined threshold. Thus, any combination of digital and analog cues may trigger events in a manner such that their delivery with respect to one another is scrambled, but scrambled in an intelligently directed fashion to alter perceptual awareness or to bias sensorimotor networks of the brain including movements and communication.

Any of these embodiments may include a Scrambled Sensory Neuromodulation process using a multi-channel external ear stimulating electrode (MEESE). For example, different channels of the MEESE can be programmed to deliver neurostimulation protocols in a customized manner. An exemplary two-channel MEESE is described to differentially regulate cardiovascular dynamics and perceptual arousal or awareness. In this example channel 1 of the MEESE provides pulsed electrical signals having a frequency of about 500 hertz to the skin of the right, left, or both external auditory meatus regions of the ear(s) to target predominantly branches of the auricular branch of the vagus nerve. Channel 2 of the MEESE in a similar unilateral or bilateral fashion transmits pulsed electrical currents at a frequency of about 1,000 hertz to the concha. Pulsed electrical stimuli from channel 1 may be triggered for delivery to the external meatus if a heart rate signal crosses some threshold such that heart rate transiently decreases. Pulsed electrical stimuli from channel 2 may be triggered for delivery to the concha to increase perceptual awareness or arousal in reference to an environmental trigger or cue.

The methods and apparatuses described herein may include a transdermal neurostimulation electrode having a cylindrical, elliptical or irregularly shaped contour with a major axis or diameter less than about 35 millimeters for example 8, 10, 12, 18, 25, or 30 millimeters containing a pulse generator and battery housed within an insulated tube or compartment longer than about 8 millimeters for delivering pulsed currents to the skin in a punctate manner across different regions simultaneously or nearly simultaneously through a conductive polymer or that makes contact with the skin's surface, such as the skin of the outer ear or auricle, to alter or perturb composite sensory processes like hearing.

Any of the embodiments of the apparatuses described herein may be comprised using an outer cylindrical, square, oval, or other geometrically symmetrically or asymmetrically shaped layer containing aluminum, titanium, Teflon, or other nonconductive materials to provide non-conductive insulating layers (NIL) for isolating the influence of transdermal Neurosensory Biasing Signals, neurostimulation pulses, or Scrambling Neuromoldulation programs to a discrete region of the skin. Neurosensory Biasing or Scrambled Neuromodulation may be achieved in such a manner using NILs to deliver transdermal pulsed electrical signals across the skin having an amplitude greater than about 100 microamps up to about 100 milliamps for a minimum of 0.01 seconds at a pulse frequency greater than about 100 Hertz for example 300, 350, 500, 1000, or 10,000 Hertz.

In some embodiments the apparatus may include a tube or hollowed compartment of any geometrical shape having a diameter or major axis of about 10 millimeter or larger, such as 15, 20, 25, 30, or 50 millimeters comprised of a material or containing aluminum, titanium, Teflon, or other nonconductive material and may include additional layers or plastics or polymers surrounding the tube or hollowed compartment containing a battery or control circuitry for a transdermal neurosensory biasing device delivering pulsed electrical signals across the skin having an amplitude greater than about 100 microamps up to about 100 milliamps for a minimum of 1 second at a pulse frequency greater than about 100 Hertz for example 300, 350, 500, 1000, or 10,000 Hertz.

A MEESE may be activated locally by a button or remotely via a connected approach (e., to deliver a metered dose of neurostimulation or neuromodulation lasting 1, 2, 3, 4, 5, 8, 10, 20, 30 seconds or in some variations 1, 2, 3, 5, 10, or 20 minutes at some maximum current intensity greater than 100 microamps and less than about 100 milliamps to the external ear in one or more locations for the purpose of altering auditory sensations or perceptions. See, e.g., FIGS. 11-13.

In any of the apparatuses and methods described herein pulsed stimuli delivered may be delivered from a punctate electrical neuromodulation device or MEESE and should have a frequency higher than about 300 hertz such as 350, 500, 1000, 2000, or 10000 hertz to minimize the activation of pain and muscle fibers. Some embodiments of the methods and apparatuses described herein may have a neurobiasing frequency of about 100, 200, 300, 400, 500, 1000, or 10000 pulses per second delivered in a random or sequential fashion containing the delivery of at least four pulses at one or more frequencies greater than about 130 hertz such as 500 or 1000 Hertz.

For example, any of these apparatuses may include a tubular or irregular shaped neurostimulation device that also contains a blue-tooth low energy module, Wi-Fi module or other communications architecture known in the art for transmitting stimulus duration and intensity to another device or devices including cloud services upon activation or inactivation of Neurosensory Biasing or Scrambled Neuromodulation or isolated neurostimulation from regions of the outer ear. In some variations, the methods and apparatuses described herein may provide punctate or focalized transdermal neuromodulation or neurostimulation waveforms to the head, face, ear or back of the ear for more than one second to treat tinnitus.

EXAMPLES

Figure 19:
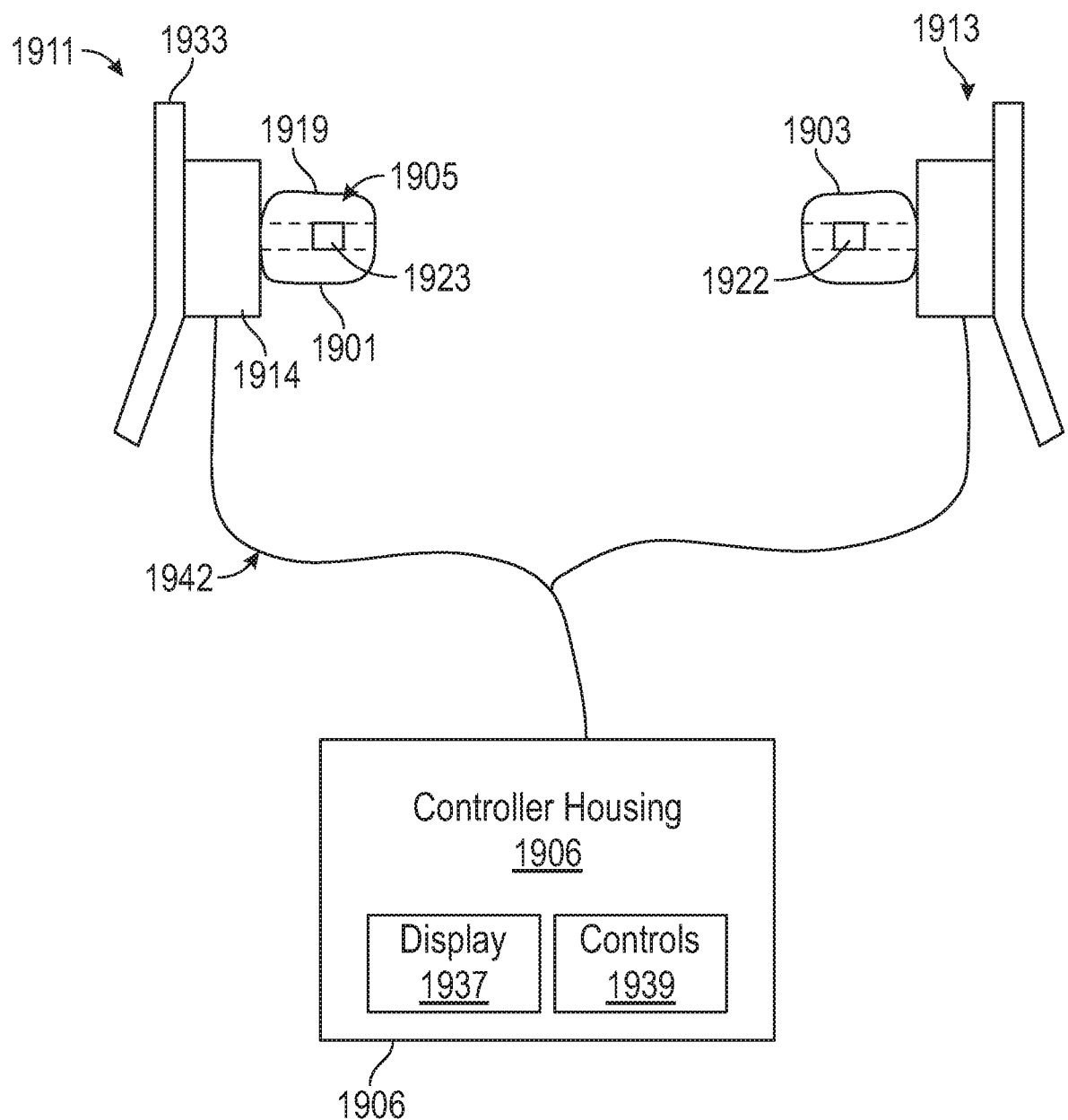
FIG. 19 is a schematic showing another example of an apparatus (e.g., a multi-channel external ear stimulating electrode) that may be used with some of the methods described herein.

FIG. 19 schematically illustrates one example of an apparatus as described herein. In FIG. 19, the apparatus includes a first low-impedance and compressible hydrogel 1901 on a first earpiece and a second low-impedance and compressible hydrogel 1903 on a second earpiece, each configured to fit into an ear canal so that the hydrogel expands to contact a wall of the first ear canal. The first hydrogel comprises a first electrical contact (entire outer region 1905 in FIG. 19). The second low-impedance and compressible hydrogel is also configured to fit into a second ear canal so that the hydrogel expands to contact a wall of the second ear canal. The hydrogel fits (in this example, like a tubular sleeve) over a projection 1919 extending from a base of the earpiece and is in electrical contact with an electrode 1923 on/in the projection. Each earpiece may also include an earpiece housing and a frame or other retention structure 1933 that is configured to secure the earpiece in/on the subject's ear with the hydrogel within the ear canal. In some variations the earpiece does not include an additional retention structure. In some variations the retention structure may include a frame (e.g., a flexible polymeric or metallic frame) that conforms to the outer region of the ear to help hold it in place. In some variations the retention structure may include an adhesive. The retention structure and/or the earpiece housing may include one or more additional contacts (e.g., electrical contacts).

FIG. 19 also shows a controller 1906 coupled with the earpieces and therefore the first and second electrical contacts. The controller may be configured to deliver a treatment electrical signal, e.g., between the first and second electrical contacts, such as a treatment electrical signal comprising a biphasic, pulsed signal having a frequency of greater than 200 Hz to deliver a current density of greater than 2 mA/cm$^2$. The apparatus (e.g., system) shown in FIG. 19 also includes wires 1942 coupling the controller 1906 to the earpieces 1911, 1913. As mentioned, the earpieces may be configured to secure the apparatus in the subject's ear, so that the hydrogel portion makes contact with the ear canal at one or more locations. The ear pieces may be configured so that the hydrogel may be removed/replaced on the earpiece, e.g., on the protrusion 1919 of the earpiece.

In FIG. 19, the earpieces each include a body 1914 to which other components attach, such as the projection onto which the hydrogel 1901, 1903 is attached (e.g., formed) onto. The hydrogel 1901, 1903 may be removably attached to the projection 1919. The projection may be a hollow tube or cone-shaped structure. As mentioned, the earpiece neurostimulators 1911, 1913 may also include a retention structure 1933, such as an attachment, for retaining the earpiece in the outer ear (pinna) region. An audio element (not shown) may be included in the apparatus as well.

Figure 20A:
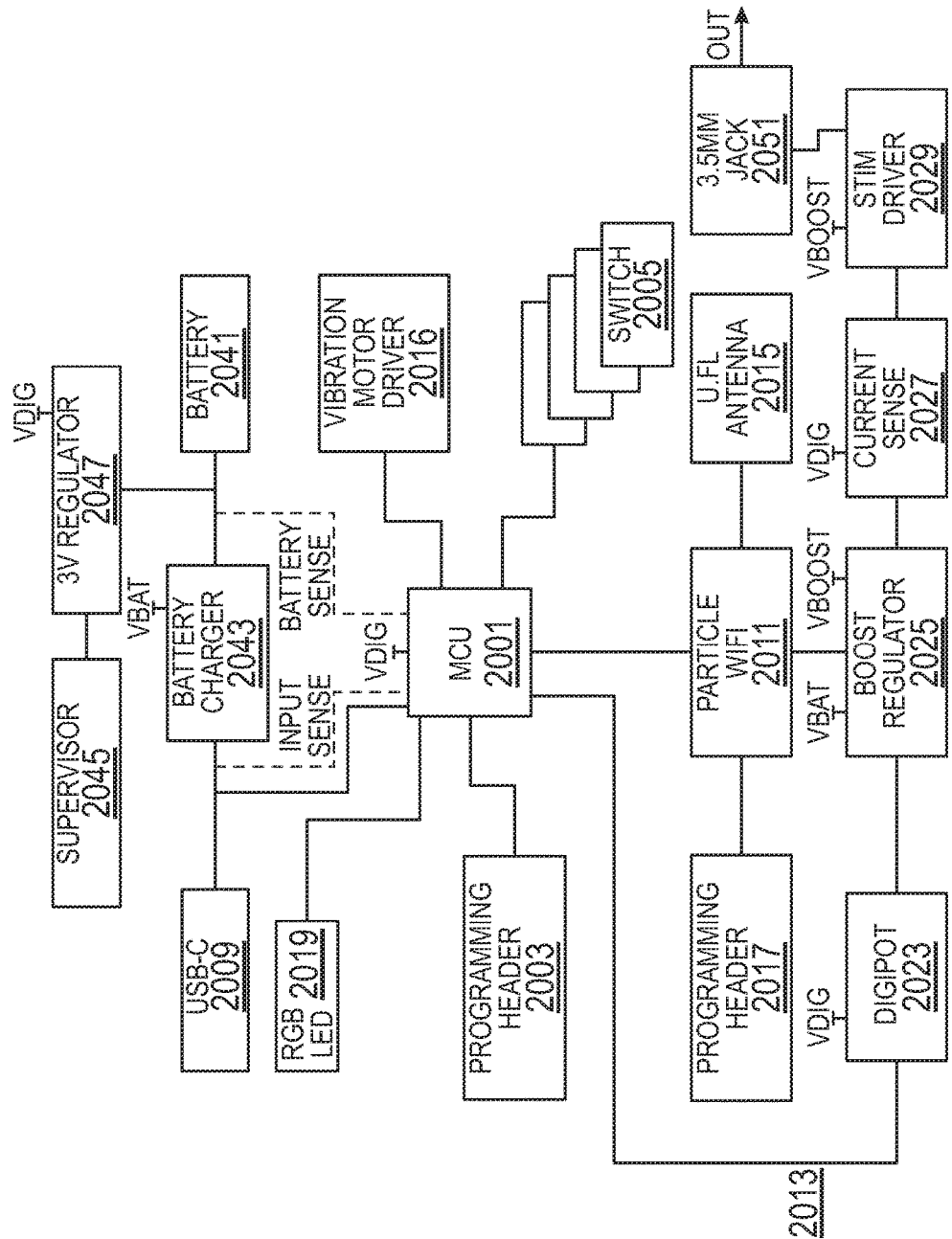
FIG. 20A schematically illustrates one example of the apparatus (such as the one shown in FIG. 19) that may be used with the methods described herein.
Figure 20B:
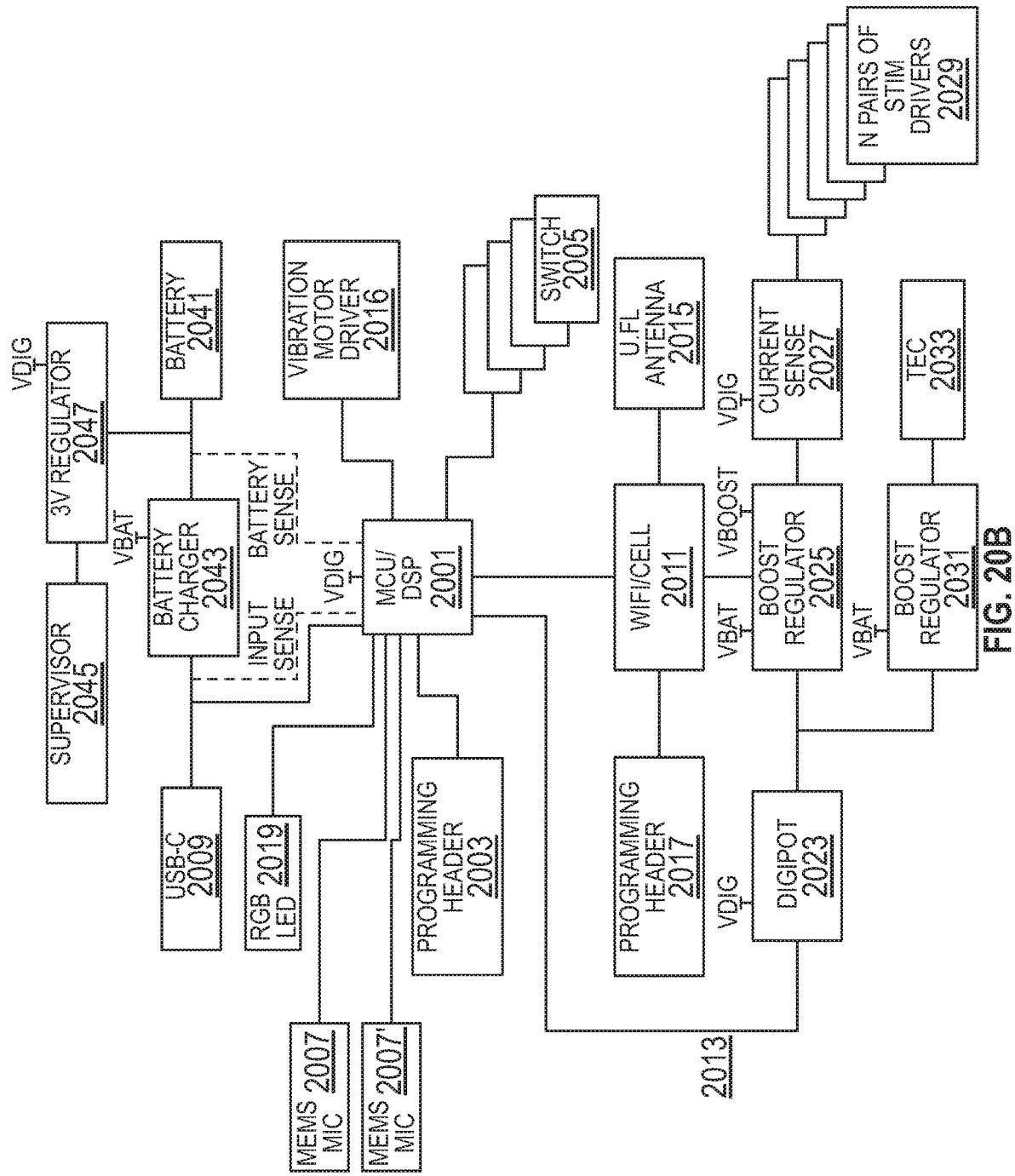
FIG. 20B schematically illustrates another example of an apparatus that may be used with the methods as described herein.

FIGS. 20A-20B schematically illustrate examples of apparatuses as described herein. In FIG. 20A the apparatus may include a controller 2001 that communicates with: a program header 2003, one or more switches 2005, an inputs (e.g., microphone inputs 2007, 2007', input ports 2009, wireless/wired inputs 2011, and one or more sensors). Switches may include any appropriate controls (e.g., on/off, increase/decrease signal intensity, etc.). The apparatus may include wires communication and may include one or more antenna 2015, and hardware/software (e.g., programming/ programming header(s) 2017). The apparatus may also include one or more outputs (e.g., LEDs 2019, vibration 2016, displays, etc.). In general, the controller may also control output 2013 of the apparatus to apply the sensory biasing signal. This may include controlling electrical treatment signals (via digital controls 2023, boost regulators 2025, current sensing 2027, one or more drivers 2029, etc.). In the variations shown in FIG. 20A, the apparatus is configured to output electrical sensory bias signals, while in FIG. 20A, the apparatus is configured to output both electrical sensory bias signals and caloric (e.g., temperature) sensory bias signals, via the additional temperature output boost regulator 2031 and heater/cooler (e.g., TEC 2033). In some variations the signal driver 2029 may be connected to an output or jack 2015 that may allow connection to the earpiece containing the contacts (e.g., hydrogel contacts). The support frame for attaching to the body (e.g., ear, ear canal, etc.) may be coupled to the stimulation outputs and/or inputs, and may house or be connected to the components shown. The hydrogel (e.g., low-impedance and compressible hydrogel and/or thermally conductive hydrogel) that is configured to fit into a subject's ear canal and expand to contact a wall of the ear canal, is not shown in FIGS. 20A-20B but may be included. As mentioned above, the hydrogel may form one or more contacts (e.g., electrical contacts, thermal contacts, mechanical contacts, optical contacts, etc.).

Any of these systems may also include one or more power regulator(s) including a battery 2041, battery charger 2043, power supervisor 2045 and regulator 2047. Power may be received (charged) via an input such as a USB input 2009, and the controller 2001 may receive data from the charge and/or charging status (battery sense, input sense, etc.).

Figure 11A:
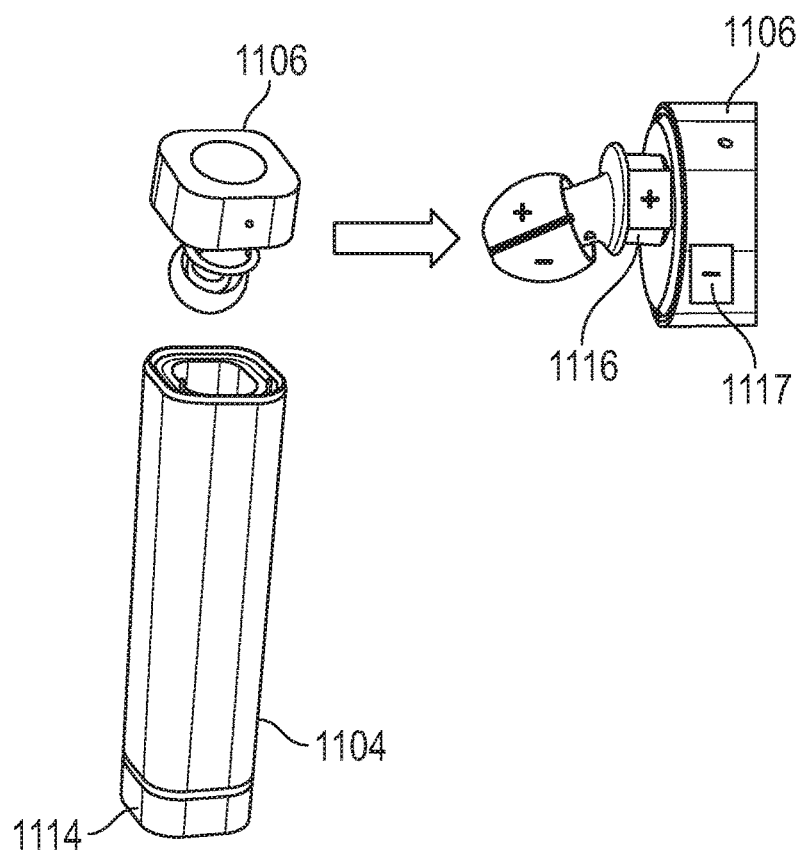
FIG. 11A illustrates one example of an apparatus (e.g., a sensory scrambling and neurosensory biasing system).

FIG. 11A illustrates another example of an apparatus (e.g., neurosensory biasing system) that may be used to perform the methods described herein. In this example the apparatus may include a base (storage base 1104) that may house one or more microprocessors, microcontrollers, power banks (e.g., battery), LEDs, USB charging port, USB serial interface, Bluetooth® low energy (BTLE), WIFI, or other communications hardware and firmware, as well as common environmental sensors, such as a microphone, thermometer, light sensor, accelerometers, GPS, and other sensors/outputs (e.g., displays, etc.). This base may be optional. The storage base 1104 may store the sensory interface 1106, configured as an earpiece in FIG. 11A. In this example, the earpiece includes one or more outputs (e.g., electrodes, thermal outputs, etc.). In FIG. 11A, the earpiece includes a pair of stimulating electrodes 1108, 1110. In general, these stimulating electrodes may be bipolar or monopolar stimulating electrodes.

The sensory interface (e.g., earpiece) may itself include one or more (e.g., two or more) of following Bluetooth® low energy (BTLE), WIFI, Battery, Stimulus Amplifiers, Audio Speaker, Piezo element for vibration, Single or Multichannel Controllers LED, Microphone, Accelerometers, EEG sensors and Differential Amplifiers, HR sensors. A second sensory interface, which may be identical of different from the first sensory interface 1106 may also be included. In FIG. 11A, the sensory interfaces are configured to be multichannel external ear stimulating electrodes (MEESE), as described herein, and may include additional electrical contacts 1116, 1117 for applying sensory biasing signals to the pinna or other body regions.

Figure 11B:
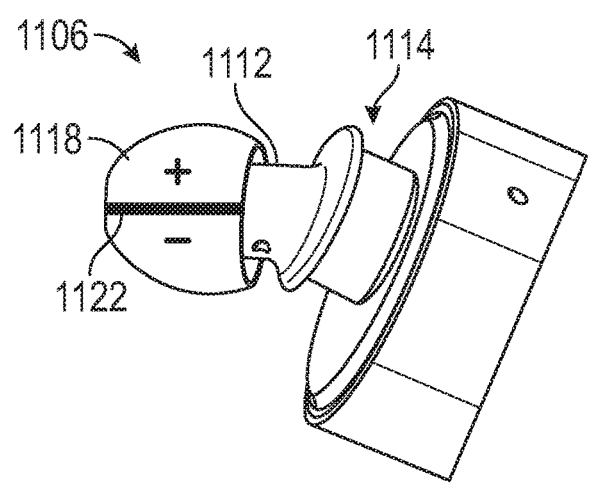
FIG. 11B shows an example of one embodiment of a Multi-channel External Ear Stimulating Electrode (MEESE), e.g., a Neurosensory Biasing System, that may be used by the system of FIG. 11A to treat a subject (including modulating auditory perceptions or hallucinations such as tinnitus). The MEESE or neurosensory biasing Interface may include a multi-function transdermal neurostimulation system or Neurosensory Biasing System that may be combined with a storage base as illustrated; the base may also be configured to deliver punctate neurostimulation. Neurostimulation channels and active electrode regions are depicted by +/− or CH. The portion of the electrode interface designed to insert in the external acoustic meatus (top left) is shown as a bipolar electrode to stimulate the vagus and trigeminal nerves simultaneously. The MEESE shown on the top right includes a second neurostimulation channel; this second channel may be a bipolar electrode consisting of anode and cathode intended to stimulate the concha. Channel one and Channel two of the MEESE can operate in phase or out of phase of one another at the same frequency or at different frequencies to exert an effect on cochlear blood flow and other neurovascular dynamics of the ear. The stimulus is also intended to influence auditory perceptions before, after, or during Neurosensory Biasing, Scrambled Neuromodulation, or Punctate Neuromodulation using the device. The sites of MEESE electrodes shall be made of conductive polymers of material capable of comfortably delivering pulsed currents to the skin of the outer ear.
Figure 11C:
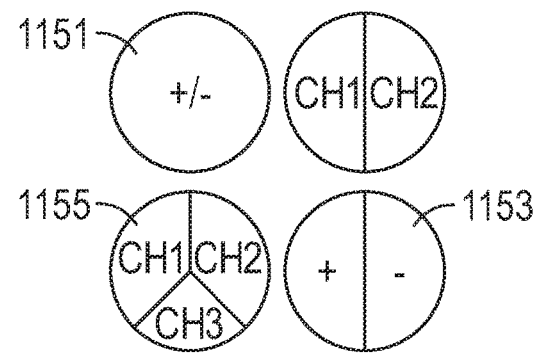
FIG. 11C shows an example of contacts that may be included as part of the system of 11A.

FIG. 11B shows an enlarged view of one example of a sensory interface 1106 similar to that shown in FIG. 11A, and configured as an earpiece. In this example a projection 1112 extends from an external frame 1114 to be inserted into an ear canal opening. A hydrogel 1118 may be applied over the projection, and may include one or more (in this example, two) contacts, configured in FIG. 11B as electrical contacts. The middle of the hydrogel may be open (e.g., forming a tube-like structure), not shown. The two contact regions may be separated on the post (or in some variations in the hydrogel) by a non-conductive insulating layer (NIL) 1122, thereby dividing the low-impedance and compressible hydrogel into two electrical contacts in this example; the electrical contacts are arranged radially around the projection (and therefore around the hydrogel). As mentioned above, in some variations (as shown in FIG. 11A) the earpiece may also include one or more contacts for other regions of the outer ear (outside of the ear canal), for example by including one or more regions of conductive polymer or other conductive materials to enable the stimulation of different regions of the outer ear if desired through multiple channels.

In variations of these apparatuses that include a base 1104, the base may include one or more additional contacts for applying sensory biasing signals. For example, in FIG. 11A, the bottom of the base is configured to be used as a punctate neurostimulation interface to provide focal stimulation of the skin and nerves for acute treatments (e.g., such as treatments lasting typically less than 1 minute, 2 minutes, 3 minutes, 5 minutes, etc.). The base may contain one or more contacts (e.g., electrical contacts, thermal contacts, etc.) configured as separate channels that may be separated by one or multiple insulating regions. In some variations these contacts may be configured to apply monopolar 1151, bipolar 1153, or tripolar 1155 stimulation in a punctuation manner, e.g., on the subject's skin, when held against the skin. Skin contact may be detected by one or more sensors, including sensors coupled to the electrodes in variations applying electrical stimulation, such as impedance sensors, pressure sensors, etc.

In some variations the base may be configured as a storage and/or charging housing for the one or more earpieces. The base may be configured to store the hydrogel in an airtight and/or humidified chamber to prevent excessive drying (or in some variations to rehydrate) the hydrogel. The base may also be configured to charge the earpiece, particularly in wireless variations. Any of the apparatuses described herein may include a wired connection (e.g., power, control, etc.) between a base and one or more earpieces (not shown).

Figure 12:
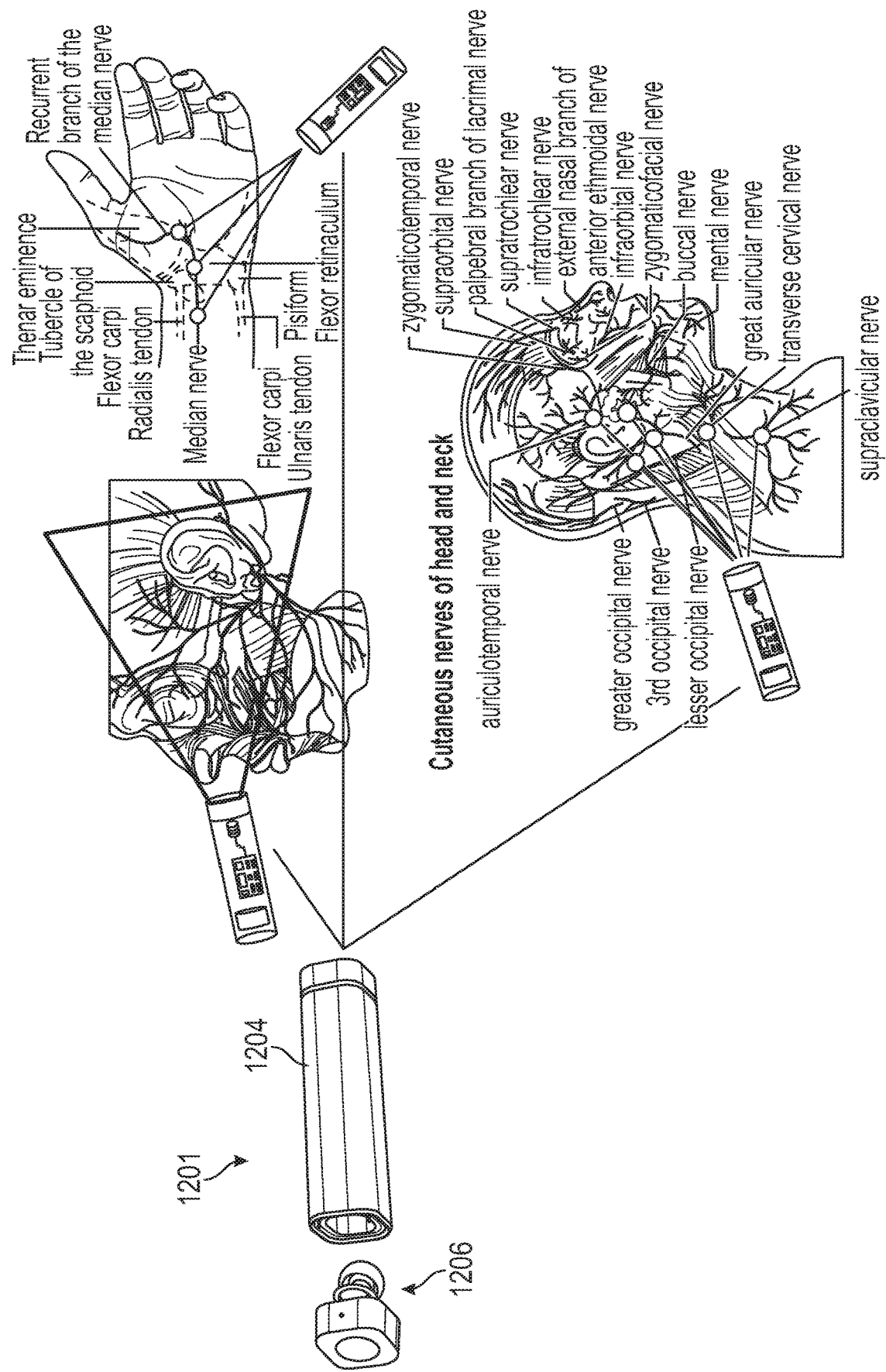
FIG. 12 illustrates the use of one example of a multi-function neurosensory biasing system as described herein. An MEESE can be stored in a base unit containing an additional neurostimulation channel in its base to achieve transient punctate or focal neuromodulation of nerve sites, as shown, on the head, face, neck, ear, or wrist to influence composite sensory processing. The storage base contains additional microprocessors and microcontrollers for communicating with the MEESE interface, but the base itself can also act as a neurostimulator. The system is similar to that shown in FIG. 11A, and is shown here with application to nerve targets on the head and face. The multi-functional aspects of the punctate neuromodulation may be used to treat or alleviate acute pain of the face, head or neck including pain due to headache, temporomandibular joint disorder, and motor disorders of the head, neck, and face. These disorders and the psychophysiological effects of them can indeed influence composite sensory processing so an embodiment of the multi-function Neurobiasing System is to achieve an effect on sensory perception by being able to modulate a plurality of nerve locations as shown either in both a wearable form (MEESE) and a handheld form (storage base stimulation unit as shown).
Figure 14A:
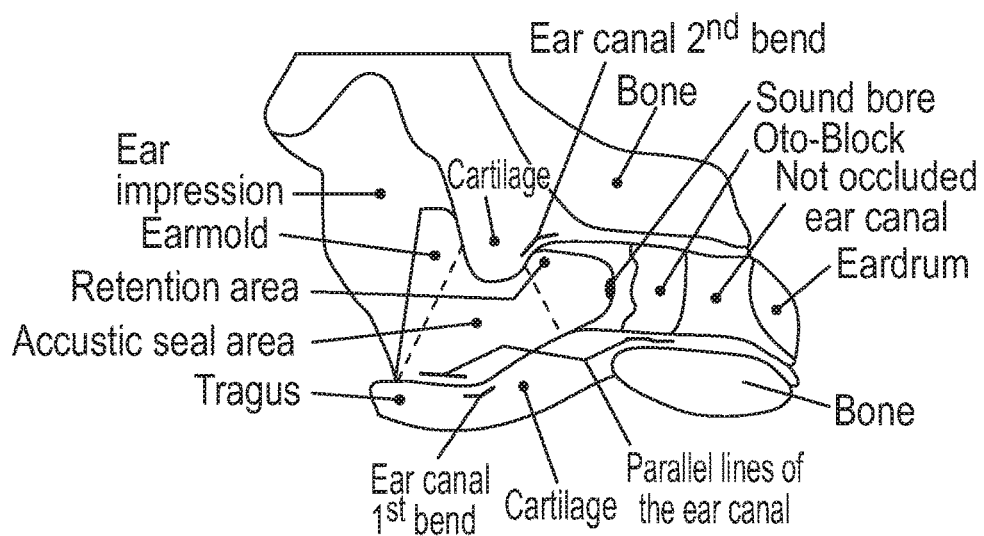
FIGS. 14A-14C illustrate the use and creation of some variations of the apparatuses as described herein. For example.
Figure 14B:
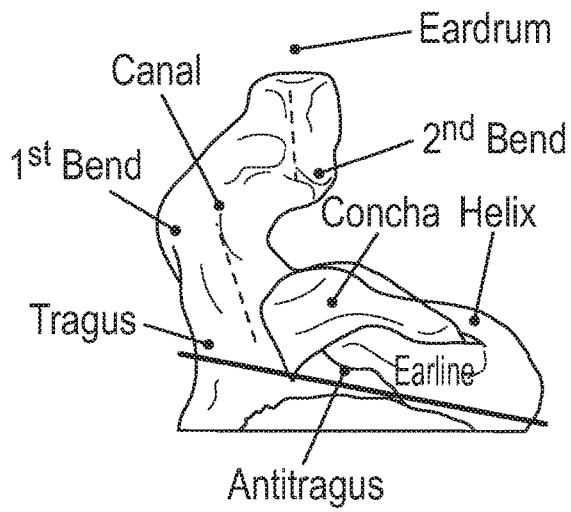
Figure 14C:
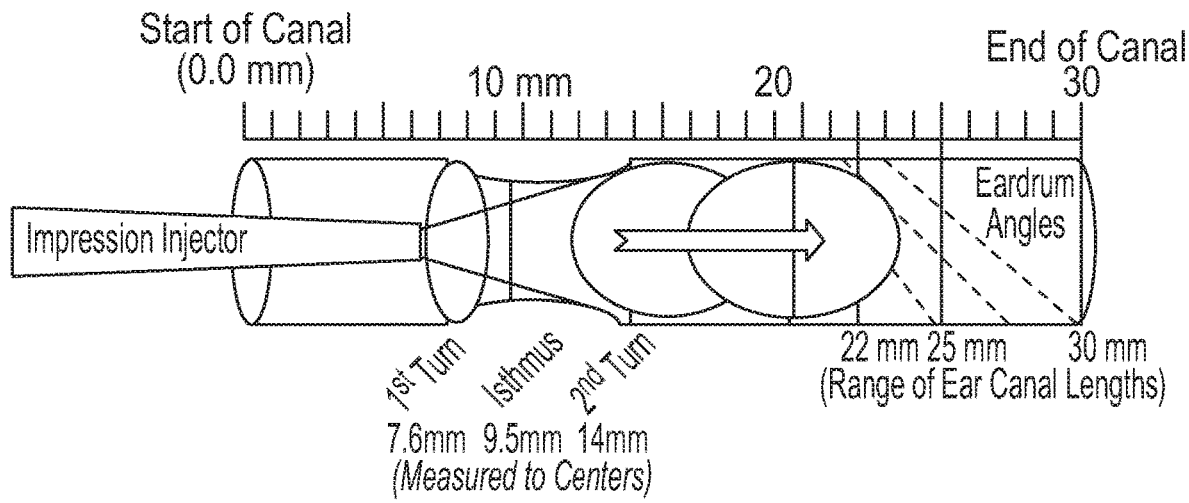
Figure 17A:
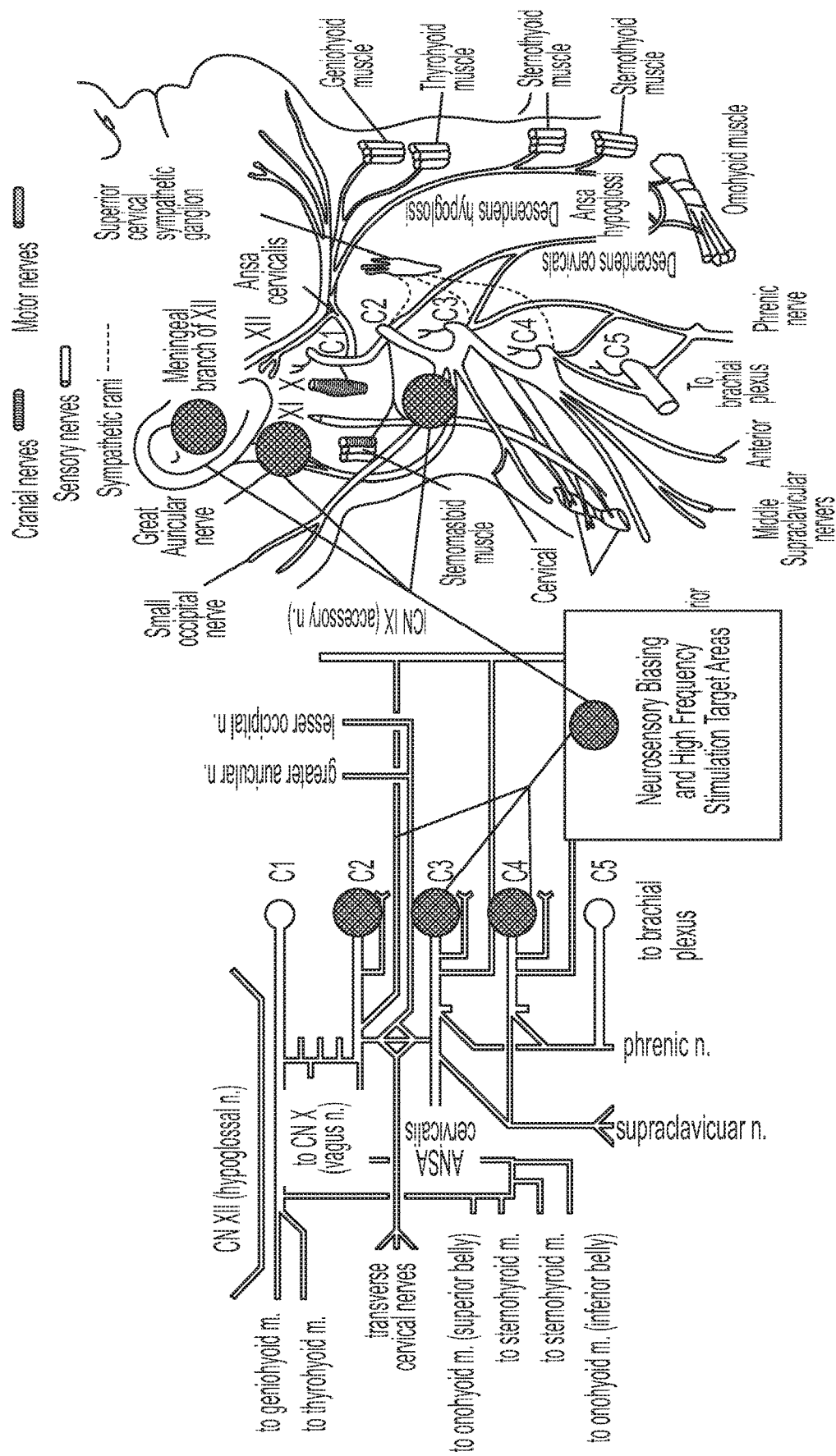
FIGS. 17A-17D illustrates one example of a method and apparatus for applying both cranio-cervical and auriculo-cervical nerve stimulation for treatment as described herein, including for introducing functional neurosensory bias or other type of neurostimulation paradigm (e.g., to treat tinnitus).
Figure 17B:
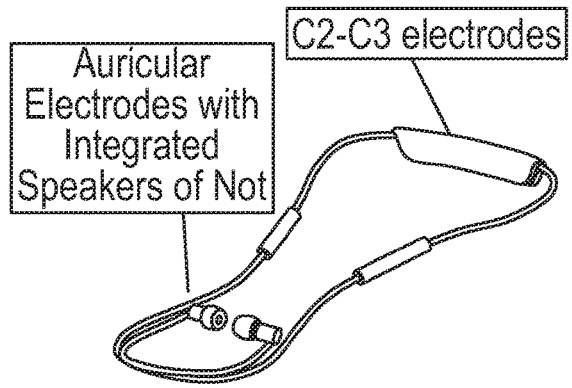
Figure 17C:
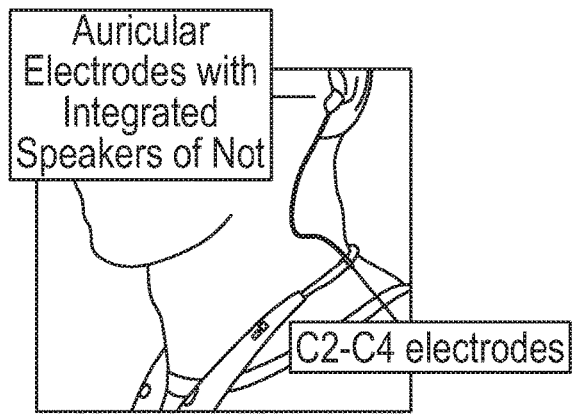
Figure 17D:
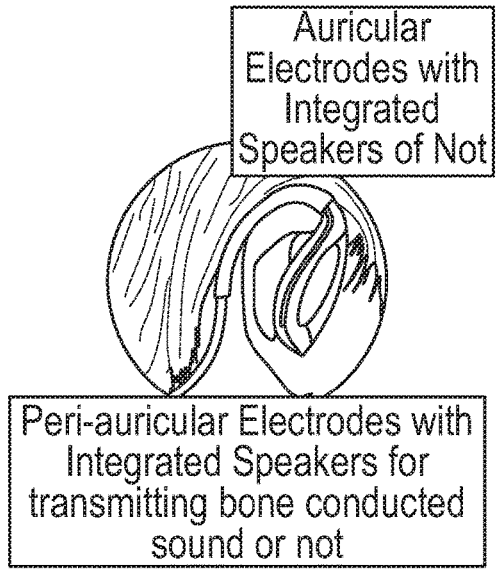

FIG. 12 illustrate operation of an apparatus such as the one shown in FIG. 11A. In this example, the apparatus 1201 is configured as a neurosensory biasing system that includes a storage base 1204 that is a functional punctate neurostimulator that may also apply neurosensory biasing on locations of the head, face, and/or neck, e.g., to modulate composite sensory processes. The system also includes one or more earpieces, configured as shown in FIGS. 11A-11B as a MEESE 1206, to be worn in an ear.

FIGS. 13A-13C illustrates another example of a neurosensory biasing apparatus (e.g., for delivering scrambled neuromodulation as described herein). In this example, the apparatus includes a pair of ear-worn earpiece devices that may be wired or wireless connected to a controller or may each integrate a controller into the body of one or both earpieces. In this example, the earpiece includes one or more electrical contacts 1303, 1305 on protrusion that is configured to extend into the opening of the ear canal. These electrical contacts may be formed of a hydrogel attached to the projection and may be monopolar or bipolar, as shown in FIG. 13C. In this example, the electrodes may be configured as MEESE electrode sites made from conductive polymers or materials in single channel or multichannel bipolar or monopolar configurations. The earpieces may also include one or more (two are shown) electrical contacts 1307, 1309 configured to contact other regions of the ear (as shown in FIG. 13C). In this example, each earpiece 1311, 1311'. As mentioned the body of the earpiece may contain one or more of following Bluetooth® low energy (BTLE), WIFI, Battery, Stimulus Amplifiers, Audio Speaker, Piezo element for vibration, Single or Multichannel Controllers LED, Microphone, Accelerometers, EEG sensors and Differential Amplifiers, HR sensors.

As mentioned above, any of the apparatuses described herein may include a hydrogel configured to form the sensory biasing signal contact, such as an electrical contact and/or a thermal contact. The hydrogel may be configured to fit into a first ear canal so that the hydrogel expands to contact a wall of the first ear canal. Thus the hydrogel may be compressible. The hydrogel may have a low electrical impedance. For example, in any of these apparatuses, the hydrogel may have an impedance of less than 1.5 KOhms (e.g., less than 1 KOhm, less than 900 Ohms, less than 800 Ohms, between 100-600 Ohms, between 200-500 Ohms, etc.).

The hydrogel may be a silicone hydrogel or a hydrogel including silicone. In some variations the hydrogel may have a water content that is between 40-95% (e.g., between 40-50%, between 40-60%, between 50-60%, between 50-75%, between 60-70%, between 60-85%, between 70-80%, between 70-90%, between 80-95%, etc.). In some variations the hydrogel may be a double network hydrogel.

They hydrogel may incorporate one or more of: and antifungal, an antibacterial, deodorant, etc. For example, the hydrogel may contain an additive such as an antibiotic and/or an anti-fungal, and/or other organic compounds to prevent infection and to control odor. For example, the hydrogel may include an anti-microbial agent, such as one or more of: chlorhexidene acetate, chlorhexideine gluconate, chlorhexidine hydrochloride, and chlorhexidine sulfate, silver acetate, silver benzoate, silvercarbonate, silver iodate, silver iodide, silver lactate, silver laurate, silver nitrate, silver oxide, silver palmitate, silver protein, and silver sulfadiazine, polymyxin, tetracycline, tobramycin, gentamicin, rifampician, bacitracin, neomycin, chloramphenical, oxolinic acid, norfloxacin, nalidix acid, pefloxacin, enoxacin, ciprofloxacin, ampicillin, amoxicillin, piracil, cephalosporins, vancomycin, and bismuth tribromophenate. In some variations, the hydrogel may include an anti-fungal agent such as one or more of: Tolnaftate, Miconazole, Fluconazole, Econazole, Ketoconazole, Itraconazole, Terbinafine, Amphotericin, Nystatin and Natamycin. In some variations, the hydrogel may include an anti-odorant such as one or more of: grapefruit Seed Extract, Tea Tree Oil, Myrtle Oil, and Lemon grass extract.

In any of these apparatuses, the hydrogel may include a color (e.g., dye) to indicate the location of the one or more contacts (e.g., electrical contacts, thermal contacts, etc.). The hydrogel may include a stiffener in order to provide additional strength or support when removing/applying (e.g., replacing) the hydrogel on/off of the earpiece, as described above (see, e.g., FIG. 19).

Any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

FIG. 21A illustrates one example of a general method for applying sensory biasing signals to treat a subject as described herein. The method of treatment may include methods of applying sensory biasing signals between the ear canals (e.g., right and left ear canals). For example a method of treatment may include: inserting a first low-impedance hydrogel into the subject's first ear canal so that the hydrogel expands to contact a wall of the first ear canal 2101. Optionally, the method may include inserting a second low-impedance hydrogel into the subject's second ear canal so that the hydrogel expands to contact a wall of the second ear canal, wherein the second hydrogel comprises a second contact 2103. Treatment may then be applied through the first contact 2105. In some variations the treatment may be electrical, thermal, etc.

FIG. 21B illustrates a method similar to FIG. 21A in which the treatment includes an electrical signal that is applied between electrical contacts on or in each ear canal. For example, in this method the electrical sensory biasing signal is applied between the ear canals (e.g., right and left ear canals). The method of treatment may include: inserting a first low-impedance hydrogel into the subject's first ear canal so that the hydrogel expands to contact a wall of the first ear canal, wherein the first hydrogel comprises a first electrical contact 2121; inserting a second low-impedance hydrogel into the subject's second ear canal so that the hydrogel expands to contact a wall of the second ear canal, wherein the second hydrogel comprises a second electrical contact 2123; and applying a treatment electrical signal between the first and second electrical contacts, wherein the treatment electrical signal comprises a biphasic, pulsed signal having a frequency of greater than 200 Hz, so that the wall of the first ear canal receives a current density of greater than 2 mA/cm$^2$ 2125.

FIG. 21C illustrates an example of a method similar to that shown in FIG. 21A in which the sensory biasing signal is thermal (or may include thermal and electrical). For example, the method may include: inserting a first compressible and thermally-conductive hydrogel into the subject's first ear canal so that the hydrogel expands to contact a wall of the first ear canal 2131, wherein the first hydrogel comprises a first plurality of thermal delivery regions; and selectively modulating the temperature of each thermal delivery region of the first plurality of thermal delivery regions with temperature profiles having a frequency of greater than 300 Hz to generate a change in temperature of between 0.1 and 3 degrees C. having for a duration of between 1 second and 1 minute, wherein the temperature profiles of the thermal delivery regions are different from each other 2135. The method may include inserting a second compressible and thermally-conductive hydrogel into the subject's second ear canal so that the hydrogel expands to contact a wall of the second ear canal, further comprising selectively modulating the temperature of each of a second plurality of thermal delivery regions of the second hydrogel 2133.

As mentioned above, any of the methods and apparatuses described herein may be configured for enhancing attention. For example, FIG. 22 illustrates one method of enhancing attention as described. In FIG. 22, the method may include identifying a need for enhanced attention to an event occurrence 2201, and triggering a sensory input within a subject's ear canal within 1-7 seconds of the occurrence of the event, wherein the sensory input comprises one or more of: an electrical stimulation, a thermal stimulation, a mechanical stimulation 2205.

The need for attention be manually identified, e.g., by a user triggering to focus attention when the user determines that special attention is going to be needed by the subject. Alternatively, the need for enhanced attention may be automatically (or semi-automatically) identified, e.g., based one or more of: electroencephalogram (EEG) data, eye tracking data, and electrooculographic signal (EOG). In some variations the need for attention may be based on machine-identified triggers (e.g., based on the surrounding context). In some variations a computer system may be configured to, based on contextual input, such as identifying key phrases or words from a spoken conversation, that the subject should pay additional attention.

In some variations, the sensory input within the subject's ear canal is triggered within 2-5 seconds of the occurrence of the high-attention event (e.g., 2-5 seconds before the additional attention is desired). This may allow time for the subject to process and respond to the sensory input.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the methods and apparatuses described herein.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method of treatment, the method comprising:
   inserting a first low-impedance hydrogel into a subject's first ear canal in a manner that the first low-impedance hydrogel expands to contact a wall of the first ear canal, wherein the first low-impedance hydrogel comprises a first electrical contact;
   inserting a second low-impedance hydrogel into the subject's second ear canal in a manner that the second low-impedance hydrogel expands to contact a wall of the second ear canal, wherein the second low-impedance hydrogel comprises a second electrical contact;
   applying a treatment electrical signal between the first and second electrical contacts, wherein the treatment electrical signal comprises a biphasic, pulsed signal having a frequency of greater than 200 Hertz (Hz), in a manner that the wall of the first ear canal receives a current density of greater than 2 Milliampere per square centimeter (mA/cm$^2$); and applying a second electrical signal between the first and second low-impedance hydrogels, wherein the second electrical signal comprises a biphasic, pulsed signal having a frequency of greater than 200 Hz.

2. The method of claim 1, wherein the step of applying the treatment comprises applying at a current density that is at or below a sensory threshold for feeling the applied treatment electrical signal.

3. The method of claim 1, wherein the treatment is a method of treating insomnia and the subject is an insomniac subject.

4. The method of claim 3, wherein the treatment electrical signal is applied for 10 minutes or more before the subject goes to bed.

5. The method of claim 1, wherein the treatment is a method of treating one or more of: anxiety, depression or a neurosensory disorder.

6. The method of claim 1, wherein the treatment is a method of treating tinnitus.

7. The method of claim 6, further comprising delivering an audio signal to the subject concurrent with the delivery of the treatment electrical signal.

8. The method of claim 1, wherein the second electrical signal is different than the treatment electrical signal by one or more of: a pulse width, an interphase interval, a pulse frequency, and/or a pulse amplitude.

9. The method of claim 1, wherein the second electrical signal is applied concurrently with the treatment electrical signal.

10. The method of claim 1, wherein the frequency is greater than 250 Hz.

11. The method of claim 1, wherein the current density is 5 mA/cm$^2$ or greater.

12. The method of claim 1, wherein the treatment electrical signal has a pulse width of 150 microseconds or less.

13. The method of claim 1, wherein the hydrogel of the first and second electrical contacts have a shore A durometer of 80 or less.

14. The method of claim 1, wherein the first electrical contact is configured to be positioned at least 5 mm from an opening into the first ear canal while the first hydrogel is positioned within the subject's ear.

15. The method of claim 1, further comprising concurrently applying an electrical stimulation to the subject's neck.

16. A method of treating insomnia, the method comprising:

inserting a first low-impedance hydrogel into a subject's first ear canal in a manner that the first low-impedance hydrogel expands to contact a wall of the first ear canal, wherein the first low-impedance hydrogel comprises a first electrical contact;

inserting a second low-impedance hydrogel into the subject's second ear canal in a manner that the second low-impedance hydrogel expands to contact a wall of the second ear canal, wherein the second low-impedance hydrogel comprises a second electrical contact; and increasing drowsiness by applying a treatment electrical signal between the first and second electrical contacts for at least 10 minutes before the subject's target bedtime, wherein the treatment electrical signal comprises a biphasic, pulsed signal having a frequency of greater than 200 Hertz (Hz), in a manner that the wall of the first ear canal receives a current density of >2 Milliampere per square centimeter (mA/cm$^2$); and applying a second electrical signal between the first and second low-impedance hydrogels, wherein the second electrical signal comprises a biphasic, pulsed signal having a frequency of greater than 200 Hz.

17. The method of claim 16, further comprising removing the first and second electrical contacts before the subject's bedtime after applying treatment.

18. The method of claim 16, wherein the treatment electrical signal is applied for 10 minutes or more before the subject goes to bed.

19. The method of claim 16, wherein the second electrical signal is different than the treatment electrical signal by one or more of: a pulse width, an interphase interval, a pulse frequency, and/or a pulse amplitude.

\* \* \* \* \*